United States Patent
Kim et al.

(10) Patent No.: US 12,490,059 B2
(45) Date of Patent: Dec. 2, 2025

(54) MOBILITY SUPPORT METHOD AND DEVICE FOR MULTICAST SERVICE IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 18/010,639

(22) PCT Filed: Jun. 18, 2021

(86) PCT No.: PCT/KR2021/007689
§ 371 (c)(1),
(2) Date: Dec. 15, 2022

(87) PCT Pub. No.: WO2021/256898
PCT Pub. Date: Dec. 23, 2021

(65) Prior Publication Data
US 2023/0232189 A1 Jul. 20, 2023

(30) Foreign Application Priority Data
Jun. 19, 2020 (KR) .......... 10-2020-0074842

(51) Int. Cl.
*H04W 4/06* (2009.01)
*H04W 76/40* (2018.01)

(52) U.S. Cl.
CPC ............. *H04W 4/06* (2013.01); *H04W 76/40* (2018.02)

(58) Field of Classification Search
CPC ... H04W 4/06; H04W 76/40; H04W 36/0007; H04W 8/24; H04W 8/26; H04W 76/27; Y02D 30/70
See application file for complete search history.

(56) References Cited

U.S. PATENT DOCUMENTS

| | | | |
|---|---|---|---|
| 10,412,674 | B2 | 9/2019 | Kim et al. |
| 2009/0245157 | A1 | 10/2009 | Song |

(Continued)

FOREIGN PATENT DOCUMENTS

| | | |
|---|---|---|
| CN | 101166145 A | 4/2008 |
| CN | 110178335 A | 8/2019 |

(Continued)

OTHER PUBLICATIONS

Extended European Search Report dated Jun. 3, 2024, issued in European Patent Application No. 21826920.7-1215.

(Continued)

*Primary Examiner* — Eric Myers
(74) *Attorney, Agent, or Firm* — Jefferson IP Law, LLP

(57) ABSTRACT

The present disclosure relates to: a communication technique merging IoT technology with a 5G communication system for supporting a data transmission rate higher than a 4G system; and a system therefor. The present disclosure can be applied to intelligent services (for example, smart homes, smart buildings, smart cities, smart cars or connected cars, healthcare, digital education, retail, security- and safety-related services, and the like) on the basis of a 5G communication technology and IoT-related technology. Disclosed in the present invention is a method for structuring or setting a multicast bearer or unicast bearer supporting an MBS service so as to support the MBS service in a next-generation mobile communication system, and a method for processing data of a PHY layer device, MAC layer device, RLC layer (Continued)

device or PDCP layer device receiving and processing MBS data.

8 Claims, 22 Drawing Sheets

(56) References Cited

U.S. PATENT DOCUMENTS

| | | | |
|---|---|---|---|
| 2017/0019772 A1 | 1/2017 | Kim et al. | |
| 2017/0302465 A1 | 10/2017 | Wang et al. | |
| 2018/0146405 A1 | 5/2018 | Etemad et al. | |
| 2018/0279204 A1 | 9/2018 | Kim et al. | |
| 2019/0289504 A1 | 9/2019 | Kim | |
| 2020/0059991 A1* | 2/2020 | Wu | H04W 76/27 |

FOREIGN PATENT DOCUMENTS

| | | |
|---|---|---|
| EP | 1 942 602 A2 | 7/2008 |
| EP | 3378249 A1 | 9/2018 |
| EP | 3 545 722 A1 | 10/2019 |
| KR | 10-2009-0017995 A | 2/2009 |
| WO | 2017-131479 A1 | 8/2017 |
| WO | 2018-058586 A1 | 4/2018 |

OTHER PUBLICATIONS

OPPO, MBS_Solution for session deactivation and activation, S2-2004495, SA WG2 Meeting #S2-139E, Electronic, Elbonia; Jun. 12, 2020.

3GPP; TSG SA; Study on architectural enhancements for 5G multicast-broadcast services(Release 17), 3GPP TR 23.757 V0.3.0; Jan. 29, 2020.

Chinese Office Action with English translation dated Apr. 30, 2025; Chinese Appln. No. 202180043638.1.

* cited by examiner

MOBILITY SUPPORT METHOD AND DEVICE FOR MULTICAST SERVICE IN NEXT GENERATION MOBILE COMMUNICATION SYSTEM

TECHNICAL FIELD

The disclosure relates to a bearer structure, and a method and a device for supporting multicast or unicast in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mm Wave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In order to support services, such as a broadcast/multicast service, a mission critical service, or a public safety service, a next-generation mobile communication system may support an MBS service (a multicast or broadcast service, or a multimedia broadcast and multicast service (MBMS), or a multicast and broadcast service (MBS)). The MBS service may be serviced to a UE through a multicast bearer or a unicast bearer.

In order to support the MBS service, there is a need for a multicast bearer or unicast bearer structure or a configuration method for supporting the MBS service, and a data processing method of a PHY layer device, a MAC layer device, an RLC layer device, or a PDCP layer device for receiving and processing MBS data.

Further, it is required to embody a signaling procedure or a UE operation for continuously supporting the MBS service in an RRC connected mode, an RRC idle mode, or an RRC inactive mode, or during a switchover between the modes.

Further, in order to support the MBS service depending on a handover between base stations or networks that support the MBS service or a UE mobility, there may be a need for a method for reconfiguring (or switching) from the multicast bearer to the unicast bearer or reconfiguring (or switching) from the unicast bearer to the multicast bearer.

The disclosure proposes methods for a UE to be normally serviced the MBS service in various scenarios described above.

Solution to Problem

According to the disclosure to solve the above-described problems, a method performed by a UE in a wireless communication system includes: monitoring a physical downlink control channel (PDCCH); receiving a message from a base station based on the monitoring; identifying whether a multicast and broadcast service (MBS) identifier is included in the message, the MBS identifier being information indicating MBS activation or MBS deactivation; receiving the MBS service on an MBS service transmission resource in case that the identified MBS identifier is information indicating the MBS activation; and stopping the MBS service being received in case that the identified MBS identifier is information indicating the MBS deactivation.

In some embodiments, the method further includes re-receiving a message including MBS service configuration information in case that the MBS identifier indicates an MBS service information change.

In some embodiments, the message is a paging message.

In some embodiments, the method further includes receiving control information on the MBS service from the base station.

According to another embodiment of the disclosure, a method performed by a base station in a wireless communication system includes:
 identifying whether a multicast and broadcast service (MBS) has been changed; and transmitting a message to a UE based on the identification of whether the MBS service has been changed, wherein the message includes an MBS identifier, wherein the MBS identifier indicates MBS activation or MBS deactivation, and wherein the method includes transmitting the MBS service on an MBS service transmission resource in case that the MBS identifier is information indicating the MBS activation, and stopping the MBS service being transmitted in case that the MBS identifier is information indicating the MBS deactivation.

According to still another embodiment of the disclosure, a UE includes: a transceiver configured to transmit and receive at least one signal; and a controller connected to the transceiver, wherein the controller is configured to: monitor a physical downlink control channel (PDCCH), receive a message from a base station based on the monitoring, identify whether a multicast and broadcast service (MBS) identifier is included in the message, the MBS identifier being information indicating MBS activation or MBS deactivation, receive the MBS service on an MBS service transmission resource in case that the identified MBS identifier is information indicating the MBS activation, and stop the MBS service being received in case that the identified MBS identifier is information indicating the MBS deactivation.

According to yet another embodiment of the disclosure, a base station includes: a transceiver configured to transmit and receive at least one signal; and a controller connected to the transceiver, wherein the controller is configured to: identify whether a multicast and broadcast service (MBS) service has been changed, and transmit a message to a UE based on the identification whether the MBS service has been changed, wherein the message includes an MBS identifier, wherein the MBS identifier indicates MBS activation or MBS deactivation, and wherein the MBS service is transmitted on an MBS service transmission resource in case that the MBS identifier is information indicating the MBS activation, and the MBS service being transmitted is stopped in case that the MBS identifier is information indicating the MBS deactivation.

Advantageous Effects of Invention

According to an embodiment of the disclosure, in order to support the MBS service in the next-generation mobile communication system, it is possible to support the MBS service in the multicast bearer or unicast bearer structure or the configuration method thereof, and to receive and process the MBS data in the PHY layer device, the MAC layer device, the RLC layer device, or the PDCP layer device.

Further, it is possible to continuously support the MBS service in the RRC connected mode, the RRC idle mode, or the RRC inactive mode, or during the switchover between the modes.

Further, in order to support the MBS service depending on the handover between the base stations or networks that support the MBS service or the UE mobility, it is possible to reconfigure (or switch) the multicast bearer to the unicast bearer or to reconfigure (or switch) the unicast bearer to the multicast bearer.

BRIEF DESCRIPTION OF DRAWINGS

FIG. 1O is a diagram illustrating a signaling procedure for efficiently supporting an MBS service.

MODE FOR THE INVENTION

Hereinafter, the principle of operation of the disclosure will be described in detail with reference to the accompanying drawings. In describing the disclosure, a detailed description of related known functions or constitutions will be omitted if it is determined that it obscures the gist of the disclosure in unnecessary detail. Further, terms to be described later are terms defined in consideration of their functions in the disclosure, and may differ depending on intentions of a user or an operator, or customs. Accordingly, they should be defined based on the contents of the whole description of the disclosure.

In describing the disclosure, a detailed description of related known functions or constitutions will be omitted if it is determined that it obscures the gist of the disclosure in unnecessary detail. Hereinafter, embodiments of the disclosure will be described with reference to the accompanying drawings.

In the following description, a term to identify an access node, a term to denote network entities, a term to denote messages, a term to denote an interface between network entities, and a term to denote a variety of types of identity information have been exemplified for convenience in explanation. Accordingly, the disclosure is not limited to the terms to be described later, and other terms to denote targets having equivalent technical meanings may be used.

For convenience in explanation, in the disclosure, terms and names defined in the 3rd Generation Partnership Project Long Term Evolution (3GPP LTE) standards are used. However, the disclosure is not restricted by the terms and names, and it may be equally applied to systems complying with other standards. In the disclosure, for convenience in explanation, an eNB may be interchangeably used with a gNB. That is, a base station that is explained as an eNB may be represented as a gNB.

Figure 1A:
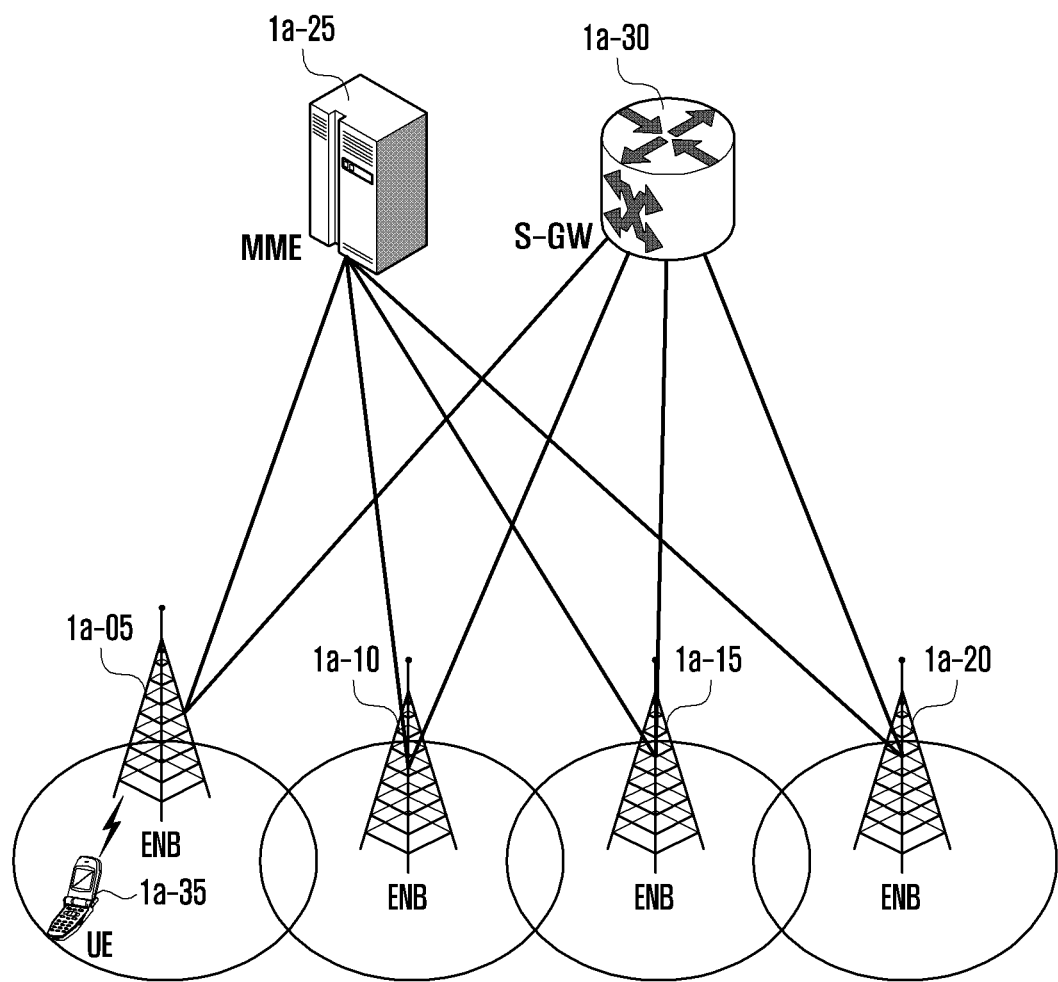
FIG. 1A is a diagram illustrating the structure of an LTE system to which the disclosure is applicable.

FIG. 1A is a diagram illustrating the structure of an LTE system to which the disclosure is applicable.

With reference to FIG. 1A, as illustrated, a radio access network of an LTE system is composed of evolved node Bs (hereinafter referred to as "ENBs", "node Bs", or "base stations") 1a-05, 1a-10, 1a-15, and 1a-20, a mobility management entity (MME) 1a-25, and a serving-gateway (S-GW) 1a-30. A user equipment (hereinafter referred to as "UE" or "terminal") 1a-35 accesses an external network through the ENBs 1a-05 to 1a-20 and the S-GW 1a-30.

In FIG. 1A, the ENBs 1a-05 to 1a-20 correspond to existing node Bs of a UMTS system. The ENB is connected to the User Equipment (UE) 1a-35 on a radio channel, and plays a more complicated role than that of the existing node B. In the LTE system, since all user traffics including a real-time service, such as a voice over IP (VOIP) through an Internet protocol, are serviced on shared channels, entities that perform scheduling through gathering of state information, such as a buffer state, an available transmission power state, and a channel state of UEs, are necessary, and the ENBs 1a-05 to 1a-20 take charge of this. In general, one ENB controls a plurality of cells. For example, in order to implement a transmission speed of 100 Mbps, the LTE system uses, for example, orthogonal frequency division multiplexing (hereinafter, referred to as "OFDM") as a radio access technology in a bandwidth of 20 MHz. Further, the LTE system adopts an adaptive modulation & coding (hereinafter, referred to as "AMC") scheme that determines a modulation scheme and a channel coding rate to match the channel state of the UE. The S-GW 1a-30 is an entity that provides a data bearer, and generates or removes the data bearer under the control of the MME 1a-25. The MME is an entity that takes charge of not only a mobility management function for the UE but also various kinds of control functions, and is connected to the plurality of base stations.

Figure 1B:
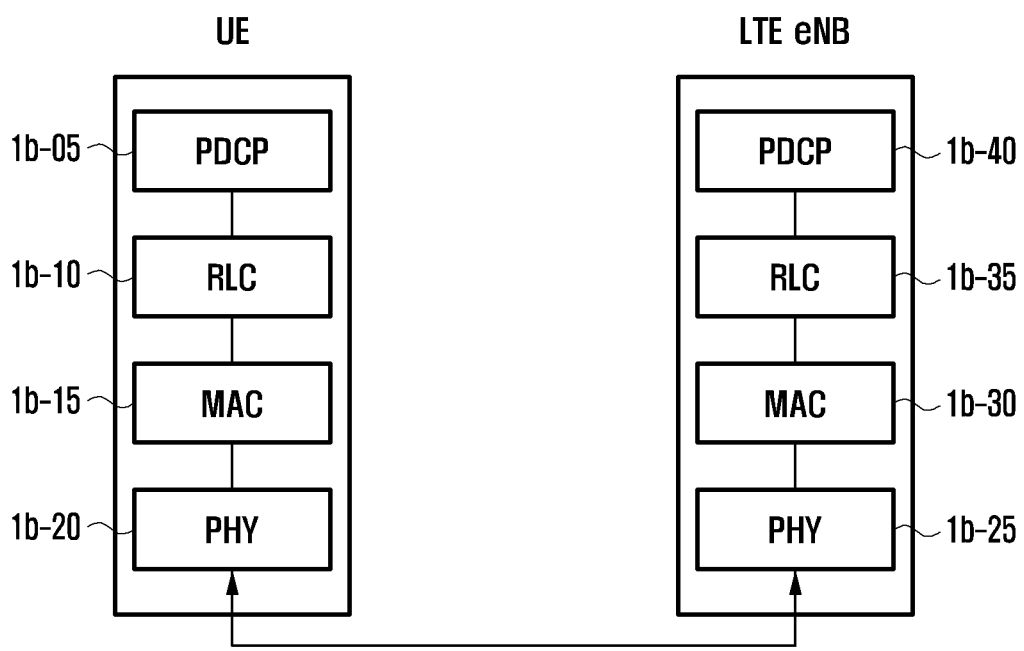
FIG. 1B is a diagram illustrating a radio protocol structure in an LTE system to which the disclosure is applicable.

FIG. 1B is a diagram illustrating a radio protocol structure in an LTE system to which the disclosure is applicable.

With reference to FIG. 1B, in a UE or an ENB, a radio protocol of an LTE system is composed of a packet data convergence protocol (PDCP) 1b-05 or 1b-40, a radio link control (RLC) 1b-10 or 1b-35, and a medium access control (MAC) 1b-15 or 1b-30. The packet data convergence protocol (PDCP) 1b-05 or 1b-40 takes charge of IP header compression/decompression operations. The main functions of the PDCP are summarized as follows.
  Header compression and decompression: ROHC only
  Transfer of user data
  In-sequence delivery of upper layer device PDUs at PDCP
  reestablishment procedure for RLC AM
  For split bearers in DC (only support for RLC AM): PDCP PDU routing for transmission and PDCP PDU reordering for reception
  Duplicate detection of lower layer device SDUs at PDCP reestablishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink A radio link control (hereinafter, referred to as "RLC") 1b-10 or 1b-35 performs an ARQ operation by reconfiguring a PDCP packet data unit (PDCP PDU) with a suitable size. Main functions of the RLC are summarized as follows.
  Transfer of upper layer device PDUs
  Error correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC reestablishment The MAC 1b-15 or 1b-30 is connected to several RLC layer devices constituted in one UE, and performs multiplexing of RLC PDUs into a MAC PDU and demultiplexing of the RLC PDUs from the MAC PDU. The main functions of the MAC are summarized as follows.
  Mapping between logical channels and transport channels
  Multiplexing/demultiplexing of MAC SDUs belonging to one or different logical channels into/from transport blocks (TB) delivered to/from the physical layer device on transport channels Scheduling information reporting
Error correction through HARQ
Priority handling between logical channels of one UE
Priority handling between UEs by means of dynamic scheduling
MBMS service identification
Transport format selection
Padding A physical layer device PHY 1b-20 or 1b-25 performs channel coding and modulation of upper layer device data, and makes and transmits OFDM symbols on a radio channel, or performs demodulation and channel decoding of the OFDM symbols received on the radio channel and transfers the OFDM symbols to an upper layer device.

Figure 1C:
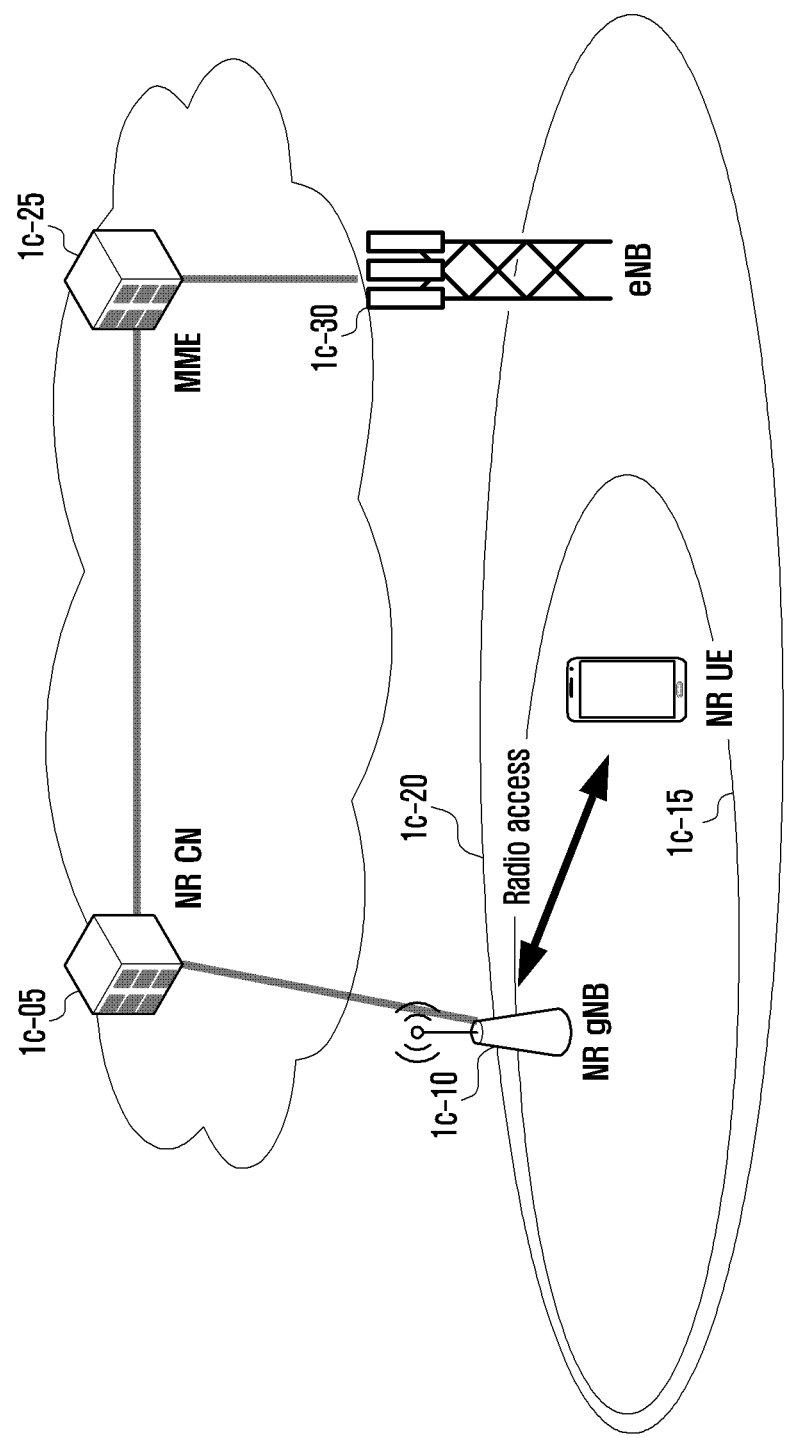
FIG. 1C is a diagram illustrating the structure of a next-generation mobile communication system to which the disclosure is applicable.

FIG. 1C is a diagram illustrating the structure of a next-generation mobile communication system to which the disclosure is applicable.

With reference to FIG. 1C, as illustrated, a radio access network of a next-generation mobile communication system (hereinafter, NR or 5G) is composed of a new radio node B (hereinafter, NR gNB or NR base station) 1c-10, and a new radio core network (NR CN) 1c-05. A new radio user equipment (hereinafter, NR UE or UE) 1c-15 accesses an external network through the NR gNB 1c-10 and the NR CN 1c-05.

In FIG. 1C, the NR gNB 1c-10 corresponds to an evolved Node B (eNB) of the existing LTE system. The NR gNB 1c-10 is connected to the NR UE 1c-15 on a radio channel, and can provide a more superior service than the service of the existing Node B. In the next-generation mobile communication system, all user traffics are serviced on shared channels, and thus there is a need for a device that performs scheduling through consolidation of state information, such as a buffer state, an available transmission power state, and a channel state of UEs, and the NR gNB 1c-10 takes charge of this. In general, one NR gNB controls a plurality of cells. In order to implement ultrahigh-speed data transmission as compared with that of the existing LTE, a bandwidth that is equal to or higher than the existing maximum bandwidth may be applied, and a beamforming technology may be additionally grafted in consideration of the orthogonal frequency division multiplexing (hereinafter, referred to as "OFDM") as the radio access technology. Further, the NR gNB 1c-10 adopts an adaptive modulation & coding (hereinafter, referred to as "AMC") scheme that determines the modulation scheme and the channel coding rate to match the channel state of the UE. The NR CN 1c-05 performs functions of mobility support, bearer setup, and quality of service (QOS) setup. The NR CN is a device that takes charge of not only a mobility management function for the UE but also various kinds of control functions, and is connected to a plurality of base stations. Further, the next-generation mobile communication system may interwork with the existing LTE system, and the NR CN is connected to the MME 1c-25 through a network interface. The MME is connected to the eNB 1c-30 that is the existing base station.

Figure 1D:
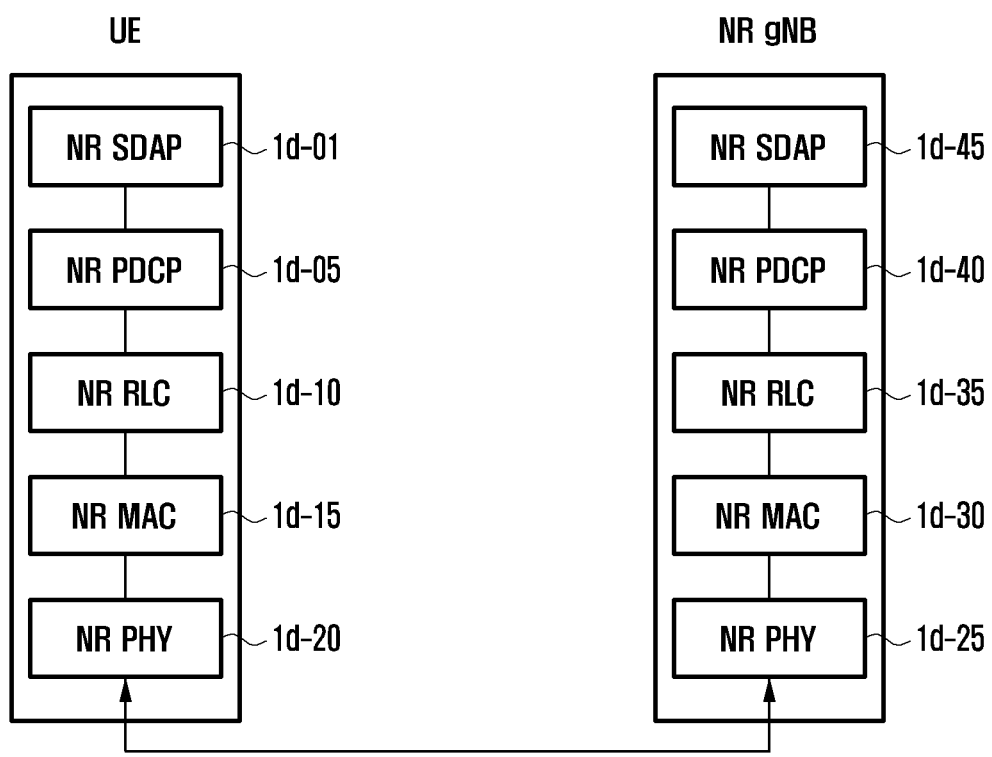
FIG. 1D is a diagram illustrating a radio protocol structure of a next-generation mobile communication system to which the disclosure is applicable.

FIG. 1D is a diagram illustrating a radio protocol structure of a next-generation mobile communication system to which the disclosure is applicable.

With reference to FIG. 1D, in the UE or NR base station, the radio protocol of the next-generation mobile communication system is composed of an NR service data protocol (SDAP) 1d-01 or 1d-45, an NR PDCP 1d-05 or 1d-40, an NR RLC 1d-10 or 1d-35, and an NR MAC 1d-15 or 1d-30.

The main functions of the NR SDAP 1d-01 or 1d-45 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through an RRC message. If the SDAP header is configured, the UE may indicate that the UE can update or reconfigure mapping information on the uplink and downlink QoS flow and the data bearer through a NAS QoS reflective configuration 1-bit indicator (NAS reflective QoS) and an AS QoS reflective configuration 1-bit indicator (AS reflective QoS) of the SDAP header. The SDAP header may include QoS flow ID information representing the QoS. The QoS information may be used as a data processing priority for supporting a smooth service and scheduling information.

The main functions of the NR PDCP 1d-05 or 1d-40 may include some of the following functions.

Header compression and decompression: ROHC only
Transfer of user data
In-sequence delivery of upper layer device PDUs
Out-of-sequence delivery of upper layer device PDUs
PDCP PDU reordering for reception
Duplicate detection of lower layer device SDUs
Retransmission of PDCP SDUs
Ciphering and deciphering
Timer-based SDU discard in an uplink As described above, reordering of the NR PDCP device may mean reordering of PDCP PDUs received from a lower layer device based on PDCP sequence numbers (SNs), and may include transferring of data to an upper layer device in the order of reordering. Further, the reordering may include immediate transferring of the data without considering the order, recording of lost PDCP PDUs through reordering, reporting of the status for the lost PDCP PDUs to a transmission side, and requesting for retransmission for the lost PDCP PDUs.

The main functions of the NR RLC 1d-10 or 1d-35 may include some of the following functions.

Transfer of upper layer device PDUs
In-sequence delivery of upper layer device PDUs
Out-of-sequence delivery of upper layer device PDUs
Error correction through an ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, the in-sequence delivery of the NR RLC device may mean the in-sequence delivery of RLC SDUs received from a lower layer device to an upper layer device, and in case that one original RLC SDU is segmented into several RLC SDUs to be received, the in-sequence delivery of the NR RLC device may include reassembly and delivery of the RLC SDUs and reordering of the received RLC PDUs based on an RLC sequence number (SN) or a PDCP sequence number (SN). The in-sequence delivery of the NR RLC device may include recording of lost RLC PDUs through reordering, status report for the lost RLC PDUs to the transmission side, and retransmission request for the lost RLC PDUs. The in-sequence delivery of the NR RLC device may include in-sequence delivery of only RLC SDUs just before the lost RLC SDU to an upper layer device if there is the lost RLC SDU, in-sequence delivery of all RLC SDUs received before a specific timer starts its operation to an upper layer device if the specific timer has expired although there is the lost RLC SDU, or in-sequence delivery of all RLC SDUs received up to now to an upper layer device if the specific timer has expired although there is the lost RLC SDU. Further, the NR RLC device may process the RLC PDUs in the order of their reception (in the order of arrival, regardless of the order of a serial number or sequence number), and may transfer the processed RLC PDUs to the PDCP device in an out-of-sequence delivery manner, and in case of receiving segments, the NR RLC device may receive the segments stored in a buffer or to be received later, reconfigure and process them as one complete RLC PDU, and then transfer the reconfigured RLC PDU to the PDCP device. The NR RLC layer device may not include a concatenation function, and the function may be performed by an NR MAC layer device or may be replaced by a multiplexing function of the NR MAC layer device.

As described above, the out-of-sequence delivery of the NR RLC device may mean a function of transferring the RLC SDUs received from a lower layer device directly to an upper layer device regardless of their order, and if one original RLC SDU is segmented into several RLC SDUs to be received, the out-of-sequence delivery of the NR RLC device may include reassembly and delivery of the RLC SDUs. Further, the out-of-sequence delivery of the NR RLC device may include functions of storing and ordering the RLC SNs or PDCP SNs of the received RLC PDUs and recording the lost RLC PDUs.

The NR MAC 1d-15 or 1d-30 may be connected to several NR RLC layer devices constituted in one UE, and the main functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layer device 1d-20 or 1d-25 may perform channel coding and modulation of upper layer device data to make and transmit OFDM symbols on a radio channel, or may perform demodulation and channel decoding of the OFDM symbols received on the radio channel to transfer the demodulated and channel-decoded symbols to an upper layer device.

Because the next-generation mobile communication system may use a very high frequency band, the frequency bandwidth may also be very wide. However, supporting all very wide bandwidths in UE implementation requires high implementation complexity and incurs high cost. Therefore, the concept of a bandwidth part (BWP) may be introduced in the next-generation mobile communication system, and a plurality of bandwidth parts (BWPs) may be configured in one cell (Spcell or Scell) and data may be transmitted/received in one or a plurality of bandwidth parts according to an indication of a base station.

The disclosure is featured by proposing a state transition method or a bandwidth part switching method and a specific operation considering the state of the Scell and a plurality of bandwidth parts configured in the Scell when introducing the dormant bandwidth part proposed in the disclosure. In addition, a method of managing the dormant mode by BWP-level and making a state transition or a method of bandwidth part switching, respectively, are proposed, and a specific bandwidth part operation according to the state of each SCell or the state or mode (active, inactive, or dormant) of each bandwidth part is proposed.

In addition, the disclosure is featured in that it is possible to configure a plurality of bandwidth parts for each downlink or uplink in one cell (Spcell, Pcell, Pscell, or Scell), and configure and operate an active bandwidth part (active DL or UL BWP), a dormant bandwidth part (dormant BWP or dormant DL BWP), or an inactive bandwidth part (inactive or deactivated DL/UL BWP) through bandwidth part switching. That is, the data transmission rate may be increased by a method similar to the carrier aggregation technology by transitioning the downlink or uplink bandwidth part to the active state for the single cell, and the UE may not perform PDCCH monitoring for the cell, thereby saving battery by transitioning or switching the downlink bandwidth part to the dormant bandwidth part, and it is possible to support the activation of a fast cell or bandwidth part in the future by enabling the UE to perform channel measurement on the downlink bandwidth part and report the channel measurement result. In addition, it is possible to save the battery of the UE by transitioning the downlink (or uplink) bandwidth part to the inactive state in the one cell. As described above, a state transition indication for each bandwidth part or a bandwidth part switching indication for each cell may be configured and indicated by an RRC message, MAC CE, or downlink control information (DCI) of a PDCCH.

In the disclosure, the bandwidth part (BWP) may be used without distinguishing between the uplink and the downlink, and the meaning may indicate the uplink bandwidth part and the downlink bandwidth part respectively according to the context.

In the disclosure, the link may be used without distinguishing between the uplink and the downlink, and the meaning may indicate the uplink and the downlink respectively according to the context.

In the disclosure, the dormant bandwidth part (BWP) is configured or introduced for the SCell of the UE performing the carrier aggregation technique, monitoring the PDCCH in the dormant bandwidth part is not performed to reduce the battery consumption of the UE, and when data transmission is required by performing channel measurement and reporting (e.g., channel state information (CSI) or channel quality information (CQI) measurement or reporting) in the dormant bandwidth part, or performing beam measurement or beam tracking or beam operation, data transmission may be started quickly in the normal bandwidth part by switching or activating the normal bandwidth part (BWP). As described above, the dormant bandwidth part may not configure nor apply for the SpCell (PCell in MCG or PCell in SCG (or PSCell)) that need to continuously monitor signals, transmit or receive feedback, or verify and maintain synchronization or the SCell with PUCCH configured.

The disclosure provides various embodiments of PDCCH DCI-based, MAC CE-based, or RRC message-based operations to operate the aforementioned dormant bandwidth part for the SCell of the UE.

A network or a base station may configure a Spcell (Pcell and PScell) and a plurality of Scells to the UE. As described above, Spcell may indicate the Pcell when the UE communicates with one base station, and may indicate the Pcell of the master base station or the PScell of the secondary base station when the UE communicates with two base stations (master base station and secondary base station). As described above, Pcell or Pscell represents a main cell used by the UE and the base station in each MAC layer device to communicate, and a cell in which timing is performed to perform synchronization, random access is performed, HARQ ACK/NACK feedback is transmitted as a PUCCH transmission resource, and most control signals are transmitted and received. As described above, a technology in which a base station operates a plurality of Scells together with Spcells to increase transmission resources and to increase uplink or downlink data transmission resources is referred to as a carrier aggregation technology.

When the UE receives the Spcell and a plurality of SCells configured with the RRC message, the UE may be configured with the state or mode for each SCell or bandwidth part of each SCell configured by the RRC message, MAC CE, or DCI of PDCCH. As described above, the state or mode of the Scell may be configured to an active mode or an active state and a deactivated mode or a deactivated state. As described above, that the Scell is in the active mode or in the active state refers to that the UE may transmit and receive uplink or downlink data with the base station in the activated bandwidth part of the Scell, the activated normal bandwidth part, or a bandwidth part other than the activated dormant bandwidth part in the active mode or the activated Scell, monitor the PDCCH to identify the indication of the base station, perform channel measurement on the downlink of the Scell (or the activated bandwidth part of the Scell, the activated normal bandwidth part, or the bandwidth part that is not the activated dormant bandwidth part) in the active mode or active state, periodically report measurement information to the base station, and periodically transmit a pilot signal (sounding reference signal, SRS) to the base station so that the base station may measure the uplink channel.

However, the inactive mode or inactive state of the SCell may refer to that the bandwidth parts configured in the SCell of the UE are in an inactive state or the configured bandwidth parts are not activated, or data may not be transmitted/received with the base station because there is no activated bandwidth part among the configured bandwidth parts, monitoring the PDCCH for identifying the indication of the base station is not performed, measuring the channel is not performed, reporting the measurement is not performed, and the pilot signal is not transmitted.

Therefore, in order to activate the Scells in the inactive mode, the base station first configures frequency measurement configuration information to the UE through an RRC message, and the UE performs cell or frequency measurement based on the frequency measurement configuration information. In addition, the base station may activate the deactivated Scells based on frequency/channel measurement information after receiving the cell or frequency measurement report of the UE. Because of this, a lot of delay occurs when the base station activates the carrier aggregation technology to the UE and starts data transmission or reception.

In the disclosure, in order to save the battery of the UE and to start data transmission or reception quickly, a dormant mode or a dormant state for the bandwidth part of each activated Scell (or active SCell) (BWP) is proposed, or configuring or introducing a dormant bandwidth part (BWP) for each activated SCell is proposed.

In the dormant BWP in activated SCell, or when the dormant bandwidth part is activated, the UE cannot transmit and receive data with the base station, or does not monitor the PDCCH to identify the indication of the base station, or does not transmit a pilot signal, but performs channel measurements, and reports the measurement results for the measured frequency/cell/channel periodically or when an event occurs according to the base station configuration. Therefore, because the UE does not monitor the PDCCH in the dormant BWP of the activated SCell and does not transmit a pilot signal, battery life may be saved compared to the normal bandwidth part (or the bandwidth part that is not the dormant bandwidth part) of the activated SCell or when the normal bandwidth part (or the bandwidth part that is not the dormant bandwidth part) of the activated SCell is activated, and because the channel measurement report is performed unlike when the SCell is deactivated, the base station may quickly activate the normal bandwidth part of the activated SCell based on the measurement report or the measurement report of the dormant bandwidth part of the activated SCell so that the carrier aggregation technology may be used quickly, thereby reducing the transmission delay.

Accordingly, in the disclosure, that the Scell is in the active mode or in the active state refers to that the UE may transmit and receive uplink or downlink data with the base station in the activated bandwidth part of the Scell, the activated normal bandwidth part, or a bandwidth part other than the activated dormant bandwidth part in the active mode or the activated. In addition, that the Scell is in the active mode or in the active state refers to that the UE may monitor the PDCCH to identify the indication of the base station, perform channel measurement on the downlink of the Scell (or the activated bandwidth part of the Scell, the activated normal bandwidth part, or the bandwidth part other than the activated dormant bandwidth part) in the active mode or active state, periodically report measurement information to the base station, and periodically transmit a pilot signal (sounding reference signal, SRS) to the base station so that the base station may measure the uplink channel. In addition, in the disclosure, that the Scell is in the active mode or in the active state may refer to that the UE may not transmit and receive uplink or downlink data with the base station in the activated dormant bandwidth part of the Scell in the active mode or the activated Scell, or may refer to that it is possible to perform channel measurement on the downlink of the activated dormant bandwidth part of the Scell in the active mode or active state and report the measurement information to the base station periodically even though the PDCCH is not monitored to identify the indication of the base station.

In addition, in the disclosure, the dormant bandwidth part may indicate the state of the bandwidth part, or the dormant bandwidth part may be used as the name of a logical concept indicating a specific bandwidth part. Accordingly, the dormant bandwidth part may be activated, deactivated, or switched. For example, the indication to switch the second bandwidth part activated in the first SCell to the dormant bandwidth part, or the indication to transition the first SCell to dormant or dormant mode, or the indication to activate the dormant bandwidth part of the first SCell may be interpreted as the same meaning.

In addition, in the disclosure, the normal bandwidth part may represent bandwidth parts that are not dormant bandwidth parts among the bandwidth parts configured in each SCell of the UE by RRC message, uplink or downlink data may be transmitted and received with the base station in the normal bandwidth part, it is possible to monitor the PDCCH to identify the indication of the base station, perform channel measurement for the downlink, and periodically report measurement information to the base station, and the UE may periodically transmit a pilot signal (sounding reference signal, SRS) to the base station so that the base station may measure the uplink channel. In addition, the normal bandwidth part may indicate an initial active bandwidth part, a default bandwidth part, an initial active bandwidth part, or initial bandwidth part activated from dormancy.

In addition, among the bandwidth parts configured in each Scell of the UE, only one dormant bandwidth part may be configured and may be configured for the downlink. As another method, one dormant bandwidth part may be configured for uplink or downlink among bandwidth parts configured for each Scell of the UE.

Figure 1E:
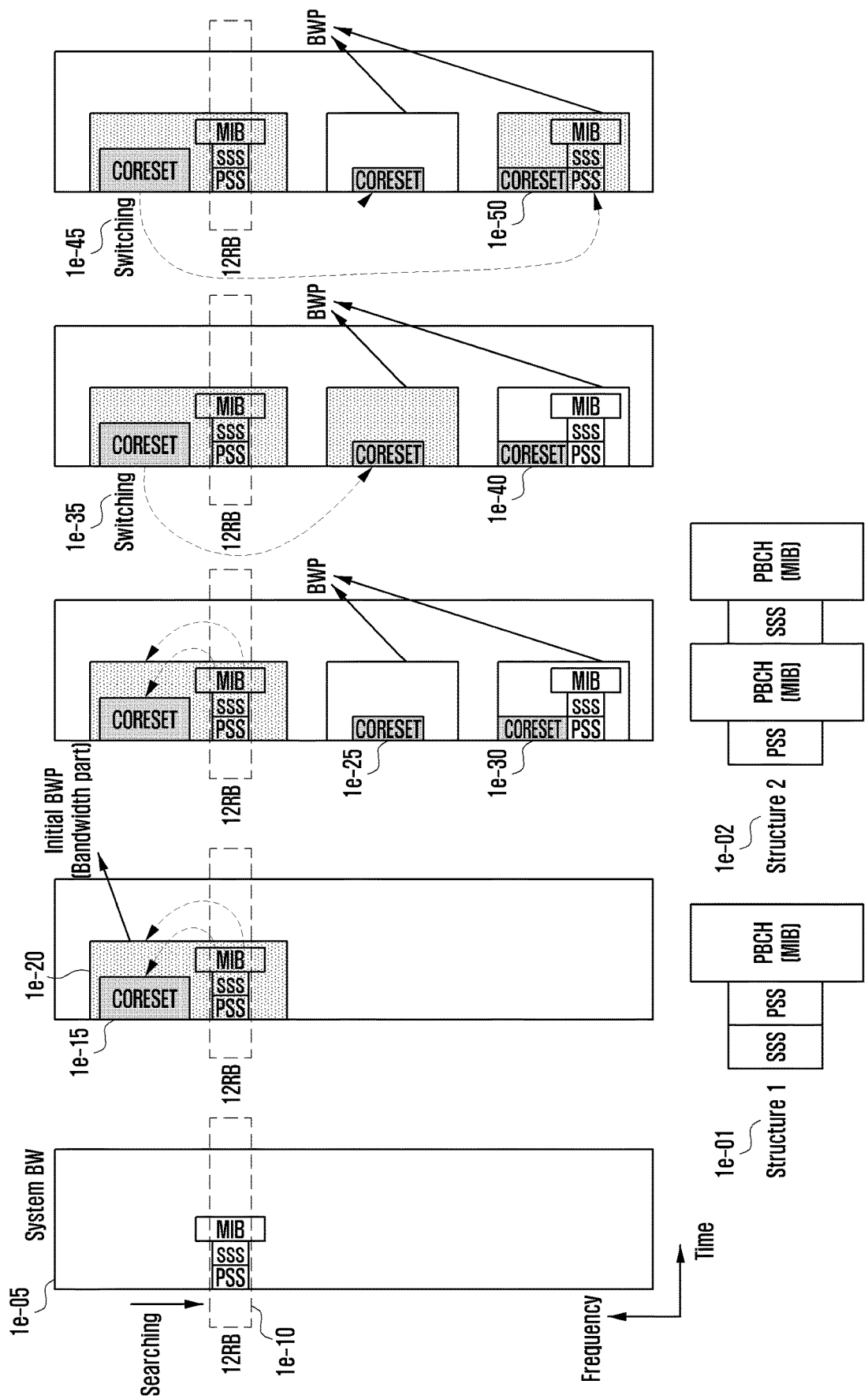
FIG. 1E is a diagram illustrating a procedure of providing a service to a UE by efficiently using a very wide frequency bandwidth in a next-generation mobile communication system of the disclosure.

FIG. 1E is a diagram illustrating a procedure for providing a service to a UE by efficiently using a very wide frequency bandwidth in a next-generation mobile communication system according to the disclosure.

In FIG. 1E, it is described how the next-generation mobile communication system efficiently uses a very wide frequency bandwidth to provide services to UEs having different abilities (capabilities or categories) and to save battery life.

One cell that the base station provides services may service a very wide frequency band such as 1e-05. However, in order to provide a service to UEs having different capabilities, the wide frequency band may be divided into a plurality of bandwidth parts and managed as one cell.

First, the UE initially powered on may search the entire frequency band provided by the operator public land mobile network (PLMN) in a predetermined resource block unit (for example, in 12 resource block (RB) units). For example, the UE may start to search the entire system bandwidth for a primary synchronization sequence (PSS)/secondary synchronization sequence (SSS) in the entire system bandwidth in units of the resource block (1e-10). If the signals are detected while searching for PSS/SSS 1e-01 or 1e-02 in units of the resource block, the signals may be read and interpreted (decoded) to identify boundaries between a subframe and a radio frame. Accordingly, subframes may be distinguished in units of 1 ms, and the UE synchronizes the downlink signal with the base station. As described above, a resource block (RB) may be defined as a two-dimensional unit with the size of a predetermined frequency resource and a predetermined time resource. For example, it may be defined as 1 ms unit as a time resource and 12 subcarriers (1 carrier×15 kHz=180 kHz) as a frequency resource. As described above, when the UE completes synchronization, the UE may identify the master system information block (MIB) or minimum system information (MSI) to identify the information of the control resource set (CORESEST) and identify the initial access bandwidth part (BWP) information 1e-15 and 1e-20. As described above, the CORESET information refers to a location of a time/frequency transmission resource through which a control signal is transmitted from the base station, and, for example, indicates a resource location through which a PDCCH channel is transmitted. The CORESET information is information indicating where the first system information (system information block 1, SIB1) is transmitted, and indicates from which frequency/time resource the PDCCH is transmitted. As described above, when the UE reads the first system information, the UE may identify information on the initial bandwidth part (initial BWP). As described above, when the UE completes synchronization of the downlink signal with the base station and is ready to receive the control signal, the UE may perform a random access procedure in the initial bandwidth part (initial BWP) of the cell on which the UE camps on, request RRC connection configuration, and receive an RRC message to perform RRC connection configuration.

In the RRC connection configuration, a plurality of bandwidth parts may be configured for each cell (Pcell or Pscell or Spcell or Scell). A plurality of bandwidth parts may be configured for downlink in one cell, and a plurality of bandwidth parts may be configured for uplink separately.

The plurality of bandwidth parts may be indicated and configured as a BWP identifier to be used as an initial BWP, default BWP, first active BWP, dormant BWP, or first active BWP from dormant.

As described above, the initial BWP may be used as the bandwidth part determined by the cell-specific level that exists one per cell, and the UE accessing the cell for the first time may configure a connection to the cell through a random access procedure, or the initial BWP may be used as a bandwidth part in which the UE that has configured the connection may perform synchronization. In addition, the base station may configure the initial downlink BWP to be used in the downlink and the initial uplink BWP to be used in the uplink for each cell, respectively. In addition, the configuration information for the initial bandwidth part may be broadcasted in the first system information (system information 1, SIB1) indicated by CORESET, and the base station may reconfigure the RRC message to the UE that has accessed the connection. In addition, the initial BWP may be used by designating 0 of the bandwidth part identifier in the uplink and downlink, respectively. That is, all UEs accessing the same cell may use the same initial bandwidth part by designating the bandwidth part with the same bandwidth part identifier 0. This is because when performing the random access procedure, the base station may transmit a random access response (RAR) message to the initial bandwidth part that all UEs may read, so there may be an advantage in facilitating the contention-based random access procedure.

As described above, the first active BWP may be configured differently for each UE (UE specific), and may be indicated by designating a bandwidth part identifier among a plurality of bandwidth parts. The first active bandwidth part may be configured for downlink and uplink, respectively, and may be configured as first active downlink BWP and first active uplink BWP, respectively, as a bandwidth part identifier. The first active bandwidth part may be used to indicate which bandwidth part is to be initially activated and used when a plurality of bandwidth parts are configured in one cell. For example, when a Pcell or Pscell and a plurality of Scells are configured in the UE and a plurality of bandwidth parts are configured in each Pcell, Pscell or Scell, and if the Pcell, Pscell, or Scell is activated, the UE may activate and use the first active BWP among a plurality of bandwidth parts configured in the Pcell, Pscell or Scell. For example, the first active downlink BWP may be activated and used for the downlink and the first active uplink BWP may be activated and used for the uplink.

As described above, the operation of the UE switching the current or activated downlink bandwidth part for the Scell and activating the downlink bandwidth part as the first activated downlink bandwidth part (or the bandwidth part configured or indicated by the RRC message) or switching the current or activated uplink bandwidth part for the Scell and activating the uplink bandwidth part as the first active uplink bandwidth part (or the bandwidth part configured or indicated by the RRC message) may be performed when the Scell or the bandwidth part is in an inactive state and receives an instruction to activate the Scell or the bandwidth part through an RRC message, MAC control information, or DCI. In addition, it may be performed when the UE receives an instruction to transition the Scell or bandwidth part to the dormant state through an RRC message, MAC control information, or DCI. This is because when activating the Scell or bandwidth part, the current or activated downlink bandwidth part is switched to activate the first active downlink bandwidth part (or the bandwidth part configured or indicated by the RRC message) or the uplink bandwidth part is switched to activate the first active uplink bandwidth part (or the bandwidth part configured or indicated by the RRC message), so that the base station may effectively use the carrier aggregation technology only when the frequency/channel is measured and reported for the first active downlink/uplink bandwidth part even when the channel measurement report is performed in the dormant state.

As described above, the default BWP may be configured differently for each UE (UE specific), and may be indicated by designating a bandwidth part identifier among a plurality of bandwidth parts. It may be featured in that the default bandwidth part is configured only for the downlink. The default bandwidth part may be used as a bandwidth part to which an activated bandwidth part among a plurality of downlink bandwidth parts may fall back after a predetermined time. For example, BWP inactivity timer may be configured for each cell or for each bandwidth part with an RRC message, and the timer is started or restarted when data transmission/reception occurs in an activated bandwidth part other than the default bandwidth part, or may be started or restarted when the activated bandwidth part is switched to another bandwidth part. When the timer expires, the UE may fallback or switch the downlink bandwidth part activated in the cell to the default bandwidth. As described above, switching may refer to a procedure of inactivating a currently activated bandwidth part and activating a bandwidth part instructed to be switched, and the switching may be triggered by an RRC message, a MAC control element, or L1 signaling (downlink control information (DCI) of PDCCH). As described above, the switching may be triggered by indicating a bandwidth part to be switched or activated, and the bandwidth part may be indicated by a bandwidth part identifier (e.g., 0, 1, 2, 3, or 4).

The reason why the default bandwidth part is applied and used only for downlink is that the base station may facilitate scheduling of the base station by causing the UE to fall back to the default bandwidth part after a predetermined time has elapsed for each cell to receive an instruction (e.g., DCI of PDCCH) from the base station. For example, if the base station configures the default bandwidth part of UEs accessing one cell as the initial bandwidth part, the base station may continue to perform the scheduling instruction only in the initial bandwidth part after a certain period of time. If the default bandwidth part is not configured in the RRC message, the initial bandwidth part may be regarded as a default bandwidth part, and may fall back to the initial bandwidth part when the bandwidth part deactivation timer expires.

As another method, in order to increase the implementation freedom of the base station, a default bandwidth part for the uplink may be defined and configured, and used like the default bandwidth part of the downlink.

As described above, the dormant BWP may mean a bandwidth part that is a dormant mode of an activated SCell or a dormant BWP in an activated SCell. When the dormant bandwidth part is activated, the UE may not transmit and receive data with the base station, or does not monitor the PDCCH to identify the instruction of the base station, or does not transmit a pilot signal, but performs channel measurements, and reports the measurement results for the measured frequency/cell/channel periodically or when an event occurs according to the base station configuration. Therefore, because the UE does not monitor the PDCCH in the dormant BWP of the activated SCell and does not transmit a pilot signal, battery life may be saved compared to the normal bandwidth part (or the bandwidth part that is not the dormant bandwidth part) of the activated SCell or when the normal bandwidth part (or the bandwidth part that is not the dormant bandwidth part) of the activated SCell is activated. In addition, because the UE performs the channel measurement report unlike when the SCell is deactivated, the base station may quickly activate the normal bandwidth part of the activated SCell based on the measurement report or the measurement report of the dormant bandwidth part of the activated SCell so that the carrier aggregation technology may be used quickly, thereby reducing the transmission delay.

Figure 1F:
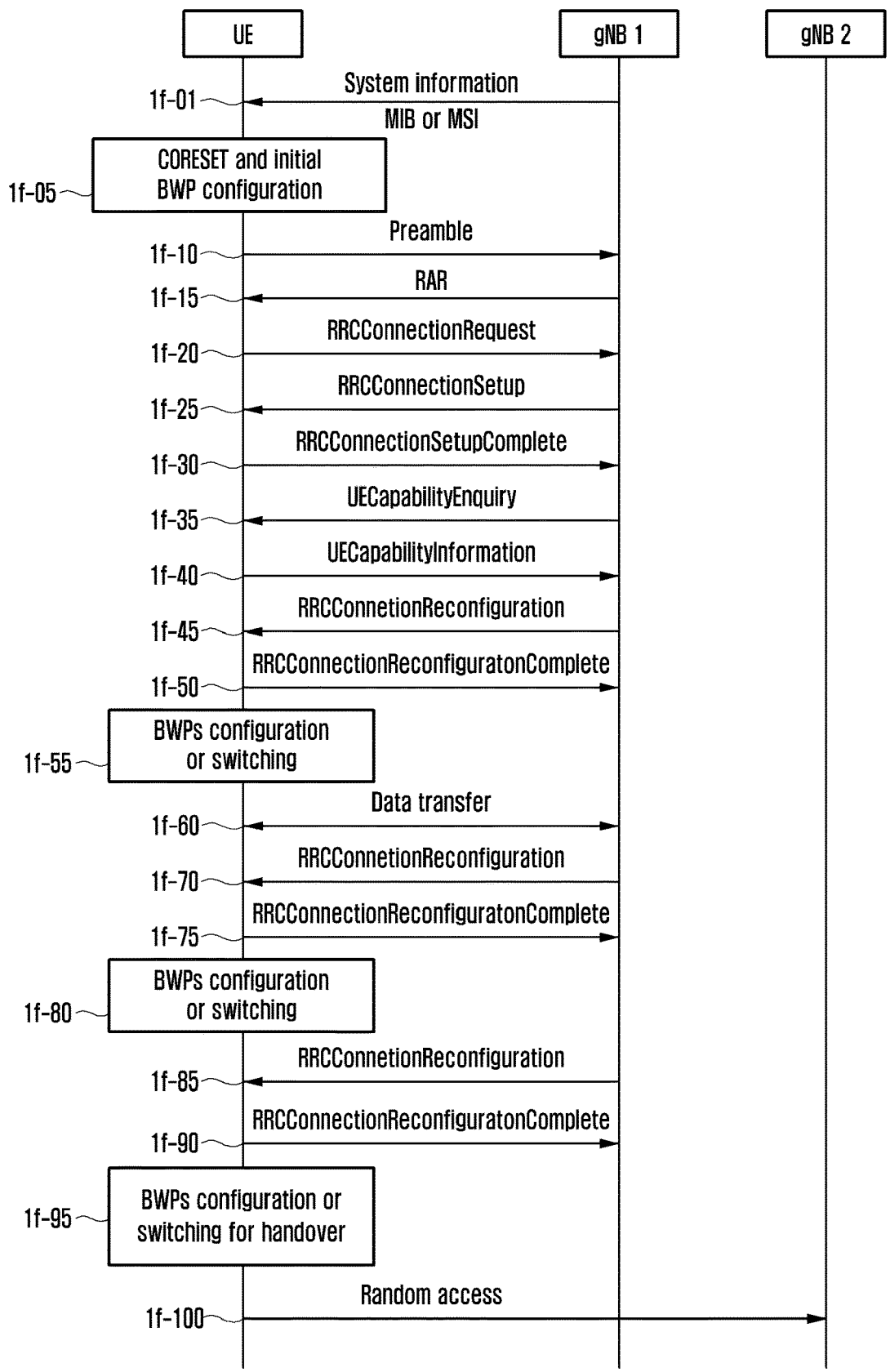
FIG. 1F is a diagram illustrating a procedure in which a UE switches from an RRC idle mode to an RRC connected mode in a next-generation mobile communication system of the disclosure.

The first active bandwidth part (or the first active non-dormant bandwidth part or the bandwidth part configured or indicated by the RRC message) activated in the dormant state or by being switched from the dormant bandwidth part may be a bandwidth part to be activated by switching the current or activated bandwidth part of the SCell activated by the UE according to a corresponding indication, or a bandwidth part to be activated from a dormant state set in an RRC message when the UE is operating the bandwidth part of one activated SCell as the dormant bandwidth part, when the activated bandwidth part in the activated SCell is the dormant bandwidth part, when switched to the dormant bandwidth part in the SCell, when the UE is instructed to switch the bandwidth part of the activated SCell from the dormant bandwidth part to the normal bandwidth part (or the bandwidth part that is other than the dormant bandwidth part) by the DCI or MAC CE or RRC message of the PDCCH from the base station, when the UE is instructed to switch or convert the activated bandwidth part to the normal bandwidth part in the dormant bandwidth part, or when instructed to switch or convert or activate the active bandwidth part to the normal bandwidth part (e.g., the first active bandwidth part that is activated from dormancy) in the dormant bandwidth part, FIG. 1F is a diagram illustrating a procedure for a UE to switch from an RRC idle mode to an RRC connected mode in the next-generation mobile communication system according to the disclosure, and specifically, provides a method of configuring a plurality of bandwidth parts (BWPs) and configuring a default BWP or a first active BWP.

One cell, in which the base station provides a service, may service a very wide frequency band. First, the UE may search the entire frequency band provided by the operator (PLMN) in units of a certain resource block (e.g., in units of 12 RBs). That is, the UE may start searching the entire system bandwidth for a primary synchronization sequence (PSS)/secondary synchronization sequence (SSS) in units of the resource blocks. If the signals are detected while searching for the PSS/SSS in units of the resource blocks, the boundaries between a sub-frame and a radio transmission resource frame may be identified by reading and analyzing (decoding) the signals. As described above, when the synchronization is completed, the UE may read system information of the cell currently camped on. That is, the initial bandwidth part (BWP) information may be identified by identifying the master system information block (MIB) or minimum system information (MSI) to identify the information of the control resource set (CORESEST) and by reading the system information (1*f*-01 and 1*f*-05). As described above, the CORESET information refers to a location of a time/frequency transmission resource through which a control signal is transmitted from a base station, and, for example, indicates a resource location through which a PDCCH channel is transmitted.

As described above, when the UE completes synchronization of the downlink signal with the base station and is ready to receive the control signal, the UE may perform a random access procedure in the initial bandwidth part, receive a random access response, request RRC connection establishment, and receive an RRC message to perform RRC connection configuration (1*f*-10, 1*f*-15, 1*f*-20, 1*f*-25, and 1*f*-30).

When the basic RRC connection configuration is completed as described above, the base station may transmit an RRC message inquiring about the UE capability to the UE to identify the UE capability (UECapabilityEnquiry, 1*f*-35). In another method, the base station may ask the MME or AMF about the UE capability to identify the UE capability. This is because the MME or AMF may have stored the capability information of the UE if the MME or AMF has previously accessed the UE. If there is no UE capability information desired by the base station, the base station may request UE capability from the UE.

The reason why the base station transmits the RRC message to the UE to identify the UE capability is to identify the capability of the UE and, for example, to determine what frequency band the UE may read or the frequency band area that the UE may read. In addition, after identifying the capability of the UE, the base station may configure an appropriate bandwidth part (BWP) to the UE. When the UE receives the RRC message inquiring about the UE capability as described above, in response to this, the UE may indicate the range of the bandwidth supported by the UE or the range to which the bandwidth is supported from the current system bandwidth as an offset from the reference center frequency, may directly indicate the start point and the end point of the supported frequency bandwidth, or may indicate as the center frequency and the bandwidth (1*f*-40).

As described above, the bandwidth part may be configured with an RRCSetup message, an RRCResume message 1*f*-25, or an RRCReconfiguration message 1*f*-45 of RRC connection setup. The RRC message may include configuration information for a Pcell, Pscell, or a plurality of Scells, and a plurality of bandwidth parts may be configured for each cell (PCell, Pscell, or Scell). When configuring a plurality of bandwidth parts for each cell, a plurality of bandwidth parts to be used in the downlink of each cell may be configured, In the case of the FDD system, a plurality of bandwidth parts to be used in the uplink of each cell may be configured separately from the downlink bandwidth parts, and in the case of the TDD system, a plurality of bandwidth parts to be commonly used in the downlink and the uplink of each cell may be configured.

The information for configuring the bandwidth part of each cell (PCell, Pscell, or Scell) may include some of the following information:
Downlink bandwidth part configuration information of the cell
>> Initial downlink BWP configuration information
>> A plurality of bandwidth part configuration information and a bandwidth part identifier (BWP ID) corresponding to each bandwidth part
>> Initial state configuration information of the downlink bandwidth part of the cell (e.g., active state, dormant state, or inactive state)>
>> Bandwidth part identifier indicating the first active downlink BWP
>> Bandwidth part identifier indicating default BWP
>> Configuration information for PDCCH monitoring for each bandwidth part. For example, CORESET information, search space resource information, or PDCCH transmission resource, period, and subframe number information.
>> A bandwidth part identifier indicating a dormant bandwidth part or a 1-bit indicator indicating a dormant bandwidth part for each bandwidth part in the bandwidth part configuration information
>> A bandwidth part identifier indicating the first active bandwidth part activated from dormancy or a 1-bit indicator indicating the first active bandwidth part activated from dormancy for each bandwidth part in the bandwidth part configuration information
>> Bandwidth part deactivation timer configuration and timer value
Uplink bandwidth part configuration information of the cell:
>> Initial uplink BWP configuration information
>> A plurality of bandwidth part configuration information and a bandwidth part identifier (BWP ID) corresponding to each bandwidth part
>> Initial state configuration information of the uplink bandwidth part of the cell (e.g., active state, dormant state, or inactive state)
>> A bandwidth part identifier indicating a dormant bandwidth part or a 1-bit indicator indicating a dormant bandwidth part for each bandwidth part in the bandwidth part configuration information
>> A bandwidth part identifier indicating the first active uplink BWP The initial bandwidth part (initial BWP), the default bandwidth part (default BWP), or the first active bandwidth part (first active BWP) configured above may be used for the following purposes, and may operate as follows according to the purpose.

As described above, the initial BWP may be used as the bandwidth part determined by the cell-specific level that exists one per cell, and the UE accessing the cell for the first time may configure a connection to the cell through a random access procedure, or the initial BWP may be used as a bandwidth part in which the UE that has configured the connection may perform synchronization. In addition, the base station may configure the initial downlink BWP to be used in the downlink and the initial uplink BWP to be used in the uplink for each cell, respectively. In addition, the configuration information for the initial bandwidth part may be broadcasted in the first system information (system information 1, SIB1) indicated by CORESET, and the base station may reconfigure the RRC message to the UE that has accessed the connection. In addition, the initial BWP may be used by designating 0 of the bandwidth part identifier in the uplink and downlink, respectively. All UEs accessing the same cell may use the same initial bandwidth part by designating the same bandwidth part identifier 0 This is because when performing the random access procedure, the base station may transmit a random access response (RAR) message to the initial bandwidth part that all UEs may read, so there may be an advantage in facilitating the contention-based random access procedure.

As described above, the first active BWP may be configured differently for each UE (UE specific), and may be indicated by designating a bandwidth part identifier among a plurality of bandwidth parts. The first active bandwidth part may be configured for downlink and uplink, respectively, and may be configured as first active downlink BWP and first active uplink BWP, respectively, as a bandwidth part identifier. The first activated bandwidth part may be used to indicate which bandwidth part is to be initially activated and used when a plurality of bandwidth parts are configured in one cell. For example, when a Pcell or Pscell and a plurality of Scells are configured in the UE and a plurality of bandwidth parts are configured in each Pcell, Pscell or Scell, and if the Pcell, Pscell, or Scell is activated, the UE may activate and use the first active BWP among a plurality of bandwidth parts configured in the Pcell, Pscell or Scell. For example, the first active downlink BWP may be activated and used for the downlink and the first active uplink BWP may be activated and used for the uplink.

The operation in which the UE switches the current or activated downlink bandwidth part for the Scell and activates it as the first active downlink bandwidth part (or the bandwidth part configured or indicated by the RRC message) or switches the current or activated uplink bandwidth part and activates the first active uplink bandwidth part (or the bandwidth part configured or indicated by the RRC message) may be performed when the Scell or a bandwidth part of the activated Scell is in an inactive or dormant state and is instructed to activate, or when an instruction to switch or activate from the inactive or dormant bandwidth part to the normal bandwidth part is received through an RRC message, MAC control information, or DCI of PDCCH. In addition, when the UE receives an instruction to transition the activated Scell or bandwidth part to the dormant state or to switch to or activate the dormant bandwidth part through an RRC message, MAC control information, or DCI of PDCCH, the UE may switch the bandwidth part to the dormant bandwidth part or activate the dormant bandwidth part or make the bandwidth part dormant.

As described above, switching to the dormant or dormant bandwidth part or activation of the dormant bandwidth part may refer to performing the operation proposed in the dormant state in the disclosure. For example, it is possible to measure and report the channel for the downlink bandwidth part (or dormant bandwidth part) to the base station without performing PDCCH monitoring. As another method, when the activated Scell or bandwidth part is activated or switched to the normal bandwidth part, because the downlink bandwidth part is switched to be activated as the first activated downlink bandwidth part and the uplink bandwidth part is switched to be activated as the first activated uplink bandwidth part, the dormant bandwidth part may be configured as the first active downlink or uplink bandwidth part or a default bandwidth part. As described above, the default BWP may be configured differently for each UE (UE specific), and may be indicated by designating a bandwidth part identifier among a plurality of bandwidth parts. The default bandwidth part may be configured only for downlink. The default bandwidth part may be used as a bandwidth part to which an activated bandwidth part among a plurality of downlink bandwidth parts may fall back after a predetermined time. For example, a BWP inactivity timer may be configured for each cell or for each bandwidth part with an RRC message, and the timer is started or restarted when data transmission/reception occurs in an activated bandwidth part other than the default bandwidth part, or may be started or restarted when the activated bandwidth part is switched to another bandwidth part. When the timer expires, the UE may fall back or switch the downlink bandwidth part activated in the cell to the default bandwidth. As described above, switching may refer to a procedure of inactivating a currently activated bandwidth part and activating a bandwidth part indicated to be switched. The switching may be triggered by an RRC message, a MAC control element, or L1 signaling (DCI of PDCCH). As described above, the switching may be triggered by indicating a bandwidth part to be switched or activated, and the bandwidth part may be indicated by a bandwidth part identifier (e.g., 0, 1, 2, 3, or 4).

The reason why the default bandwidth part is applied and used only for downlink is that the base station may facilitate scheduling of the base station by causing the UE to fall back to the default bandwidth part after a predetermined time has elapsed for each cell to receive an instruction (e.g., DCI of PDCCH) from the base station. For example, if the base station configures the default bandwidth part of UEs accessing one cell as the initial bandwidth part, the base station may continue to perform the scheduling instruction only in the initial bandwidth part after a certain period of time. If the default bandwidth part is not configured in the RRC message, the initial bandwidth part may be regarded as a default bandwidth part, and fall back to the initial bandwidth part when the bandwidth part deactivation timer expires.

As another method, in order to increase the implementation freedom of the base station, a default bandwidth part even for the uplink may be defined and configured, and used like the default bandwidth part of the downlink.

As described above, the dormant BWP may mean a bandwidth part that is a dormant mode of an activated SCell or a dormant BWP in an activated Scell, or when the dormant bandwidth part is activated, the UE may not transmit and receive data with the base station. Alternatively, the UE does not monitor the PDCCH to identify the indication of the base station, or does not transmit a pilot signal, but performs channel measurements, and may report the measurement results for the measured frequency/cell/channel periodically or when an event occurs according to the base station configuration. Therefore, because the UE does not monitor the PDCCH in the dormant BWP of the activated SCell and does not transmit a pilot signal, battery life may be saved compared to the normal bandwidth part (or the bandwidth part that is not the dormant bandwidth part) of the activated SCell or when the normal bandwidth part (or the bandwidth part that is not the dormant bandwidth part) of the activated SCell is activated. In addition, because the UE performs the channel measurement report unlike when the SCell is deactivated, the base station may quickly activate the normal bandwidth part of the activated SCell based on the measurement report or the measurement report of the dormant bandwidth part of the activated SCell so that the carrier aggregation technology may be used quickly, thereby reducing the transmission delay.

As described above, when the UE is instructed by the base station to switch the bandwidth part of the activated SCell from the dormant bandwidth part to the normal bandwidth part (or the bandwidth part that is not the dormant bandwidth part) in a DCI or MAC CE or RRC message of the PDCCH when the bandwidth part of one activated SCell of the UE is operated as the dormant bandwidth part or when the activated bandwidth part in the activated SCell is the dormant bandwidth part or when the SCell switches to the dormant bandwidth part, or when the UE is instructed to switch or convert the active bandwidth part to the normal bandwidth part in the dormant bandwidth part, or when the UE is instructed to switch or convert or activate the active bandwidth part to the normal bandwidth part (e.g., the first active bandwidth part that is activated from dormancy) in the dormant bandwidth part, the bandwidth part of the activated SCell that should be switched or activated by the UE in accordance with the instruction may be the first active bandwidth part being activated from dormancy configured in the RRC message.

In the disclosure, the meaning of switching the first bandwidth part to the second bandwidth part may be interpreted as the meaning of activating the second bandwidth part, or may be interpreted as meaning that the activated first bandwidth part is deactivated and the second bandwidth part is activated.

In addition, as described above, in the RRCSetup message for RRC connection setup, RRCResume message 1*f*-25, or RRCReconfiguration message 1*f*-45, a state transition timer may be configured so that the UE itself can perform the state transition even without receiving the RRC message, MAC control information, or an indication through the DCI on the PDCCH from the base station. For example, if the cell deactivation timer (ScellDeactivationTimer) is configured for each SCell and the cell deactivation timer expires, the SCell may be transitioned to a deactivate state. Alternatively, a downlink (or uplink) bandwidth part dormant timer (DLBWPHibernationTimer or ULBWPHibernationTimer) may be configured for each SCell or for each bandwidth part of the SCell, or a cell dormant timer (ScellHibernationTimer) may be configured for each SCell, and in case that the cell dormant timer or the downlink (or uplink) bandwidth part dormant timer expires, the SCell or the downlink (or uplink) bandwidth part may be transitioned to a dormant state or may be switched to a dormant bandwidth part. For example, it may be featured in that the SCell or the downlink (or uplink) bandwidth part being in the active state when the cell dormant timer or the downlink (or uplink) bandwidth part dormant timer expires is transitioned to the dormant state or is switched to the dormant bandwidth part, but the SCell or the downlink (or uplink) bandwidth part being in a deactivated state or in the dormant state is not transitioned to the dormant state or to the dormant bandwidth part. In addition, the bandwidth part dormant timer may start when it receives an instruction to switch to the bandwidth part or an instruction to activate the bandwidth part through the RRC message or MAC CE or DCI of PDCCH, and may stop when it receives an instruction to switch the bandwidth part to the dormant bandwidth part or an instruction to make the bandwidth part dormant or an instruction to activate the dormant bandwidth part through the RRC message or the MAC CE or the DCI of the PDCCH. In addition, the dormant SCell or downlink (uplink) dormant bandwidth part may be transitioned to the deactivated state by configuring the dormant cell deactivation timer (dormantScellDeactivationTimer) or the dormant or downlink (uplink) dormant bandwidth part deactivation timer (dormantDLDeactivationTimer or dormantULDeactivationTimer) for each SCell or downlink (or uplink) bandwidth part. In addition, it may be featured in that only the SCell or the downlink (or uplink) dormant bandwidth part being in the dormant state when the dormant cell deactivation timer or the dormant or the downlink (or uplink) dormant bandwidth part deactivation timer expires is transitioned to the deactivated state, but the SCell or the downlink (or uplink) bandwidth part being in the activated state or in the deactivated state is not transitioned to the deactivated state. In addition, the dormant bandwidth part dormant timer may start when it receives an instruction to switch to the dormant bandwidth part or an instruction to make the bandwidth part dormant or an instruction to activate the dormant bandwidth part through the RRC message or the MAC CE or the DCI of the PDCCH, and may stop when it receives an instruction to deactivate or activate the bandwidth part or the SCell or an instruction to activate a general bandwidth part (e.g., bandwidth part that is not the dormant bandwidth part configured through the RRC) through the RRC message or the MAC CE or the DCI of the PDCCH. As described above, it may be featured in that if the cell deactivation timer (ScellDeactivationTimer) (or downlink (or uplink) bandwidth part dormant timer) and the cell dormant timer (ScellHibernationTimer) (or downlink (or uplink) dormant bandwidth part deactivation timer) are configured together, the cell dormant timer (ScellHibernationTimer) (or downlink (or uplink) dormant bandwidth part dormant timer) is prioritized. That is, if the cell dormant timer (ScellHibernationTimer) (or downlink (or uplink) bandwidth part dormant timer) is configured, the corresponding SCell or downlink (or uplink) bandwidth part is not deactivated even when the cell deactivation timer (ScellDeactivationTimer) (or downlink (or uplink) dormant bandwidth part deactivation timer) expires. In other words, it is featured that if the cell dormant timer (or downlink (or uplink) bandwidth part dormant timer) is configured, the SCell or downlink (or uplink) bandwidth part is first transitioned from the active state to the dormant state or is switched to the dormant bandwidth part by means of the expiration of the timer, and the cell or the bandwidth part having been transitioned to the dormant state by means of the expiration of the timer for deactivating the dormant cell or bandwidth part is transitioned again to the deactivated state step by step. Accordingly, in case that the cell dormant timer or the bandwidth part dormant timer is configured, the cell deactivated timer or the dormant bandwidth part deactivation timer does not exert an influence on the SCell or downlink (or uplink) bandwidth part state transition, and in case that the cell dormant timer or the bandwidth part dormant timer is configured although the cell deactivation timer or the dormant bandwidth part deactivation timer expires, the SCell or downlink (or uplink) bandwidth part is not immediately transitioned to the deactivated state.

In case that the cell deactivation timer (or the downlink (or uplink) bandwidth part dormant timer) is not configured in the RRC message, the UE may consider that the cell deactivation timer (or the downlink (or uplink) bandwidth part dormant timer) has been set to an infinity value.

In addition, as described above, in the RRCSetup message, the RRCResume message 1*f*-25, or the RRCReconfiguration message 1*f*-45 for RRC connection setup, frequency measurement configuration information and frequency measurement gap configuration information may be configured and frequency measurement object information may be included. In addition, as described above, in the RRCSetup message, the RRCResume message 1*f*-25, or the RRCReconfiguration message 1*f*-45 for the RRC connection setup, the power saving mode of the UE may be configured with the function of reducing power consumption when the UE receives the MBS service, configuration information such as discontinuous reception (DRX) cycle, offset, on-duration period (a period in which the UE needs to monitor the PDCCH) or time information, or time information or short time period information on when monitoring or detecting the PDCCH from the base station before the on-duration period in the DRX cycle may be configured. If the UE in the power saving mode is configured as described above, the UE may set the DRX cycle and detect a wake-up signal (WUS) in the period configured to monitor the PDCCH of the base station before the on-duration period as described above, and with the DCI of the PDCCH of the WUS signal, the base station may indicate to the UE whether to skip (or not perform) or perform PDCCH monitoring in the immediately following on-duration period. Although the UE may always monitor the PDCCH in the on-duration period, the base station with the WUS signal as described above may instruct the UE not to monitor the PDCCH in the on-duration period to save battery consumption of the UE.

When the RRC connection configuration is completed as described above, the UE may configure a plurality of bandwidth parts according to the instruction configured with the RRC message. In addition, in order to save battery life, one or a small number of bandwidths among the plurality of configured bandwidth parts may be activated. For example, one bandwidth part to be activated may be indicated. In addition, the base station may instruct the switch to a new bandwidth part from the initial access bandwidth part by instructing activation of the bandwidth part with an RRC message or with MAC control information (MAC CE) or L1 signaling (PHY layer device control signal such as DCI of PDCCH). As another method, it is possible to define new bitmap information in the DCI of the PDCCH and indicate whether to activate, be dormant, or deactivate. As another method, the bitmap may indicate whether to activate the normal bandwidth part (e.g., the first activation bandwidth part to activate from dormancy) or the dormant bandwidth part or whether to switch to the dormant bandwidth part or switch to the bandwidth part. Because there may be many other newly accessing users in the initial access bandwidth, it may be more advantageous to allocate a new bandwidth part and separately manage the connected users in terms of scheduling. This is because the initial access bandwidth part is not configured for each UE, but may be shared and used by all UEs. In addition, in order to reduce signaling overhead, a default bandwidth part may be dynamically indicated by the MAC control information, L1 signaling, or system information.

In the disclosure, when the base station and the network supports the MBS service to the UE, in the system information, the RRC message (e.g., RRCSetup, RRCResume, RRCReconfiguration, RRCRelease, or a newly defined RRC message), or the control message for the MBS channel, the bearer configuration information for the MBS service or the transmission resource information (e.g., time resource, frequency resource, bandwidth, frequency, bandwidth part (or bandwidth part identifier), bandwidth, subcarrier interval, transmission resource period, RNTI identifier for each MBS service, or logical channel identifier for each MBS service) for the MBS service may be configured to the UE. As another method, the bearer configuration information for the MBS service may be reserved or designated as a default configuration. As described above, the bearer for the MBS service may be considered as a multicast bearer or a unicast bearer from the viewpoint of the base station or the UE. As another method, by configuring a separate identifier or indicator in the system information or RRC message (e.g., RRCSetup, RRCResume, RRCReconfiguration, RRCRelease, or a newly defined RRC message) or the control message for the MBS channel, a multicast bearer for the MBS service or a unicast bearer (or broadcast bearer) for the MBS service may be distinguished and configured to the UE.

In the disclosure, the downlink shared channel (DL-SCH) described in the disclosure may include or indicate a common control channel (CCCH), a dedicated control channel (DCCH), or a dedicated traffic channel (DTCH).

The bearer, multicast bearer, or unicast bearer for the MBS service described in the disclosure may be interpreted as a multicast bearer or unicast bearer.

In the disclosure, bearer may refer to including SRB and DRB, SRB refers to signaling radio bearer, and DRB refers to data radio bearer. The SRB is mainly used to transmit and receive RRC messages of the RRC layer device, and DRB is mainly used to transmit and receive user layer device data. In addition, UM DRB refers to a DRB using an RLC layer device operating in an unacknowledged mode (UM) mode, and AM DRB refers to a DRB using an RLC layer device operating in an acknowledged mode (AM) mode.

MBS data for the MBS service described in the disclosure may be interpreted as MBS channel configuration information or MBS control plane data for bearer configuration or service configuration or MBS user plane data supporting the MBS service.

The radio network temporary identifier (RNTI) described in the disclosure is the identifier to be used to identify whether the RNTI value is an RNTI value set in the UE or an RNTI value corresponding to the PDCCH that the UE intends to receive and to determine whether the PDCCH is a PDCCH that the UE should read by monitoring, by the UE, the physical downlink control channel (PDCCH) in the PHY layer device, and descrambling or checking the cyclic redundancy check (CRC) of the received PDCCH.

Figure 1G:
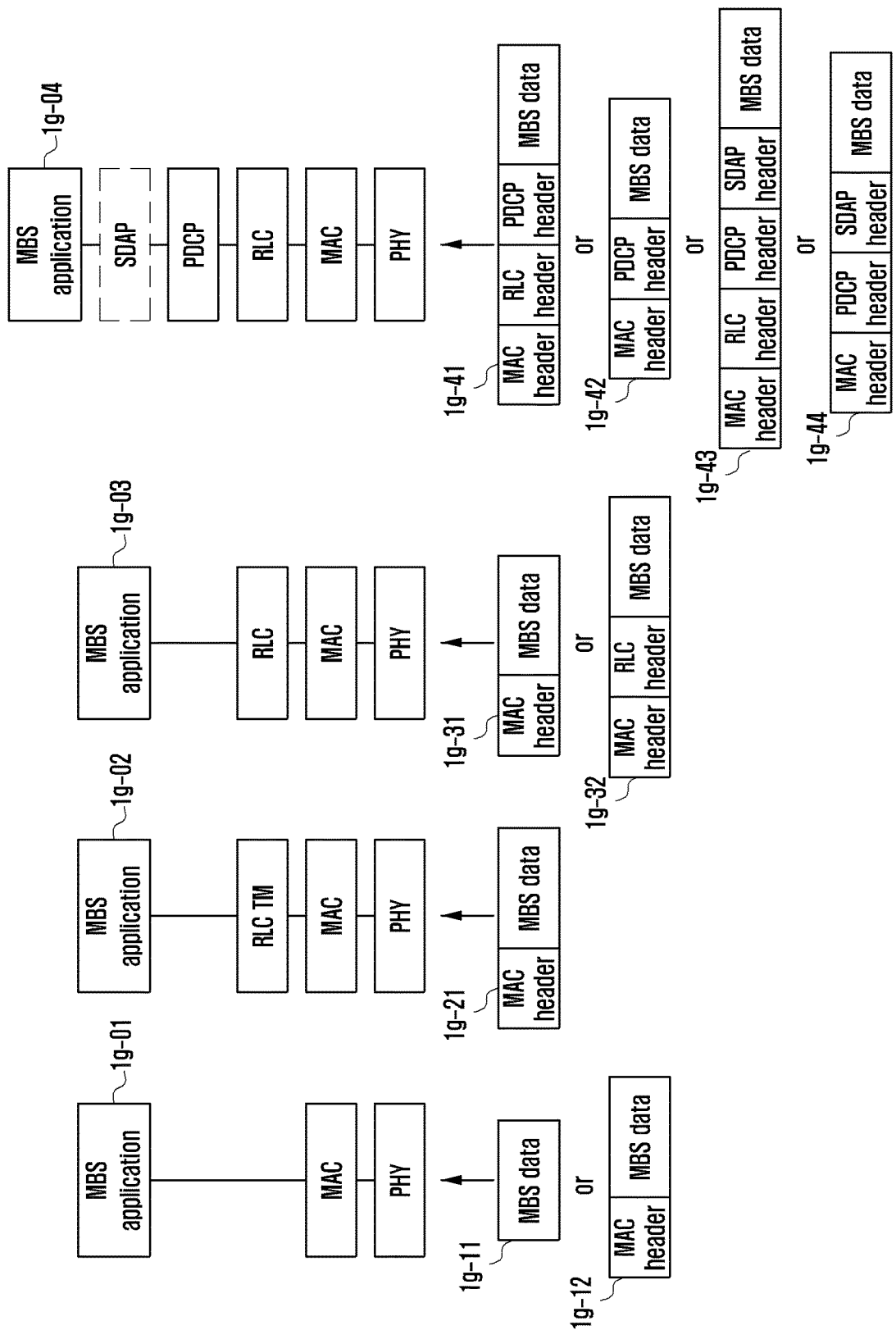
FIG. 1G is a diagram explaining a structure of a bearer that is configured for an MBS service to a UE in system information or a control message for an RRC message or an MBS channel, or established by the UE to receive the MBS service when a base station or a network supports the MBS service to the UE in an RRC connected mode, an RRC inactive mode, or an RRC idle mode.

FIG. 1G is a diagram explaining a structure of a bearer that is configured for an MBS service to a UE in system information or an RRC message or a control message for an MBS channel, or established by the UE to receive the MBS service when a base station or a network supports the MBS service to the UE in an RRC connected mode, an RRC inactive mode, or an RRC idle mode. Specifically, FIG. 1G is a diagram explaining a structure of a bearer that may be configured for an MBS service to a UE in system information or an RRC message (e.g., RRCSetup, RRCResume, RRCReconfiguration, RRCRelease, or a newly defined RRC message) or a control message for an MBS channel, or established by the UE to receive the MBS service when a base station or a network supports the MBS service to the UE in an RRC connected mode, RRC inactive mode, or RRC idle mode. In addition, the bearer structures proposed in FIG. 1G may be extended and applied or configured even when a general data service is supported.

The structure of a bearer configured for the MBS service in FIG. 1G may have one or a plurality of structures among the following bearer structures. As another method, as for the configuration information of the bearer for the MBS service, one or a plurality of structures among the following bearer structures may be promised or designated as a default configuration. In addition, the following bearer structures may be configured or applied to a UE or a base station.

First bearer structure 1g-01: The first bearer structure 1g-01 illustrated in FIG. 1G. If a unicast bearer or a multicast bearer for MBS service is configured, the UE may configure the bearer structure for directly connecting the MAC layer device and the upper MBS application layer device as the bearer for the MBS service. In the first bearer structure, it may be featured in that transmission of HARQ ACK or NACK, the HARQ retransmission procedure, or the HARQ processing procedure of the MAC layer device may not be applied to the first bearer structure. Alternatively, in the first bearer structure, the UE may transfer MBS data (MBS control data or MBS user data) received through the PHY layer device or the MAC layer device to the upper MBS application layer device. In the first bearer structure, MBS data may not include a MAC header. For example, this is because, when a separate physical channel or transport channel for the MBS service is configured and a separate transmission resource (frequency, time resource, or transmission period) is configured, the MAC layer device may distinguish MBS data without a MAC header. As another method, for example, when a separate physical channel or transport channel for the MBS service is configured and a separate transmission resource (frequency, time resource, or transmission period) is configured, this is because, if the first RNTI for MBS data is allocated or determined, MBS data may be distinguished even if there is no MAC header in the PHY layer device or the MAC layer device. As described above, the RNTI for MBS data may be allocated or designated as the (1-1)-th RNTI for MBS control data (or MBS control data channel) or the (1-2)-th RNTI for MBS user data (or MBS user data channel), respectively. In the first bearer structure, the MAC layer device may not basically apply an HARQ ACK or NACK transmission procedure, the HARQ retransmission procedure, or the HARQ processing procedure to a bearer supporting the MBS service. Alternatively, in the system information, RRC message (e.g., RRCSetup, RRCResume, RRCReconfiguration, RRCRelease, or a newly defined RRC message), or control message for the MBS channel, configuration information of the SDAP layer device may not be configured for the first bearer structure, and the SDAP layer device may transfer the data of the first bearer directly to the MBS application layer device without processing (e.g., bypass). In another method, in the system information, RRC message (e.g., RRCSetup, RRCResume, RRCReconfiguration, RRCRelease, or a newly defined RRC message), or the control message for the MBS channel, SDAP layer device configuration information for the bearer may be configured, and mapping information between QoS flow and bearer may be configured or reconfigured. In addition, in the SDAP layer device configuration information, the presence or absence of an SDAP header for downlink data, or the presence or absence of an SDAP header for uplink data may be configured. In addition, a reconfiguration or switching procedure between a unicast bearer and a multicast bearer may be supported by using the QoS flow and the mapping information of the bearer. In addition, in the SDAP configuration information for the bearer, the QoS flow for the MBS service may be mapped to the bearer to support MBS services. MBS data that may be received or transmitted in the first bearer structure may have a structure of 1g-11 or 1g-12. For example, MBS data that may be received or transmitted in the first bearer structure according to system information, an RRC message (e.g., RRCSetup, RRCResume, RRCReconfiguration, RRCRelease, or a newly defined RRC message), or a control message for an MBS channel may have a structure of 1g-11 or 1g-12. As described above, the overhead due to the header may be reduced.

Second bearer structure 1g-02: If a unicast bearer or a multicast bearer for MBS service is configured by the second bearer structure 1g-02 illustrated in FIG. 1G, the UE may configure an RLC layer device corresponding to a logical channel identifier (or MBS service) of an MBS control data channel, MBS user data channel, or MBS user data channel connected to the MAC layer device. In addition, a bearer structure for directly connecting the RLC layer device to an upper MBS application layer device may be configured as a bearer for the MBS service. In the second bearer structure, transmission of HARQ ACK or NACK, the HARQ retransmission procedure, or the HARQ processing procedure of the MAC layer device may not be applied to the second bearer. Alternatively, in the second bearer structure, the UE may transfer MBS data (MBS control data or MBS user data) received through the PHY layer device or the MAC layer device to the upper MBS application layer device through the RLC layer device. In the second bearer structure, MBS data may not include a MAC header. For example, this is because, when a separate physical channel or transport channel for the MBS service is configured and a separate transmission resource (frequency, time resource, or transmission period) is configured, the MAC layer device may distinguish MBS data without an MAC header. For example, with another method, when a separate physical channel or transport channel for the MBS service is configured and a separate transmission resource (frequency, time resource, or transmission period) is configured, this is because, if the first RNTI for MBS data is allocated or determined, MBS data may be distinguished even if there is no MAC header in the PHY layer device or the MAC layer device. As described above, the RNTI for MBS data may allocate or designate the (1-1)-th RNTI for MBS control data (or MBS control data channel) or the (1-2)-th RNTIs for MBS user data (or MBS user data channel or logical channel identifier or MBS service), respectively. As another method, in case that a separate physical channel or transport channel for the MBS service is configured in the second bearer structure, the MBS service is supported in a downlink shared channel (DL-SCH) used for a general data service, or a separate transmission resource (frequency, time resource, or transmission period) is configured, the MBS data may include a MAC header, and distinguish MBS control data (or MBS control data channel), MBS user data (or MBS user data channel or logical channel identifier or by MBS service), or MBS service based on the logical channel identifier included in the MAC header, or deliver distinguished MBS control data, MBS user data, or MBS service to each RLC layer device after demultiplexing thereof. As another method, in case that the separate physical channel or transport channel for the MBS service is configured in the second bearer structure, the MBS service is supported in a downlink shared channel (DL-SCH) used for a general data service, or a separate transmission resource (frequency, time resource, or transmission period) is configured, MBS data may be received from the transmission resource. If the first RNTI for MBS data is allocated or determined, MBS data may be received from the transmission resource to the RNTI according to the PDCCH indication. The MBS data may include a MAC header and distinguish MBS control data (or MBS control data channel), MBS user data (or by MBS user data channel, logical channel identifier, or by MBS service), or MBS service based on the logical channel identifier included in the MAC header, or deliver the divided and demultiplexed MBS control data MBS user data, or MBS service to each RLC layer device. That is, different logical channel identifiers may be configured or defined for each MBS control data channel, MBS user data channel, or MBS service as the logical channel, and the MBS service may be supported. The RLC layer device configured in the second bearer structure may be configured in a transparent mode (TM), and may be featured in that the RLC header is not included in the MBS data. Alternatively, the RLC serial number length may not be set in the RLC layer device. Alternatively, the length may not be set in the RLC layer device. Alternatively, the RLC layer device may not apply a data processing procedure to the MBS data. In addition, the RLC layer device configured in the second bearer structure may not apply a data partitioning procedure or a data reassembly procedure for MBS data in the TM mode. Alternatively, the RLC layer device configured in the second bearer structure may set the RLC reception window size to 0 or may not operate the RLC reception window. In the second bearer structure, the MAC layer device may not basically apply the HARQ ACK or NACK transmission, the HARQ retransmission procedure, or the HARQ processing procedure to a bearer supporting the MBS service. Alternatively, in the system information, RRC message (e.g., RRCSetup, RRCResume, RRCReconfiguration, RRCRelease, or a newly defined RRC message), or control message for the MBS channel, configuration information of the SDAP layer device may not be configured for the second bearer structure, and the SDAP layer device may transfer the data of the second bearer directly to the MBS application layer device without processing (e.g., bypass). In another method, in the system information, RRC message (e.g., RRCSetup, RRCResume, RRCReconfiguration, RRCRelease, or a newly defined RRC message), or the control message for the MBS channel, SDAP layer device configuration information for the bearer may be configured, and mapping information between QoS flow and bearer may be configured or reconfigured. In addition, in the SDAP layer device configuration information, the presence or absence of an SDAP header for downlink data, or the presence or absence of an SDAP header for uplink data may be configured. In addition, a reconfiguration or switching procedure between a unicast bearer and a multicast bearer may be supported by using the QoS flow and the mapping information of the bearer. In addition, in the SDAP configuration information for the bearer, the QoS flow for the MBS service may be mapped to the bearer to support MBS services. MBS data that may be received or transmitted in the second bearer structure may have a structure of 1g-21. As described above, the overhead due to the header may be reduced. For example, MBS data that may be received or transmitted in the second bearer structure according to system information or configuration information of an RRC message (e.g., RRCSetup, RRCResume, RRCReconfiguration, RRCRelease, or a newly defined RRC message), or a control message for an MBS channel may have a structure of 1g-21.

Third bearer structure 1g-03: If a unicast bearer or a multicast bearer for MBS service is configured by the third bearer structure 1g-03 illustrated in FIG. 1G, the UE may configure an RLC layer device corresponding to a logical channel identifier (or MBS service) of an MBS control data channel, MBS user data channel, or MBS user data channel connected to the MAC layer device. In addition, a bearer structure for directly connecting the RLC layer device to an upper MBS application layer device may be configured as a bearer for the MBS service. In the third bearer structure, transmission of HARQ ACK or NACK, the HARQ retransmission procedure, or the HARQ processing procedure of the MAC layer device may not be applied to the third bearer. In another method, in the system information, RRC message (e.g., RRCSetup, RRCResume, RRCReconfiguration, RRCRelease, or a newly defined RRC message), or the control message for the MBS channel, whether or not to perform HARQ ACK or NACK transmission, the HARQ retransmission procedure, or the HARQ processing procedure of the MAC layer device may be configured by an indicator. For example, in the system information, RRC message (e.g., RRCSetup, RRCResume, RRCReconfiguration, RRCRelease, or a newly defined RRC message), or the control message for the MBS channel, when the indicator is configured (either the indicator value indicates a specific value, or the indicator field does not exist) to perform HARQ ACK or NACK transmission, the HARQ retransmission procedure, or the HARQ processing procedure, HARQ ACK or NACK transmission, the HARQ retransmission procedure, or the HARQ processing procedure may be performed. Alternatively, as described above, when the indicator is configured (either the indicator value indicates a specific value, or the indicator field does not exist) not to perform HARQ ACK or NACK transmission, the HARQ retransmission procedure, or the HARQ processing procedure, HARQ ACK or NACK transmission, the HARQ retransmission procedure, or the HARQ processing procedure may not be performed. Alternatively, transmission of HARQ ACK or NACK, the HARQ retransmission procedure, or the HARQ processing procedure in the MAC layer device may not be basically applied to a bearer supporting the MBS service. Alternatively, the indicator may be configured for an MBS control data channel, an MBS user data channel, a logical channel identifier (or MBS service), or a bearer identifier of the MBS user data channel, respectively. As another method, when HARQ ACK or NACK transmission, the HARQ retransmission procedure, or the HARQ processing procedure of the MAC layer device is performed or configured, or when it is configured for a specific logical channel identifier, MBS service, or bearer, in the system information, the RRC message (e.g., RRCSetup, RRCResume, RRCReconfiguration, RRCRelease, or a newly defined RRC message), or the control message for the MBS channel, it may be configured to perform HARQ reordering or RLC reordering (or in-order delivery) by the indicator (either the indicator value indicates a specific value, or the indicator field does not exist) for the MBS control data channel, the MBS user data channel, the logical channel identifier (or MBS service) of the MBS user data channel, or the RLC layer device configured for the bearer identifier. Alternatively, the RLC reception window size may be set to a value (e.g., $2^{(RLC\ serial\ number\ length-1)}$) greater than 0 for operation. This is because when performing HARQ process or retransmission on MBS data, the order of data may be mixed, so that MBS data need to be rearranged based on the RLC reception window or the RLC serial number, or a reordering timer needs to be driven to support the MBS service in order. As another method, when the HARQ ACK or NACK transmission, the HARQ retransmission procedure, or the HARQ processing procedure of the MAC layer device is not performed or is configured not to be performed, in the system information, the RRC message (e.g., RRCSetup, RRCResume, RRCReconfiguration, RRCRelease, or a newly defined RRC message), or the control message for the MBS channel, it may be configured not to perform HARQ reordering or RLC reordering (or in-delivery) by the indicator (either the indicator value indicates to a specific value, or the indicator field does not exist) for the MBS control data channel, the MBS user data channel, the logical channel identifier (or MBS service) of the MBS user data channel, or RLC layer device configured for the bearer identifier. Alternatively, even in the RLC layer device configured in the bearer supporting the MBS service, HARQ reordering or RLC reordering (or in-order delivery) may be performed by default by not applying transmission of HARQ ACK or NACK, the HARQ retransmission procedure, or the HARQ processing procedure to the bearer supporting the MBS service by default in the MAC layer device. Alternatively, the reception RLC window may not be operated by setting the RLC reception window size to 0. For example, in the absence of the configuration information or basically, the UE may transmit data always received from the RLC layer device to the upper layer device by an out-of-order delivery method regardless of the order. Alternatively, in the third bearer structure, the UE may transmit MBS data (MBS control data or MBS user data) received through the PHY layer device or the MAC layer device to the upper MBS application layer device through the RLC layer device. In the third bearer structure, MBS data may include a MAC header. Alternatively, the logical channel identifier included in the MAC header may be configured or defined to indicate an MBS control data channel, an MBS user data channel, or each MBS service. For example, when a separate physical channel or transport channel for the MBS service is configured, and a separate transmission resource (frequency or time resource or transmission period) is configured, if the first RNTI for MBS data is allocated or determined, it may be possible to distinguish whether MBS data is MBS control data, MBS user data, or data for which MBS service based on the RNTI or logical channel identifier, or it may be divided and demultiplexed to each RLC layer device and delivered in the PHY layer device or the MAC layer device. As described above, the RNTI for MBS data may allocate or designate the (1-1)-th RNTI for MBS control data (or MBS control data channel) or the (1-2)-th RNTI for MBS user data (or MBS user data channel or logical channel identifier or MBS service), respectively. As another method, in case that the separate physical channel or transport channel for the MBS service is configured in the third bearer structure, the MBS service is supported in a downlink shared channel (DL-SCH) used for a general data service, or a separate transmission resource (frequency, time resource, or transmission period) is configured, the MBS data may include a MAC header, and distinguish MBS control data (or MBS control data channel), MBS user data (or MBS user data channel or logical channel identifier or by MBS service), or MBS service based on the logical channel identifier included in the MAC header, or deliver distinguished MBS control data, MBS user data, or MBS service to each RLC layer device after demultiplexing thereof. As another method, in case that the separate physical channel or transport channel for the MBS service is configured in the third bearer structure, the MBS service is supported in a downlink shared channel (DL-SCH) used for a general data service, or a separate transmission resource (frequency, time resource, or transmission period) is configured, MBS data may be received from the transmission resource. If the first RNTI for MBS data is allocated or determined, MBS data may be received from the transmission resource to the RNTI according to the PDCCH indication. The MBS data may include a MAC header and distinguish MBS control data (for MBS control data channel), MBS user data (for MBS user data channel, logical channel identifier, or MBS service), or MBS service based on the logical channel identifier included in the MAC header, or deliver the distinguished MBS control data, MBS user data, or MBS service to each RLC layer device after demultiplexing thereof. For example, different logical channel identifiers may be configured or defined for each MBS control data channel, MBS user data channel, or MBS service as the logical channel, and the MBS service may be supported. The RLC layer device configured in the third bearer structure may be configured as the transparent mode (TM), unacknowledged mode (UM), uni-directional mode of the UM mode, the bi-directional mode of the UM mode, or the acknowledged mode (AM). In the RLC TM mode, the RLC header may not be included in the MBS data, and the RLC header may be included in the RLC UM mode or AM mode. In addition, in the RLC TM mode, the RLC layer device may not apply the data processing procedure to the MBS data (e.g., data partitioning procedure or reassembly procedure may not be applied), and in the RLC UM or AM mode, the RLC layer device may apply the data processing procedure to the MBS data. Alternatively, in the system information, RRC message (e.g., RRCSetup, RRCResume, RRCReconfiguration, RRCRelease, or a newly defined RRC message), or control message for the MBS channel, configuration information of the SDAP layer device may not be configured for the third bearer structure, and the SDAP layer device may transfer the data of the third bearer directly to the MBS application layer device without processing (e.g., bypass). In another method, in the system information, the RRC message (e.g., RRCSetup, RRCResume, RRCReconfiguration, RRCRelease, or a newly defined RRC message), or the control message for the MBS channel, SDAP layer device configuration information for the bearer may be configured, and mapping information between QoS flow and bearer may be configured or reconfigured. In addition, in the SDAP layer device configuration information, the presence or absence of an SDAP header for downlink data, or the presence or absence of an SDAP header for uplink data may be configured. In addition, a reconfiguration or switching procedure between a unicast bearer and a multicast bearer may be supported by using the QoS flow and the mapping information of the bearer. In addition, in the SDAP configuration information for the bearer, the QoS flow for the MBS service may be mapped to the bearer to support MBS services. MBS data that may be received or transmitted in the third bearer structure may have a structure of 1g-31 or 1g-32. As described above, the overhead due to the header may be reduced. For example, MBS data that may be received or transmitted in the third bearer structure according to the system information, the configuration information of an RRC message (e.g., RRCSetup, RRCResume, RRCReconfiguration, RRCRelease, or a newly defined RRC message), or the control message for an MBS channel may have a structure of 1g-31 or 1g-32. As described above, when it is configured to perform the transmission of HARQ ACK or NACK layer device, the HARQ retransmission procedure, or the HARQ processing procedure of the MAC layer device in the system information, the RRC message (e.g., RRCSetup, RRCResume, RRCReconfiguration, RRCRelease, or a newly defined RRC message), or the control message for the MBS channel, or when it is configured as an indicator, the transmission resource (e.g., time or frequency resource, transport channel, and frequency interval) information for transmitting HARQ ACK or NACK may be transmitted together. When the UE in the RRC connected mode, RRC inactive mode, or RRC idle mode is configured to perform HARQ ACK or NACK transmission, the HARQ retransmission procedure, or the HARQ processing procedure as described above, HARQ ACK or NACK may be transmitted using the transmission resource (e.g., physical transmission resources) configured above after receiving downlink MBS data. As described above, if the base station detects even one NACK in the transmission resource, or detects that at least one UE has transmitted a NACK, the base station may retransmit the MBS data. Alternatively, retransmission may be performed so that all UEs may receive the MBS data through the MBS channel. As another method, the UE in the RRC connected mode, RRC inactive mode, or RRC idle mode may define MAC control information (or RLC control information, PDCP control information, or RRC message) after receiving the downlink MBS data, and transmit the MAC control information (or RLC control information, PDCP control information, or RRC message) including the UE identifier, the MBS service identifier, the logical channel identifier, the RNTI identifier, or the bearer identifier so that the base station may indicate which UE has not successfully received the data (for example, the MAC control information (or RLC control information, PDCP control information, or RRC message) may be transmitted in the transmission resource configured above). As described above, the base station may retransmit the MBS data only to the UE in the RRC connected mode, RRC idle mode, or RRC inactive mode indicating that the NACK has been transmitted or failed to be successfully received in the transmission resource. As another method, as described above, if the base station detects even one NACK in the transmission resource, or detects that at least one UE has transmitted a NACK, the base station may retransmit the MBS data. Alternatively, retransmission may be performed so that all UEs may receive the MBS data through the MBS channel.

Fourth bearer structure 1g-04: If a unicast bearer or a multicast bearer for MBS service is configured by the fourth bearer structure 1g-04 illustrated in FIG. 1G, the UE may configure an RLC layer device corresponding to an MBS control data channel connected to a MAC layer device, an MBS user data channel, or a logical channel identifier (or MBS service) of the MBS user data channel. Further, the UE may configure a PDCP layer device connected to the RLC layer device, and may configure a bearer structure that directly connects the PDCP layer device to the MBS application layer device as a bearer for the MBS service. As described above fourth bearer structure, the transmission of HARQ ACK or NACK, the HARQ retransmission procedure, or the HARQ processing procedure of the MAC layer device may not be applied to the fourth bearer. As another method in the system information, the RRC message (e.g., RRCSetup, RRCResume, RRCReconfiguration, RRCRelease, or a newly defined RRC message), or the control message for the MBS channel, whether or not to perform the HARQ ACK or NACK transmission, the HARQ retransmission procedure, or the HARQ processing procedure of the MAC layer device may be configured by an indicator. For example, in the system information, the RRC message (e.g., RRCSetup, RRCResume, RRCReconfiguration, RRCRelease, or a newly defined RRC message), or the control message for the MBS channel, when the indicator is configured (either the indicator value indicates to a specific value, or the indicator field does not exist) to perform the HARQ ACK or NACK transmission, the HARQ retransmission procedure, or the HARQ processing procedure, the HARQ ACK or NACK transmission, the HARQ retransmission procedure, or the HARQ processing procedure may be performed. Alternatively, as described above, when the indicator is configured (either the indicator value indicates to a specific value, or the indicator field does not exist) not to perform the HARQ ACK or NACK transmission, the HARQ retransmission procedure, or the HARQ processing procedure, the HARQ ACK or NACK transmission, the HARQ retransmission procedure, or the HARQ processing procedure may not be performed. Alternatively, the transmission of HARQ ACK or NACK transmission, the HARQ retransmission procedure, or the HARQ processing procedure in the MAC layer device may not be basically applied to a bearer supporting the MBS service. Alternatively, the indicator may be configured for an MBS control data channel, an MBS user data channel, a logical channel identifier (or MBS service), or a bearer identifier of the MBS user data channel, respectively. As another method, when HARQ ACK or NACK transmission, the HARQ retransmission procedure, or the HARQ processing procedure of the MAC layer device is performed or configured, or when it is configured for a specific logical channel identifier, MBS service, or bearer, in the system information, the RRC message (e.g., RRCSetup, RRCResume, RRCReconfiguration, RRCRelease, or a newly defined RRC message), or the control message for the MBS channel, it may be configured to perform HARQ reordering or RLC reordering (or in-order delivery) by the indicator (either the indicator indicates to a specific value, or the indicator field does not exist) for the MBS control data channel, the MBS user data channel, the logical channel identifier (or MBS service) of the MBS user data channel, or the RLC layer device configured for the bearer identifier. Alternatively, the RLC reception window size may be set to a value (e.g., $2^{(RLC\ serial\ number\ length-1)}$) greater than 0 for operation. This is because when performing HARQ process or retransmission on the MBS data, the order of data may be mixed, so that MBS data needs to be rearranged based on the RLC reception window or the RLC serial number, or a reordering timer needs to be driven to support the MBS service in order. As another method, when the HARQ ACK or NACK transmission, the HARQ retransmission procedure, or the HARQ processing procedure of the MAC layer device is not performed or is configured not to be performed, in the system information, the RRC message (e.g., RRCSetup, RRCResume, RRCReconfiguration, RRCRelease, or a newly defined RRC message), or the control message for the MBS channel, it may be configured not to perform HARQ reordering or RLC reordering (or in-order delivery) by the indicator (either the indicator value indicates a specific value, or the indicator field does not exist) for the RLC layer device configured for the MBS control data channel, the MBS user data channel, the logical channel identifier (or MBS service) or the bearer identifier of the MBS user data channel. Alternatively, even in the RLC layer device configured in the bearer supporting the MBS service, HARQ reordering or RLC reordering (or in-order delivery) may not be performed by default by not applying the HARQ ACK or NAC transmission, the HARQ retransmission procedure, or the HARQ processing procedure to the bearer supporting the MBS service by default in the MAC layer device. Alternatively, the reception RLC window may not be operated by setting the RLC reception window size to 0. For example, in the absence of the configuration information or basically, the UE may transmit data always received from the RLC layer device to the upper layer device by an out-of-order delivery method regardless of the order. Alternately, in the fourth bearer structure, the UE may transmit MBS data (MBS control data or MBS user data) received through the PHY layer device or the MAC layer device to the upper MBS application layer device through the RLC layer device or the PDCP layer device. In the fourth bearer structure, MBS data may include a MAC header. Alternatively, the logical channel identifier included in the MAC header may be configured or defined to indicate an MBS control data channel, an MBS user data channel, or each MBS service. For example, when a separate physical channel or transport channel for the MBS service is configured, and a separate transmission resource (frequency or time resource or transmission period) is configured, if the first RNTI for MBS data is allocated or determined, it may be possible to distinguish whether MBS data is MBS control data, MBS user data, or data for which MBS service based on the RNTI or logical channel identifier, or it may be divided and demultiplexed to each RLC layer device and delivered in the PHY layer device or the MAC layer device. As described above, the RNTI for MBS data may allocate or designate the (1-1)-th RNTI for MBS control data (for MBS control data channel) or the (1-2)-th RNTI for MBS user data (for MBS user data channel or logical channel identifier or MBS service), respectively. As another method, in case that the separate physical channel or transport channel for the MBS service is configured in the fourth bearer structure, the MBS service is supported in a downlink shared channel (DL-SCH) used for a general data service, or a separate transmission resource (frequency, time resource, or transmission period) is configured, the MBS data may include a MAC header, and distinguish MBS control data (or MBS control data channel), MBS user data (or MBS user data channel or logical channel identifier or by MBS service), or MBS service based on the logical channel identifier included in the MAC header, or deliver distinguished MBS control data, MBS user data, or MBS service to each RLC layer device after demultiplexing thereof. As another method, in case that the separate physical channel or transport channel for the MBS service is configured in the fourth bearer structure, the MBS service is supported in a downlink shared channel (DL-SCH) used for a general data service, or a separate transmission resource (frequency, time resource, or transmission period) is configured, MBS data may be received from the transmission resource, and if the first RNTI for MBS data is allocated or determined, MBS data may be received from the transmission resource to the RNTI according to the PDCCH indication, and the MBS data may include a MAC header and distinguish MBS control data (for MBS control data channel), MBS user data (for MBS user data channel, logical channel identifier, or MBS service), or MBS service based on the logical channel identifier included in the MAC header, or deliver the distinguished and demultiplexed MBS control data to each RLC layer device. That is, different logical channel identifiers may be configured or defined for each MBS control data channel, MBS user data channel, or MBS service as the logical channel, and the MBS service may be supported. The RLC layer device configured in the fourth bearer structure may be configured as the transparent mode (TM), unacknowledged mode (UM), uni-directional mode of the UM mode, the bi-directional mode of the UM mode, or the acknowledged mode (AM) mode. In the RLC TM mode, the RLC header may not be included in the MBS data, and the RLC header may be included in the RLC UM mode or the AM mode. In addition, in the RLC TM mode, the RLC layer device may not apply the data processing procedure to the MBS data (e.g., data partitioning procedure or reassembly procedure may not be applied), and in the RLC UM mode or the AM mode, the RLC layer device may apply the data processing procedure to the MBS data. The overhead of MBS data may be reduced by configuring the RLC layer device as the TM mode (for example, the overhead may be reduced by not using the RLC header) in the system information or the RRC message (e.g., RRCSetup, RRCResume, RRCReconfiguration, RRCRelease, or a newly defined RRC message) or the control message for the MBS channel for the fourth bearer structure. Alternatively, in the system information or the RRC message (e.g., RRCSetup, RRCResume, RRCReconfiguration, RRCRelease, or a newly defined RRC message) or the control message for the MBS channel for the fourth bearer structure, it is possible to prevent transmission delay of MBS data by configuring an out-of-order delivery function in the PDCP layer device. As another method, in the fourth bearer structure for the MBS bearer, if HARQ retransmission or HARQ ACK/NACK indication procedure or HARQ processing procedure is not performed or configured not to be performed, or RLC UM mode (or RLC TM mode) is configured, it may be possible to prevent MBS data transmission delay by allowing the PDCP layer device to perform an out-of-order delivery function by default (e.g., always set the out-of-order delivering indicator to True). This is because if the HARQ retransmission or HARQ processing procedure is not performed with respect to the MBS data, and the RLC retransmission procedure is not performed, the reordering function may cause transmission delay in the PDCP layer device when a data loss occurs. As another method, the PDCP layer device may basically perform a PDCP reordering function, determine the PDCP reception window size (e.g., PDCP serial number length of 16 bits, window size $2^{(16-1)}$) based on the PDCP serial number length, and drive a reordering timer. Alternatively, in the fourth bearer structure, SDAP layer device configuration information may be configured in the system information, the RRC message (e.g., RRCSetup, RRCResume, RRCReconfiguration, RRCRelease, or a newly defined RRC message), or the control message for the MBS channel, and QoS flow and bearer mapping information may be configured or reconfigured. In addition, in the SDAP layer device configuration information, the presence or absence of an SDAP header for downlink data, or the presence or absence of an SDAP header for uplink data may be configured. In addition, it may be possible to support a reconfiguration or switching procedure between a unicast bearer and a multicast bearer by using the QoS flow and the mapping information of the bearer. Alternatively, if the configuration information of the SDAP layer device is not configured for the third bearer structure in the system information, the RRC message (e.g., RRCSetup, RRCResume, RRCReconfiguration, RRCRelease, or a newly defined RRC message), or the control message for the MBS channel, the SDAP layer device may transfer the data of the fourth bearer directly to the MBS application layer device without processing (e.g., bypass) the data. In addition, in the SDAP configuration information for the bearer, the QoS flow for the MBS service may be mapped to the bearer to support MBS services. MBS data that may be received or transmitted by the above fourth bearer structure may have a structure of 1g-41, 1g-42, 1g-43, or 1g-44. For example, MBS data that may be received or transmitted by the above fourth bearer structure may have a structure of 1g-41, 1g-42, 1g-43, or 1g-44 according to the configuration information of the system information, the RRC message (e.g., RRCSetup, RRCResume, RRCReconfiguration, RRCRelease, or a newly defined RRC message), or the control message for the MBS channel. As described above, the overhead due to the header may be reduced. As described above, when it is configured to perform the transmission of HARQ ACK or NACK layer device, the HARQ retransmission procedure, or the HARQ processing procedure of the MAC layer device in the system information, the RRC message (e.g., RRCSetup, RRCResume, RRCReconfiguration, RRCRelease, or a newly defined RRC message), or the control message for the MBS channel, or when it is configured as an indicator, the transmission resource (e.g., time or frequency resource, transport channel, and frequency interval) information for transmitting HARQ ACK or NACK may be transmitted together. When the UE in the RRC connected mode, RRC inactive mode, or RRC idle mode is configured to perform HARQ ACK or NACK transmission, the HARQ retransmission procedure, or the HARQ processing procedure as described above, the HARQ ACK or NACK may be transmitted using the transmission resource (e.g., physical transmission resources) configured above after receiving downlink MBS data. As described above, if the base station detects even one NACK in the transmission resource, or detects that at least one UE has transmitted a NACK, the base station may retransmit the MBS data. Alternatively, retransmission may be performed so that all UEs may receive the MBS data through the MBS channel. As another method, the UE in the RRC connected mode, RRC inactive mode, or RRC idle mode may define MAC control information (or RLC control information, PDCP control information, or RRC message) after receiving the downlink MBS data, and transmit the MAC control information (or RLC control information, PDCP control information, or RRC message) including the UE identifier, the MBS service identifier, the logical channel identifier, the RNTI identifier, or the bearer identifier so that the base station may indicate which UE did not successfully receive the data (for example, the MAC control information (or RLC control information, PDCP control information, or RRC message) may be transmitted in the transmission resource configured above). As described above, the base station may retransmit the MBS data only to the UE in the RRC connected mode, RRC idle mode, or RRC inactive mode indicating that the NACK has been transmitted or failed to be successfully received in the transmission resource. As another method, as described above, if the base station detects even one NACK in the transmission resource, or detects that at least one UE has transmitted a NACK, the base station may retransmit the MBS data. Alternatively, retransmission may be performed so that all UEs may receive the MBS data through the MBS channel.

When the UE receives the system information as described above, when the UE intends to receive the service of interest or has the service of interest or decides the service of interest, when the UE is in or enters a cell or an area supporting the MBS service in the system information, when the UE configures or connects the MBS service (or session), when the UE receives the configuration information or bearer configuration information for the MBS service in the system information, the RRC message (e.g., RRCSetup, RRCResume, RRCReconfiguration, RRCRelease, or a newly defined RRC message), or the control message (e.g., transmitted from the MBS control data channel) for the MBS channel, or when the information is received or broadcasted, the UE may configure a unicast bearer, a multicast bearer, or an MBS bearer for receiving the MBS service having the above-proposed bearer structure.

Figure 1H:
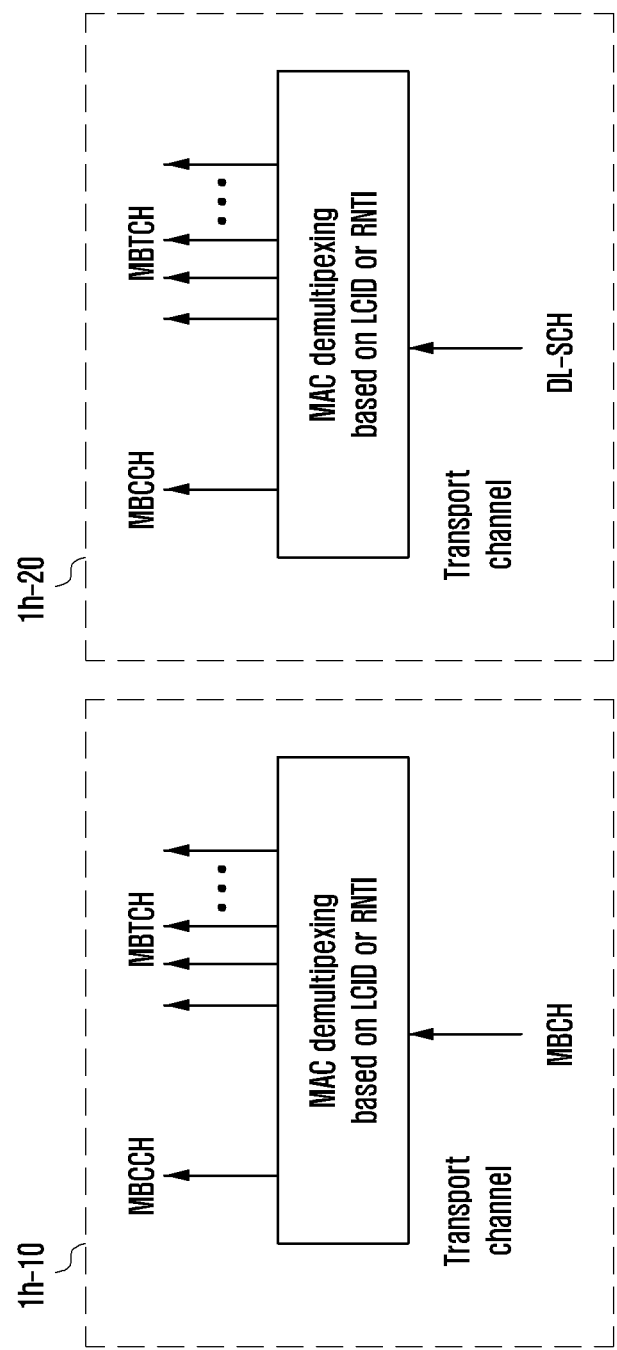
FIG. 1H is a diagram illustrating a method for demultiplexing received MBS data in a MAC layer device in case that a UE in an RRC connected mode, an RRC inactive mode, or an RRC idle mode receives the MBS data through a multicast bearer or a unicast bearer supporting the MBS service with a bearer structure proposed in the disclosure.

FIG. 1H is a diagram illustrating a method for demultiplexing received MBS data in a MAC layer device in case that a UE in an RRC connected mode, an RRC inactive mode, or an RRC idle mode receives MBS data through a multicast bearer or a unicast bearer supporting an MBS service with a bearer structure proposed in the disclosure. Specifically, FIG. 1H is a diagram illustrating a method of demultiplexing the received MBS data in a MAC layer device when the UE in the RRC connected mode, RRC inactive mode, or RRC idle mode receives the MBS data (e.g., MBS control data or MBS user data or general data other than MBS data) through a multicast bearer or a unicast bearer supporting the MBS service with the bearer structure proposed in FIG. 1G according to various embodiments of the disclosure. In addition, a method for the UE to transmit uplink MBS data is also proposed (e.g., MBS control data, MBS user data, or general data other than MBS data).

In FIG. 1H, one method or a plurality of methods among the following methods may be applied to the method of receiving MBS data or the method of receiving MBS data and demultiplexing the MBS data. As another method, different methods may be applied according to whether the UE is in an RRC connected mode, an RRC inactive mode, or an RRC idle mode among the following methods.

The (1-1)-th MBS reception method 1h-10: In the (1-1)-th MBS reception method 1h-10 of FIG. 1H, a separate physical channel or transport channel (e.g., MBCH and MBCH channel) for the MBS service may be configured, and a separate transmission resource (frequency, time resource, transmission period, bandwidth part (or bandwidth part identifier), bandwidth, dedicated frequency (frequency information or SCell identifier), and subcarrier spacing) may be configured or defined in the system information, an RRC message (e.g., RRCSetup, RRCResume, RRCReconfiguration, RRCRelease, or a newly defined RRC message), or the control message (e.g., transmitted from the MBS control data channel) for the MBS channel. A MAC header is always attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively. In addition, different logical channel identifiers may be allocated to each MBS service serviced in the MBS user data channel. In the system information, the RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcasted, and each logical channel identifier corresponding to the first identifier or the second identifier of each MBS service may be configured or broadcasted. As described above, the first identifier may indicate a public land mobile network (PLMN) serving the MBS or may indicate an MBS service type or session. As described above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). As described above, a logical channel identifier for the MBS control data channel, the MBS user data channel, or each service of the MBS user data channel may be allocated as one combination of predetermined bits (e.g., 6 bits) in the first logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, as described above, a logical channel identifier for the MBS control data channel, the MBS user data channel, or each service of the MBS user data channel may be allocated as one combination of predetermined bits (e.g., 6 bits) in the new second logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. As described above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer device, or may be distinguished by using different RNTIs. Accordingly, when the MAC layer device of the UE receives MBS data through a channel or transmission resource for receiving the MBS service, the MBS data may be classified or demultiplexed based on the received transport channel (e.g., MBCH, DL-SCH, and BCH), bandwidth part identifier, SCell identifier, logical channel identifier, or RNTI identifier, and the data may be transmitted to a corresponding upper layer device. The (1-1)-th MBS reception method may be applied to a UE in an RRC connected mode, RRC inactive mode, or RRC idle mode.

The (1-2)-th MBS reception method 1h-10: In the (1-2)-th MBS reception method (1h-10) of FIG. 1H, a separate physical channel or transport channel (e.g., MBCH and MBS channel) for the MBS service may be configured, and a separate transmission resource (frequency, time resource, transmission period, bandwidth part (or bandwidth part identifier), bandwidth, dedicated frequency (frequency information or SCell identifier), and subcarrier spacing) may be configured or defined in the system information, the RRC message (e.g., RRCSetup, RRCResume, RRCReconfiguration, RRCRelease, or a newly defined RRC message), or the control message (e.g., transmitted from the MBS control data channel) for the MBS channel. A MAC header is attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively. In addition, different logical channel identifiers may be allocated to each MBS service serviced in the MBS user data channel. In addition, different RNTI identifiers may be allocated to the MBS control data channel (e.g., MBCCH and MBS control channel) or the MBS user data channel (e.g., MBTCH and MBS traffic channel). In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the same logical channel identifier may be allocated to the MBS control data channel, the MBS user data channel, or each MBS service serviced in the MBS user data channel. As another method, the same RNTI identifiers may be allocated to the MBS control data channel (e.g., MBCCH and MBS control channel), the MBS user data channel, or each MBS service serviced in the MBS user data channel, and in more detail, the channel or data may be distinguished by allocating different logical channel identifiers to the MBS control data channel (e.g., MBCCH and MBS control channel), the MBS user data channel, or each MBS service serviced in the MBS user data channel. As described above, the RNTI identifier for the MBS service may be configured differently from the RNTI identifier for the DL-SCH (e.g., C-RNTI, MCS-C-

RNTI, or CS-RNTI). As another method, as described above, the RNTI identifier for the MBS service may be configured to be the same as the RNTI identifier (e.g., C-RNTI, MCS-C-RNTI, CS-RNTI, etc.) for the DL-SCH, and differentiation may be performed with a logical channel identifier. In addition, for each MBS service serviced in the MBS user data channel, in the system information, the RRC message (e.g., RRC-Setup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcasted, and each logical channel identifier or each RNTI identifier corresponding to the first identifier or the second identifier of each MBS service may be configured or broadcasted. As described above, the first identifier may indicate a public land mobile network (PLMN) serving the MBS or may indicate an MBS service type or session. As described above, the second identifier may indicate a mode specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). As described above, a logical channel identifier for the MBS control data channel, the MBS user data channel, or each service of the MBS user data channel may be allocated as one combination of predetermined bits (e.g., 6 bits) in the first logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, as described above, a logical channel identifier for the MBS control data channel, the MBS user data channel, or each service of the MBS user data channel may be allocated as one combination of predetermined bits (e.g., 6 bits) in the new second logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. As described above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer device, or may be distinguished by using different RNTIs. Accordingly, when the MAC layer device of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer device. The MBS reception method 1-2 may be applied to a UE in an RRC connected mode, an RRC inactive mode, or an RRC idle mode.

The (1-3)-th MBS reception method 1$h$-10: In the (1-3)-th MBS reception method 1$h$-10 of FIG. 1H, a separate physical channel or transport channel (e.g., MBCH and MBS channel) for the MBS service may be configured, and a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, the RRC message (e.g., RRC-Setup, RRCResume, RRCReconfiguration, RRCRelease, or a newly defined RRC message), or the control message (e.g., transmitted from the MBS control data channel) for the MBS channel. A MAC header may be not attached to MBS data transmitted for the MBS service, and the MBS control data channel (e.g., MBCCH and MBS control channel) or the MBS user data channel (e.g., MBTCH and MBS traffic channel) may be differentiated from each other based on the RNTI identifier. In addition, different RNTI identifiers may be allocated to the MBS control data channel (e.g., MBCCH and MBS control channel) or the MBS user data channel (e.g., MBTCH and MBS traffic channel). In addition, different RNTI identifiers may be allocated to each MBS service serviced in the MBS user data channel. Accordingly, because the MBS control data channel (e.g., MBCCH and MBS control channel), the MBS user data channel, or each MBS services serviced in the MBS user data channel may be distinguished by the RNTI identifiers, the logical channel identifier does not need to be configured for the MBS control data channel, the MBS user data channel, or each MBS service serviced in the MBS user data channel, and there is no need to include a MAC header in the MBS data. In addition, for each MBS service serviced in the MBS user data channel, in the system information, the RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcasted, and each RNTI identifier corresponding to the first identifier or the second identifier of each MBS service may be configured or broadcasted. As described above, the first identifier may indicate a public land mobile network (PLMN) serving the MBS or may indicate an MBS service type or session. As described above, the second identifier may indicate a more specific session or type of MBS service. Accordingly, when the MAC layer device of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, or RNTI identifier, and the data may be transmitted to a corresponding upper layer device. The (1-3)-th MBS reception method may be applied to a UE in an RRC connected mode, RRC inactive mode, or RRC idle mode.

The (2-1)-th MBS reception method 1h-20: In the (2-1)-th MBS reception method 1h-20 of FIG. 1H, a physical channel or transport channel (e.g., MBCH, MBS channel, or DL-SCH channel) for the MBS service may be configured, or in the existing DL-SCH channel, a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, the RRC message (e.g., RRCSetup, RRCResume, RRCReconfiguration, RRCRelease, or a newly defined RRC message), or the control message (e.g., transmitted from the MBS control data channel) for the MBS channel. A MAC header is always attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively. In addition, different logical channel identifiers may be allocated to each MBS service serviced in the MBS user data channel. In the system information, the RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcasted, and each logical channel identifier corresponding to the first identifier or the second identifier of each MBS service may be configured or broadcasted. As described above, the first identifier may indicate a public land mobile network (PLMN) serving the MBS or may indicate an MBS service type or session. As described above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). As described above, a logical channel identifier for the MBS control data channel, the MBS user data channel, or each service of the MBS user data channel may be allocated as one combination of predetermined bits (e.g., 6 bits) in the first logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, as described above, a logical channel identifier for the MBS control data channel, the MBS user data channel, or each service of the MBS user data channel may be allocated as one combination of predetermined bits (e.g., 6 bits) in the new second logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. As described above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer device, or may be distinguished by using different RNTIs. Accordingly, when the MAC layer device of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer device. The MBS reception method 2-1 may be applied to a UE in an RRC connected mode, RRC inactive mode, or RRC idle mode.

The (2-2)-th MBS reception method 1h-20: In the (2-2)-th MBS reception method 1h-20 of FIG. 1H, a physical channel or transport channel (e.g., MBCH, MBS channel, or DL-SCH channel) for the MBS service may be configured, or in the existing DL-SCH channel, a separate transmission resource (frequency, time resource, transmission period, bandwidth part (or bandwidth part identifier), bandwidth, dedicated frequency (frequency information or SCell identifier), subcarrier interval, etc.) may be configured or defined in the system information, the RRC message (e.g., RRCSetup, RRCResume, RRCReconfiguration, RRCRelease, or a newly defined RRC message), or the control message (e.g., transmitted from the MBS control data channel) for the MBS channel. A MAC header is attached to MBS data transmitted for the MBS service, and a logical channel identifier included in the MAC header may be allocated differently for the MBS control data channel (e.g., MBCCH and MBS control channel) or the MBS user data channel (e.g., MBTCH and MBS traffic channel), respectively. In addition, different logical channel identifiers may be allocated to each MBS service serviced in the MBS user data channel. In addition, different RNTI identifiers may be allocated to the MBS control data channel (e.g., MBTCH and MBS control channel) or the MBS user data channel (e.g., MBTCH and MBS traffic channel). In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the logical channel identifier may allocate the same logical channel identifier to the MBS control data channel, the MBS user data channel, or each MBS service serviced in the MBS user data channel. As another method, the same RNTI identifiers may be allocated to the MBS control data channel (e.g., MBCCH and MBS control channel), the MBS user data channel, or each MBS service serviced in the MBS user data channel, and in more detail, the channel or data may be distinguished by allocating different logical channel identifiers to the MBS control data channel (e.g., MBCCH and MBS control channel), the MBS user data channel, or each MBS service serviced in the MBS user data channel. As described above, the RNTI identifier for the MBS service may be configured differently from the RNTI identifier for the DL-SCH (e.g., C-RNTI, MCS-C-RNTI, CS-RNTI, etc.). As another method, as described above, the RNTI identifier for the MBS service may be configured to be the same as the RNTI identifier (e.g., C-RNTI, MCS-C-RNTI, CS-RNTI, etc.) for the DL-SCH, and differentiation may be performed with a logical channel identifier. In addition, for each MBS service serviced in the MBS user data channel, in the system information, the RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcasted, and each logical channel identifier or each RNTI identifier corresponding to the first identifier or the second identifier of each MBS service may be configured or broadcasted. As described above, the first identifier may indicate a public land mobile network (PLMN) serving the MBS or may indicate an MBS service type or session. As described above, the second identifier may indicate a more specific session or type of MBS service. A logical channel identifier that may be allocated to a bearer for a general data service (voice, Internet, or video service) in the DL-SCH channel may be allocated as one combination of predetermined bits (e.g., 6 bits) in a first logical channel identifier space that may be generated with predetermined bits (e.g., 6 bits). As described above, a logical channel identifier for the MBS control data channel, the MBS user data channel, or each service of the MBS user data channel may be allocated as one combination of predetermined bits (e.g., 6 bits) in the first logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the first logical channel identifier space. As another method, in order to double the logical channel identifier space, as described above, a logical channel identifier for the MBS control data channel, the MBS user data channel, or each service of the MBS user data channel may be allocated as one combination of predetermined bits (e.g., 6 bits) in the second logical channel identifier space. Alternatively, MAC control information (MAC CE, control element, e.g., MAC CE to instruct the network to stop MBS services or to instruct the UE to stop receiving MBS services to the network) for supporting the MBS service or a logical channel identifier for padding for inserting padding into MBS data for supporting the MBS service may also be allocated as one combination of predetermined bits (e.g., 6 bits) in the new second logical channel identifier space. As described above, the first logical channel identifier space and the second logical channel identifier space may be distinguished as an MBS channel, a DL-SCH channel, or a transmission resource (frequency, time transmission resource, frequency information, bandwidth part identifier, bandwidth part configuration information, dedicated carrier, dedicated cell (SCell) identifier, or dedicated cell information) in the MAC layer device, or may be distinguished by using different RNTIs. Accordingly, when the MAC layer device of the UE receives MBS data through a channel or transmission resource for receiving the MBS service, the MBS data may be classified or demultiplexed based on the received transport channel (e.g., MBCH, DL-SCH, BCH, etc.), bandwidth part identifier, SCell identifier, logical channel identifier, or RNTI identifier, and the data may be transmitted to a corresponding upper layer device. The MBS reception method 2-2 may be applied to a UE in an RRC connected mode, RRC inactive mode, or RRC idle mode.

The (2-3)-th MBS reception method 1*h*-20: In the (2-3)-the MBS reception method 1*h*-20 of FIG. 1H, a physical channel or transport channel (e.g., MBCH, MBS channel, or DL-SCH channel) for the MBS service may be configured, or in the existing DL-SCH channel, a separate transmission resource (frequency, time resource, transmission period, bandwidth part (or bandwidth part identifier), bandwidth, dedicated frequency (frequency information or SCell identifier), subcarrier spacing, etc.) may be configured or defined in the system information, RRC message (e.g., RRCSetup, RRCResume, RRCReconfiguration, RRCRelease, or a newly defined RRC message), or the control message (e.g., transmitted from the MBS control data channel) for the MBS channel. A MAC header may be not attached to MBS data transmitted for the MBS service, and the MBS control data channel (e.g., MBCCH and MBS control channel) or the MBS user data channel (e.g., MBTCH and MBS traffic channel) may be differentiated from each other based on the RNTI identifier. In addition, different RNTI identifiers may be allocated to the MBS control data channel (e.g., MBCCH and MBS control channel) or the MBS user data channel (e.g., MBTCH and MBS traffic channel). In addition, different RNTI identifiers may be allocated to each MBS service serviced in the MBS user data channel. Accordingly, because the MBS control data channel (e.g., MBCCH and MBS control channel), the MBS user data channel, or each MBS service serviced in the MBS user data channel may be distinguished by the RNTI identifiers, the logical channel identifier does not need to be configured for the MBS control data channel, the MBS user data channel, or each MBS service serviced in the MBS user data channel, and there is no need to include a MAC header in the MBS data. In addition, for each MBS service serviced in the MBS user data channel, in the system information, the RRC message (e.g., RRCSetup, RRCResume, RRCReconfiguration, RRCRelease, or a newly defined RRC message), or the control message (e.g., transmitted from the MBS control data channel) for the MBS channel, a first identifier or a second identifier for each MBS service may be configured or broadcasted, and each RNTI identifier corresponding to the first identifier or the second identifier of each MBS service may be configured or broadcasted. As described above, the first identifier may indicate a public land mobile network (PLMN) serving the MBS or may indicate an MBS service type or session. As described above, the second identifier may indicate a more specific session or type of MBS service. Accordingly, when the MAC layer device of the UE receives MBS data through a channel or transmission resource for receiving the MBS service, the MBS data may be classified or demultiplexed based on the received transport channel (e.g., MBCH, DL-SCH, and BCH), bandwidth part identifier, SCell identifier, or RNTI identifier, and the data may be transmitted to a corresponding upper layer device. The MBS reception method 2-3 may be applied to a UE in an RRC connected mode, RRC inactive mode, or RRC idle mode.

Figure 1I:
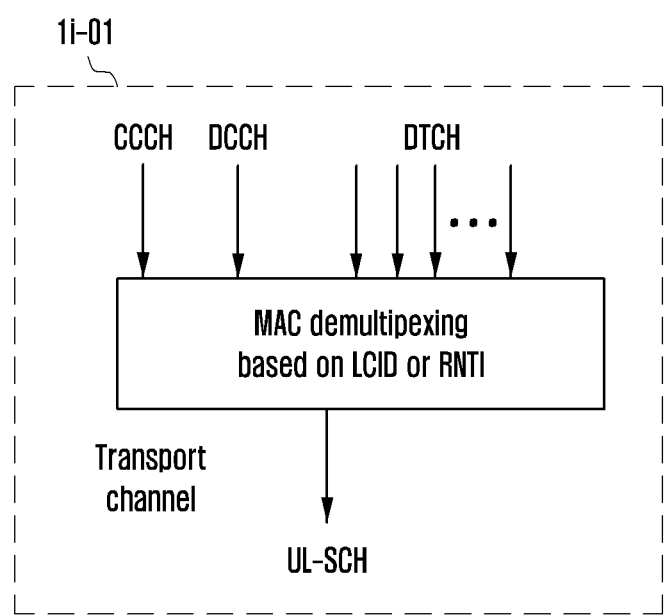
FIG. 1I is a diagram illustrating a method for multiplexing MBS data to be transmitted in a MAC layer device in case that a UE in an RRC connected mode, an RRC inactive mode, or an RRC idle mode transmits the MBS data through a multicast bearer or a unicast bearer supporting the MBS service with a bearer structure proposed in the disclosure.

FIG. 1I is a diagram illustrating a method for multiplexing MBS data to be transmitted in a MAC layer device in case that a UE in an RRC connected mode, an RRC inactive mode, or an RRC idle mode transmits the MBS data through a multicast bearer or a unicast bearer supporting the MBS service with a bearer structure proposed in the disclosure. Specifically, FIG. 1I is a diagram illustrating a method of multiplexing MBS data to be transmitted in a MAC layer device when a UE in RRC connected mode, RRC inactive mode, or RRC idle mode transmits the MBS data (e.g., MBS control data or MBS user data or general data other than MBS data) through a multicast bearer or a unicast bearer supporting the MBS service with the bearer structure proposed in FIG. 1G according to various embodiments of the disclosure.

In FIG. 1I, one method or a plurality of methods among the following methods may be applied to the method for transmitting MBS data or the method of transmitting MBS data and multiplexing the MBS data. As another method, different methods may be applied according to whether the UE is in an RRC connected mode, an RRC inactive mode, or an RRC idle mode among the following methods.

First MBS transmission method 1i-01: In case that a UE receiving the MBS service by the methods proposed in FIG. 1H needs to transmit uplink MBS data due to a network request or the necessity of the UE itself, the UE or the UE in the RRC connected mode, the RRC inactive mode, or the RRC idle mode may transmit uplink MBS data to the base station or the network. As described above, the network or the base station may transmit or configure an indication (e.g., stopping or resuming services) for the MBS service status or a response request (for example, information or indicator requesting whether the UE is receiving a specific MBS service, whether the UE wants or is interested in receiving a specific MBS service, preference between a multicast bearer and a unicast bearer, or information or indicator requesting whether a bearer prefers to switch (whether the UE wants to receive the MBS service through a multicast bearer or through a unicast bearer)) for the MBS service by transmitting a network request included in the MBS data (e.g., MBS control data, MBS user data, RRC message, RLC control data (RLC control PDU), PDCP control data (PDCP control PDU), MAC control data (MAC CE, control element), or a newly defined message) to the UE. As described above, the base station or the network may transmit MBS data including the network request at a separate downlink channel, a physical channel for MBS service, a transport channel (e.g., MBCH and MBCH channel), or a separate transmission resource (frequency, time resource, transmission period, bandwidth part (or bandwidth part identifier), bandwidth, dedicated frequency (frequency information or SCell identifier), subcarrier spacing, etc.) configured in the system information, the RRC message (e.g., RRCSetup, RRCResume, RRCReconfiguration, RRCRelease, or a newly defined RRC message), or the control message (e.g., transmitted from the MBS control data channel) for the MBS channel as suggested in FIG. 1H so that the UEs in the RRC connected mode, RRC inactive mode, or RRC idle mode may receive the MBS data. By transmitting as described above, MBS data may be transmitted with one transmission resource, and a plurality of UEs may receive the MBS data, thereby preventing waste of transmission resources and efficiently using the transmission resource. As another method, as described above, the base station or the network may transmit MBS data including the network request through downlink channel (e.g., DL-SCH channel, CCCH, or DCCH channel), separate transmission resource (frequency, time resource, transmission period, bandwidth part (or bandwidth part identifier), bandwidth, dedicated frequency (frequency information or SCell identifier), and subcarrier spacing), SRB0 (CCCH, common control channel), or SRB1 (DCCH, downlink control channel) configured in the system information or the RRC message (e.g., RRCSetup, RRCResume, RRCReconfiguration, RRCRelease, or a newly defined RRC message) as suggested in FIG. 1H and may transmit the MBS data only to the UEs in the RRC connected mode to receive the MBS data, respectively. As described above, the uplink MBS data may be MBS control data, MBS user data, RRC message, RLC control data (RLC control PDU), PDCP control data (PDCP control PDU), MAC control data (MAC CE, control element), or a newly defined message. In the first MBS transmission method, the UE may transmit the uplink MBS data through a separate uplink channel configured in system information, an RRC message (e.g., RRCSetup, RRCResume, RRCReconfiguration, RRCRelease, or a newly defined RRC message), or a control message (e.g., transmitted from the MBS control data channel) for an MBS channel, a physical channel for MBS service, a transport channel (e.g., UL-MBCH and MBCH channel), or a separate transmission resource (frequency, time resource, transmission period, bandwidth part (or bandwidth part identifier), bandwidth, dedicated frequency (frequency information or SCell identifier), subcarrier spacing, etc.). For example, the UE may include a MAC header in the uplink MBS data, configure the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header to match the purpose (MBS control data, MBS user data, or MBS user data for a specific MBS service) of the uplink MBS data, and transmit the uplink MBS data. An RLC header, a PDCP header, or an SDAP header may also be included according to which bearer structure among the bearer structures proposed in FIG. 1G is configured. As another method, the UE may transmit the uplink MBS data from the uplink transmission resource indicated by the PDCCH with an RNTI identifier (RNTI configured for MBS user data (channel) or MBS user data (channel) for a specific MBS service) suitable for the purpose (MBS control data, MBS user data, or MBS user data for a specific MBS service) of the uplink MBS data. Because the uplink MBS data may be identified by an RNTI identifier, the uplink MBS data may not include a MAC header or a logical channel identifier. As another method, the MAC header may be included in the uplink MBS data, the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header may be configured to match the purpose (MBS control data, MBS user data, or MBS user data for a specific MBS service) of the uplink MBS data, and the uplink MBS data may be transmitted. An RLC header, a PDCP header, or an SDAP header may also be included according to which bearer structure among the bearer structures proposed in FIG. 1G is configured.

The second MBS transmission method 1*i*-01: In case that a UE receiving the MBS service by the methods proposed in FIG. 1H needs to transmit uplink MBS data due to a network request or the necessity of the UE itself, only the UE in the RRC connected mode may transmit uplink MBS data to the base station or the network. As described above, the network or the base station may transmit or configure an indication (e.g., stopping or resuming services) for the MBS service status or a response request (for example, information or indicator requesting whether the UE is receiving a specific MBS service, whether the UE wants or is interested in receiving a specific MBS service, preference between a multicast bearer and a unicast bearer, or information or indicator requesting whether a bearer prefers to switch (whether the UE wants to receive the MBS service through a multicast bearer or through a unicast bearer)) for the MBS service by transmitting a network request included in the MBS data (e.g., MBS control data, MBS user data, RRC message, RLC control data (RLC control PDU), PDCP control data (PDCP control PDU), MAC control data (MAC CE, control element), or a newly defined message) to the UE. As described above, the base station or the network may transmit MBS data including the network request at a separate downlink channel, a physical channel for MBS service, transport channel (e.g., MBCH and MBCH channel), or a separate transmission resource (frequency, time resource, transmission period, bandwidth part (or bandwidth part identifier), bandwidth, dedicated frequency (frequency information or SCell identifier), subcarrier spacing, etc.) configured in the system information, the RRC message (e.g., the RRCSetup, RRCResume, RRCReconfiguration, RRCRelease, or a newly defined RRC message), or the control message (e.g., transmitted from the MBS control data channel) for the MBS channel as suggested in FIG. 1H so that the UEs in the RRC connected mode, RRC inactive mode, or RRC idle mode may receive the MBS data. By transmitting as described above, MBS data may be transmitted with one transmission resource, and a plurality of UEs may receive the MBS data, thereby preventing waste of transmission resources and efficiently using the transmission resource. As another method, as described above, the base station or the network may transmit MBS data including the network request through downlink channel (e.g., DL-SCH channel, CCCH, or DCCH channel), separate transmission resource (frequency, time resource, transmission period, bandwidth part (or bandwidth part identifier), bandwidth, dedicated frequency (frequency information or SCell identifier), subcarrier spacing, etc.), SRB0 (CCCH, common control channel), or SRB1 (DCCH, downlink control channel) configured in the system information or RRC message (e.g., RRCSetup, RRCResume, RRCReconfiguration, RRCRelease, or newly defined RRC message) as suggested in FIG. 1H and may transmit the MBS data only to the UEs in the RRC connected mode to receive the MBS data, respectively. As described above, the uplink MBS data MBS data may be MBS control data, MBS user data, RRC message, RLC control data (RLC control PDU), PDCP control data (PDCP control PDU), MAC control data (MAC CE, control element), or a newly defined message. In the second MBS transmission method, the UE in the RRC connected mode may transmit the uplink MBS data through a separate uplink channel or a physical channel or a transport channel (e.g., UL-SCH, uplink shared channel, and channel for general data service) or a separate transmission resource (frequency, time resource, transmission period, bandwidth part (or bandwidth part identifier), bandwidth, dedicated frequency (frequency information or SCell identifier), and subcarrier spacing) or a transmission resource allocated to a PDCCH scrambled by an RNTI identifier (e.g., C-RNTI) allocated to an RRC connected mode UE configured in the system information, the RRC message (e.g., RRCSetup, RRCResume, RRCReconfiguration, RRCRelease, or a newly defined RRC message), or the control message for the MBS channel (e.g., transmitted from the MBS control data channel). As described above, in case that uplink MBS data is transmitted through a transmission resource allocated to a PDCCH scrambled by an RNTI identifier (e.g., C-RNTI) allocated to an RRC connected mode UE, the RRC connected mode UE may transmit uplink MBS data through SRB0 (CCCH, common control channel), SRB1 (DCCH, downlink control channel) or DRB. For example, the UE in the RRC connected mode may include a MAC header in the uplink MBS data, configure the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header to match the purpose (MBS control data, MBS user data, or MBS user data for a specific MBS service) of the uplink MBS data, and transmit the uplink MBS data. An RLC header, a PDCP header, or an SDAP header may also be included according to which one of the bearer structures proposed in FIG. 1G is configured. As another method, the RRC connected mode UE may transmit the uplink MBS data from the uplink transmission resource indicated by the PDCCH with an RNTI identifier (RNTI configured for MBS user data (channel) or MBS user data (channel) for a specific MBS service) suitable for the purpose (MBS control data, MBS user data, or MBS user data for a specific MBS service) of the uplink MBS data. Because the uplink MBS data may be identified by an RNTI identifier, the uplink MBS data may not include a MAC header or a logical channel identifier. As another method, the MAC header may be included in the uplink MBS data, the logical channel identifier (MBS control data (channel), MBS user data (channel), MBS user data (channel) for a specific MBS service, SRB0 (CCCH, common control channel), SRB1 (DCCH, downlink control channel), or logical channel identifier configured or allocated for DRB or MAC control information) of the MAC header may be configured to match the purpose (MBS control data, MBS user data, or MBS user data for a specific MBS service) of the uplink MBS data, and the uplink MBS data may be transmitted. An RLC header, a PDCP header, or an SDAP header may also be included depending on which bearer structure among the bearer structures proposed in FIG. 1G is configured.

In the following of the disclosure, signaling procedures for the base station or the network to support the MBS service to the UE and the UE to receive the MBS service are proposed. As suggested in the following of the disclosure, the base station may provide the MBS service to the UE through one signaling procedure among various signaling procedures, or the UE may receive the MBS service.

Figure 1J:
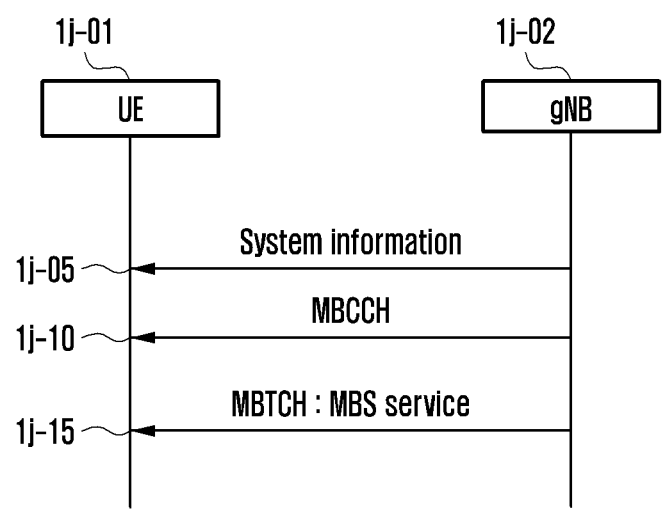
FIG. 1J is a diagram illustrating a first signaling procedure for supporting an MBS service proposed in the disclosure.

FIG. 1J is a diagram illustrating a first signaling procedure for supporting an MBS service proposed in the disclosure.

The first signaling procedure for MBS service support proposed in the disclosure may be featured in that the MBS service is supported to the UE based on system information.

In FIG. 1J, the UE 1j-01 may select a suitable cell by performing a cell selection or reselection procedure in the RRC idle mode or RRC inactive mode and camps on, and then in the RRC idle mode, RRC inactive mode, or RRC connected mode, the UE may receive system information 1j-05, and may receive configuration information for the MBS service from the system information. The configuration information for the MBS service may include one or more of the following configuration information. For example, the network may transmit one or more of the following configuration information to support the MBS service in the system information:

Whether to support MBS service

Configuration information for a physical channel or downlink or uplink transport channel (e.g., MBCH, MBCCH, MBTCH, or DL-SCH) for MBS service Information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) through which the physical channel or downlink or uplink transport channel (e.g., MBCH, MBS control data channel (MBCCH), or MBS user data channel (MBTCH)) is transmitted.

Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, and identifier indicating a transmission pattern) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer Information related to MBS dedicated carrier or cell (Cell, SCell, or PCell) for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure As described above, in the configuration information, the PDCP serial number or RLC serial number length may also be set, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

If the configuration information for the MBS service is not broadcasted in the system information in one cell camped on as described above, the UE may transmit a message or an indicator requesting to broadcast system information for the MBS service to the base station, cell, or network in one camped-on cell. Upon receiving the message or indicator, the base station or the network may broadcast or transmit configuration information for the MBS service as system information. Accordingly, the base station may prevent waste of transmission resources that may occur by always broadcasting system information related to the MBS service unnecessarily in the system information.

The UE receiving the system information 1j-05 as described above may receive MBS data (MBS control data or MBS user data) in a transmission resource through which an MBS control data channel or an MBS user data channel for an MBS service of interest is transmitted by searching or determining the MBS service that the UE is interested in or wants to receive through storing or applying the MBS service-related configuration information. When the UE receives the system information as described above, when the UE tries to receive the service of interest or has the service of interest or decides the service of interest, when the UE is in or enter a cell or area supporting the MBS service in the system information, when the UE configures or connects the MBS service (or session), when the UE receives configuration information or bearer configuration information for MBS service in the system information, or when configuration information for MBS service or the bearer configuration information is received or broadcasted from the system information or the RRC message (e.g., RRCSetup, RRCResume, RRCReconfiguration, RRCRelease, or newly defined RRC message), or the control message (e.g., transmitted from the MBS control data channel) for the MBS channel, the UE may configure a unicast bearer, a multicast bearer, or an MBS bearer for receiving the MBS service having the above-proposed bearer structure.

As described above, the UE may receive MBS data (e.g., MBS control data) through the MBS control data channel 1j-10 or the transmission resource for the MBS service of interest to receive MBS service-related configuration information.

The MBS service-related configuration information may be transmitted including one or more of the following configuration information to support the MBS service:
Whether to support MBS service
Configuration information for a physical channel or downlink or uplink transport channel (e.g., MBCH, MBCCH, MBTCH, or DL-SCH) for MBS service
Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted
Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, and identifier indicating a transmission pattern) in which each MBS service is supported, broadcasted, or transmitted.

In the bearer structure proposed in FIG. 1G, bearer configuration may be included to receive MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as default configuration information, and the UE may configure some of the functions as the MBS bearer having a default function without the above configuration information.

Indicator configuration information indicating whether a bearer or a bearer identifier supporting (transmitting or receiving) the MBS service is a unicast bearer or a multicast bearer MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set, and as another method, a default length for the RLC serial number or PDCP serial number may be determined.

In the configuration information, whether the RLC layer device of the bearer supporting the MBS service supports or enables the uni-directional communication or supports or enables the bi-directional communication may also be configured as an indicator.

Upon receiving the MBS service-related configuration information as described above, the UE may receive MBS data by applying the method proposed in FIG. 1G or FIG. 1H of the disclosure to receive the MBS service (1j-15) through the MBS user data service channel by identifying and using the first identifier, the second identifier, the RNTI identifier, or the logical channel identifier configured or allocated for the MBS service that the UE is interested in or wants to receive.

Figure 1K:
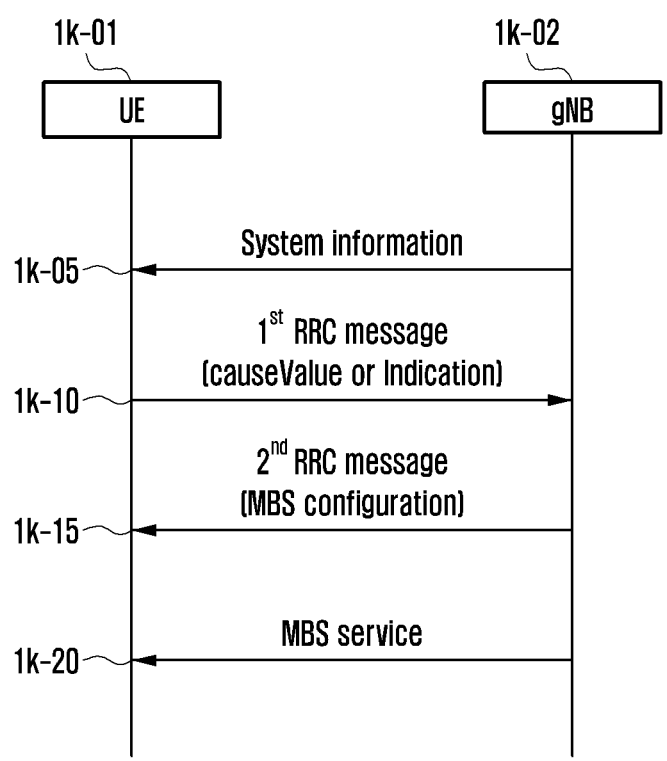
FIG. 1K is a diagram illustrating a second signaling procedure for supporting an MBS service proposed in the disclosure.

FIG. 1K is a diagram illustrating a second signaling procedure for supporting an MBS service proposed in the disclosure.

The second signaling procedure for MBS service support proposed in the disclosure may be featured by identifying whether the UE is interested in or intends to receive the MBS service based on system information, or configuring a connection with the network to indicate to the base station (or network) the MBS service that the UE is interested in or wants to receive, or transmitting an indication to receive the MBS service, receiving MBS service related configuration information from the base station (or network), and receiving the MBS service. In the second signaling procedure, the UE may maintain the RRC idle mode, the RRC connected mode, or the RRC inactive mode (for example, the MBS service may be received without switching the RRC mode). As another method, the UE may be featured in indicating to the base station (or network) the MBS service that the UE is interested in or wants to receive, or transmitting an indication to receive the MBS service and entering the RRC connected mode from the RRC idle mode or RRC inactive mode to receive MBS service-related configuration information from the base station (or network). Alternatively, after receiving the MBS service-related configuration information as described above, the UE may receive the MBS service in the RRC connected mode or the MBS service in the RRC idle mode or RRC inactive mode.

In FIG. 1K, the UE 1k-01 may select a suitable cell by performing a cell selection or reselection procedure in the RRC idle mode or RRC inactive mode and camps on, and then in the RRC idle mode, RRC inactive mode, or RRC connected mode, the UE 1k-01 may receive system information 1k-05, and may receive configuration information for the MBS service from the system information. The configuration information for the MBS service may include one or more of the following configuration information. That is, the network may transmit one or more of the following configuration information to support the MBS service in the system information:

Whether to support MBS service

Configuration information for a physical channel or downlink or uplink transport channel (e.g., MBCH, MBCCH, MBTCH, or DL-SCH) for MBS service Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted.

Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer.

MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure In the above-described configuration information, the PDCP serial number or RLC serial number length may also be set, and as another method, a default length for the RLC serial number or PDCP serial number may be determined.

As described above configuration information, whether the RLC layer device of the bearer supporting the MBS service supports or enables unit-directional communication or supports or enables bi-directional communication may also be configured as an indicator.

If the configuration information for the MBS service is not broadcasted in the system information in one camped-on cell as described above, the UE may transmit a message or an indicator requesting to broadcast system information for the MBS service to the base station, cell, or network in one camped-on cell. Upon receiving the message or indicator, the base station or the network may broadcast or transmit configuration information for the MBS service as system information. Accordingly, the base station may prevent waste of transmission resources that may occur by always broadcasting MBS service-related system information unnecessarily in the system information.

A UE that has received or identified MBS service-related information as the system information above, a UE that has identified that the MBS service of interest is broadcasted in the current cell through the system information, or a UE that intends to request the MBS service of interest to the network may perform a random access procedure and transmit the first RRC message to the network. The first RRC message may be an RRC message for a newly defined MBS service, and defined as an RRCSetupRequest message, RRCResumeRequest message, other existing RRC message, MAC control information, RLC control information, or PDCP control information. The UE may include an indicator indicating that the UE attempts to receive an MBS service in the first RRC message, or include an indicator indicating reception of the NMBS service for configuring an RRC connection with the network, or may indicate by including the first identifier or the second identifier, the logical channel identifier, the RNTI identifier, or the bearer identifier of the MBS service that the UE is interested in or that the UE intends to receive. As described above, in the first RRC message, the UE may include an indicator indicating the type (e.g., unicast bearer or multicast bearer) or structure of a bearer that needs to be applied or established or used for the MBS service or the type (e.g., unicast bearer or multicast bearer) or structure of a preferred bearer, or an indicator indicating in which RRC mode (RRC connected mode, RRC idle mode, or RRC disabled mode) the UE wants to receive the MBS service. Alternatively, as described above, the UE may transmit an indicator for an MBS service that is no longer interested, an MBS service that is about to stop receiving, or an MBS service that has stopped receiving or an indicator to change MBS service to another MBS service by including the same in the first RRC message. As described above, the indicator included in the first RRC message by the UE may be determined or indicated based on the system information received instep 1k-05. In addition, the UE may include UE capability information in the first RRC message. For example, when the UE is about to receive the MBS service, the UE may include a function supported by the UE capability, configurable configuration information, or a function or configuration information implemented in the UE in the first RRC message to be transmitted, and notify the base station. As described above, if the UE has previously established a connection or is storing the UE identifier allocated from the network, or if the UE identifier is indicated in the upper layer device (e.g., NAS layer device or RRC layer device), the UE may transmit the first RRC message including the UE identifier to allow the network to distinguish or identify the UE. For example, the base station or network may identify the UE based on the UE identifier included above and retrieve and identify the UE capability information from the core network, or may retrieve and identify the configuration information of the UE from the base station with which the connection was previously configured. When the UE receives the system information as described above, when the UE tries to receive the service of interest or has the service of interest or decides the service of interest, when the UE is in or enters a cell or area supporting the MBS service in system information, or when the UE configures or connects the MBS service (or session), the UE may configure a connection with a network and transmit the first RRC message.

If the base station receives the first RRC message in the procedure 1k-10 above, the base station may identify the MBS service or UE capability information that the UE is interested in or intends to receive.

The base station or the network may transmit a second RRC message 1k-15 to the UE in order to support or configure the MBS service to the UE (1k-15). The second RRC message may be an RRC message for a newly defined MBS service, or may be defined as an RRCRelease message, an RRCReconfiguration message, or another existing RRC message.

The second RRC message may include configuration information for MBS service, configuration information for the MBS service indicated by the UE in the first RRC message, bearer configuration information, unicast bearer or multicast bearer for receiving MBS service, or MBS bearer configuration information.

The second RRC message may include one or more of the following configuration information for MBS service support and may be transmitted:

Whether to support MBS service
- Configuration information for a physical channel or downlink or uplink transport channel (e.g., MBCH, MBCCH, MBTCH, or DL-SCH) for MBS service
- Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted.
- Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.
- In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer Indicator or configuration information to transition to RRC idle mode, RRC inactive mode, or RRC connected mode MBS service configuration information or bearer configuration information suggested above for receiving MBS service in RRC idle mode MBS service configuration information or bearer configuration information suggested above for receiving MBS service in RRC inactive mode MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above-described configuration information, the PDCP serial number or RLC serial number length may also be set, and as another method, a default length for the RLC serial number or PDCP serial number may be determined.

In the above-described configuration information, whether the RLC layer device of the bearer supporting the MBS service supports or enables uni-directional communication or supports or enables bi-directional communication may also be configured as an indicator.

As described above, the UE having received the second RRC message may receive MBS data (MBS control data or MBS user data) in a transmission resource through which an MBS control data channel or an MBS user data channel for an MBS service of interest is transmitted by searching or determining the MBS service that the UE is interested in or wants to receive through storing or applying the MBS service-related configuration information. When the UE receives the system information as described above, when the UE tries to receive the service of interest or has the service of interest or decides the service of interest, when the UE is in or enters a cell or an area supporting the MBS service in system information, when the UE configures or connects the MBS service (or session), when the UE receives the configuration information or bearer configuration information for the MBS service in the system information, the RRC message (e.g., RRCSetup, RRCResume, RRCReconfiguration, RRCRelease, or a newly defined RRC message), or the control message (e.g., transmitted from the MBS control data channel) for the MBS channel, or when the information is received or broadcasted, the UE may configure a unicast bearer, a multicast bearer, or an MBS bearer for receiving the MBS service having the above-proposed bearer structure.

As described above, the UE may receive MBS data (e.g., MBS control data) through the MBS control data channel or the transmission resource for the MBS service of interest to receive MBS service-related configuration information.

Upon receiving the MBS service-related configuration information as described above, the UE may receive MBS data by applying the method proposed in FIG. 1G or FIG. 1H of the disclosure to receive the MBS service (1k-20) through the MBS user data service channel by identifying and using the first identifier, the second identifier, the RNTI identifier, or the logical channel identifier configured or allocated for the MBS service that the UE is interested in or wants to receive in order to receive the MBS service that the UE is interested in or wants to receive.

As described above, it may be featured in that the ciphering procedure or the integrity protection procedure is not applied to the first RRC message or the second RRC message. As another method, it may be featured that in order to enhance security, the ciphering procedure or the integrity protection procedure is not applied to the first RRC message or the second RRC message, and the ciphering procedure or the integrity protection procedure is applied to the first RRC message or the second RRC message. As another method, in order to more enhance security, it may be featured in that the ciphering procedure or the integrity protection procedure is applied to the first RRC message or the second RRC message, and the ciphering procedure or the integrity protection procedure is applied to the first RRC message or the second RRC message.

Figure 1L:
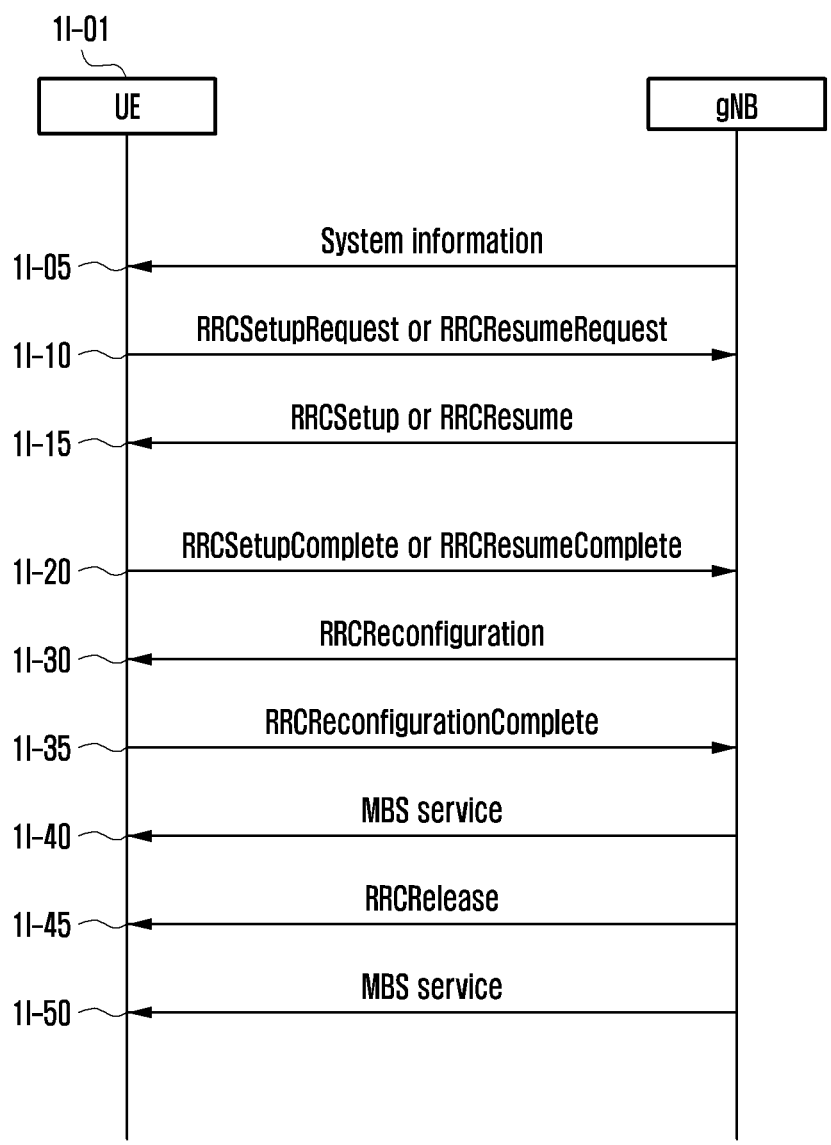
FIG. 1L is a diagram illustrating a third signaling procedure for supporting an MBS service proposed in the disclosure.

FIG. 1L is a diagram illustrating a third signaling procedure for supporting an MBS service proposed in the disclosure.

The third signaling procedure for MBS service support proposed in the disclosure may be featured by identifying whether the UE is interested in or broadcasts the MBS service based on system information, or configuring a connection with the network to indicate to the base station (or network) the MBS service that the UE is interested in or wants to receive, or transmitting an indication to receive the MBS service, receiving MBS service related configuration information from the base station (or network), and receiving the MBS service. In the third signaling procedure, the UE may maintain the RRC idle mode, the RRC connected mode, or the RRC inactive mode. As another method, the UE may be featured in indicating to the base station (or network) the MBS service that the UE is interested in or wants to receive, or transmitting an indication to receive the MBS service and entering the RRC connected mode from the RRC idle mode or RRC inactive mode to receive configuration information related to the MBS service from the base station (or network). Alternatively, after receiving the configuration information related to the MBS service as described above, the UE may receive the MBS service in the RRC connected mode or the MBS service in the RRC idle mode or RRC inactive mode.

In FIG. 1L, the UE 1l-01 may select a suitable cell by performing a cell selection or reselection procedure in the RRC idle mode or RRC inactive mode and camps on, and then the UE in the RRC idle mode, RRC inactive mode, or RRC connected mode may receive system information 1l-05, and may receive configuration information for the MBS service from the system information. The configuration information for the MBS service may include one or more of the following configuration information. That is, the network may include and transmit one or more of the following configuration information to support the MBS service in the system information:

Whether to support MBS service

Configuration information for a physical channel or downlink or uplink transport channel (e.g., MBCH, MBCCH, MBTCH, or DL-SCH) for MBS service Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted.

Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., TMGI) or the second identifier (e.g., session identity) or the RNTI identifier for the MBS service may be configured or broadcasted for each bearer (or bearer identifier), logical channel, RLC configuration information, or PDCP configuration information. As described above, the first identifier may indicate a public land mobile network (PLMN) serving the MBS or may indicate an MBS service type or session. As described above, the second identifier may indicate a more specific session or type of the MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, and identifier indicating a transmission pattern) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

- Indicator configuration information indicating whether a bearer or a bearer identifier supporting (transmitting or receiving) the MBS service is a unicast bearer or a multicast bearer
- MBS dedicated carrier or cell (Cell, SCell, or PCell) related information for MBS service (e.g., frequency, time resource, or cell identifier)
- MBS dedicated bandwidth part information (e.g., downlink bandwidth part or uplink bandwidth part information) or bandwidth part identifier information for MBS service
- Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

In the above-described configuration information, the PDCP serial number or RLC serial number length may also be set, and as another method, a default length for the RLC serial number or PDCP serial number may be determined.

In the above-described configuration information, whether the RLC layer device of the bearer supporting the MBS service supports or enables uni-directional communication or supports or enables bi-directional communication may also be configured as an indicator.

If the configuration information for the MBS service is not broadcasted in the system information in one cell camped on as described above, the UE may transmit a message or an indicator requesting to broadcast system information for the MBS service to the base station, cell, or network in one camped-on cell. Upon receiving the message or indicator, the base station or the network may broadcast or transmit configuration information for the MBS service as system information. Accordingly, the base station may prevent waste of transmission resources that may occur by always broadcasting MBS service-related system information unnecessarily in the system information.

A UE that has received or identified MBS service-related information as the system information above, a UE that has identified that the MBS service of interest is broadcasted in the current cell through the system information, or a UE that intends to request the MBS service of interest to the network may perform a random access procedure and transmit the first RRC message to the network. The first RRC message may be an RRC message for a newly defined MBS service, and defined as an RRCSetupRequest message, RRCResumeRequest message, or other existing RRC message. The UE may include an indicator indicating that the UE attempts to receive an MBS service in the first RRC message, or include an indicator indicating reception of the MBS service as a reason for configuring an RRC connection with the network. Alternatively, as described above, if the UE has previously established a connection or is storing the UE identifier (e.g., a UE identifier allocated from the core network (5G-S-TMSI) or a UE identifier for RRC connection resumption allocated from a base station (short I-RNTI or I-RNTI)) allocated from the network, or if the UE identifier is indicated in the upper layer device (e.g., NAS layer device or RRC layer device), the UE may transmit the first RRC message including the UE identifier to allow the network to distinguish or identify the UE. For example, the base station or network may identify the UE based on the UE identifier included above and retrieve and identify the UE capability information from the core network, or may retrieve and identify the configuration information of the UE or UE capability information from the base station with which the connection was previously configured. When the UE receives the system information as described above, when the UE tries to receive the service of interest or has the service of interest or decides the service of interest, when the UE is in or enters a cell or area supporting the MBS service in system information, or when the UE configures or connects the MBS service (or session), the UE may configure a connection with a network and transmit the first RRC message.

If the base station receives the first RRC message in the procedure 1*l*-10 above, the base station may identify the MBS service that the UE is interested in or intends to receive or UE capability information.

The base station or the network may transmit a second RRC message 1*l*-15 to the UE in order to support or configure the MBS service to the UE (1*l*-15). The second RRC message may be an RRC message for a newly defined MBS service, or may be defined as an RRCRelease message, an RRCReconfiguration message, or another existing RRC message.

The second RRC message may include configuration information for MBS service, configuration information for the MBS service indicated by the UE in the first RRC message, bearer configuration information, unicast bearer or multicast bearer for receiving MBS service, or MBS bearer configuration information.

The second RRC message may include one or more of the following configuration information for MBS service support and may be transmitted:

- Whether to support MBS service
- Configuration information for a physical channel or downlink or uplink transport channel (e.g., MBCH, MBCCH, MBTCH, or DL-SCH) for MBS service
- Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted Configuration information for the MBS supported by the current cell. For example, it is possible to configure or broadcast a list of MBS services, or a first identifier (e.g., TMGI) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., TMGI) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information including whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set up, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

When the UE receives the system information as described above, when the UE tries to receive the service of interest or has the service of interest or decides the service of interest, when the UE is in or enters a cell or area supporting the MBS service in system information, when the UE configures or connects the MBS service (or session), when the UE receives the configuration information or bearer configuration information for the MBS service in the system information, the RRC message (e.g., RRCSetup, RRCResume, RRCReconfiguration, RRCRelease, or newly defined RRC message), or the control message (e.g., transmitted from the MBS control data channel) for the MBS channel, or when the information is received or broadcasted, the UE may configure a unicast bearer, a multicast bearer, or an MBS bearer for receiving the MBS service having the above-proposed bearer structure.

When the UE receives the second RRC message, the UE may apply the configuration information included in the second RRC message and transmit a third RRC message (e.g., RRCSetupComplete or RRCResumeComplete) to the base station or the network in response to the second RRC message (1*l*-20).

In the third RRC message, the UE may include an indicator indicating that the UE attempts to receive the MBS service in the first RRC message. Alternatively, the third RRC message may include an indicator indicating reception of the MBS service as a reason for configuring an RRC connection with the network, or may indicate by including the first identifier or the second identifier, the logical channel identifier, the RNTI identifier, or the bearer identifier of the MBS service that the UE is interested in or that the UE intends to receive. As described above, in the first RRC message, the UE may include an indicator indicating the type (e.g., unicast bearer or multicast bearer) or structure of a bearer that needs to be applied or established or used for the MBS service or the type (e.g., unicast bearer or multicast bearer) or structure of a preferred bearer, or an indicator indicating in which RRC mode (RRC connected mode, RRC idle mode, or RRC inactive mode) the UE wants to receive the MBS service. Alternatively, as described above, the UE may transmit an indicator for an MBS service that is no longer interested, an MBS service that is about to stop receiving, or an MBS service that has stopped receiving or an indicator to change MBS service to another MBS service by including the indicator in the first RRC message. As described above, the indicator included in the first RRC message by the UE may be determined or indicated based on the system information received in step 1l-05.

In order to support the MBS service to the UE based on the preference, the indicated indicator, or base station implementation reported by the UE as described above, or to configure or reconfigure a bearer for the MBS service that the UE is receiving, or to configure or reconfigure MBS service-related configuration information, the base station may transmit the fourth RRC message (e.g., RRCReconfiguration, 1l-30) to the UE. For example, the fourth RRC message may include configuration information (e.g., an indicator to switch from a unicast bearer to a multicast bearer, an indicator to switch from a multicast bearer to a unicast bearer, or corresponding bearer configuration information) for changing the bearer type, logical channel identifier information changed or updated for each MBS service, RNTI identifier information, first identifier or second identifier information for MBS service.

The fourth RRC message may include the following configuration information or some of the information:
  Whether to support MBS service
  Configuration information for a physical channel or downlink or uplink transport channel (e.g., MBCH, MBCCH, MBTCH, or DL-SCH) for MBS service
  Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted
  Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information including indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:
Indicator configuration information indicating whether a bearer or a bearer identifier supporting (transmitting or receiving) the MBS service is a unicast bearer or a multicast bearer
Indicator configuration information indicating whether a bearer or a bearer identifier supporting (transmitting or receiving) the MBS service is a unicast bearer or a multicast bearer
Indicator or configuration information to transition to RRC idle mode, RRC inactive mode, or RRC connected mode
MBS service configuration information or bearer configuration information suggested above for receiving MBS service in RRC idle mode
MBS service configuration information or bearer configuration information suggested above for receiving MBS service in RRC inactive mode
MBS dedicated carrier or cell (Cell, SCell, or PCell) related information for MBS service (e.g., frequency, time resource, or cell identifier)
MBS dedicated bandwidth part information (e.g., downlink bandwidth part or uplink bandwidth part information) or bandwidth part identifier information for MBS service
Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set up, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

After the UE receives the fourth RRC message and stores or applies the MBS service related configuration information, the UE may configure and transmit a fifth RRC message (e.g., RRCReconfigurationComplete, 1/-35) to the base station in order to indicate successful configuration or reconfiguration.

Upon receiving the MBS service-related configuration information as described above, in the RRC connected mode, the UE may receive MBS data by applying the method proposed in FIG. 1G or FIG. 1H of the disclosure to receive the MBS service (1/-40) through the MBS user data service channel by identifying and using the first identifier, the second identifier, the RNTI identifier, or the logical channel identifier configured or allocated for the MBS service that the UE is interested in or wants to receive.

As described above, the UE may receive MBS data (e.g., MBS control data) through the MBS control data channel or the transmission resource for the MBS service of interest to receive MBS service-related configuration information.

As described above, in a case (e.g., according to the implementation of the base station, according to the request of the UE, or the instruction of the UE) where the base station attempts to transition the UE to the RRC inactive mode or the RRC idle mode, the base station may configure and transmit a sixth RRC message (e.g., RRCRelease message, 1/-45) to the UE to make the transition to the RRC idle mode or RRC inactive mode. The sixth RRC message 1/-45 may include the following configuration information or some of the information for the UE to continue to receive MBS service even in RRC idle mode or RRC inactive mode:

Whether to support MBS service

Configuration information for a physical channel or downlink or uplink transport channel (e.g., MBCH, MBCCH, MBTCH, or DL-SCH) for MBS service Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC recorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer Indicator configuration information indicating whether a bearer or a bearer identifier supporting (transmitting or receiving) the MBS service is a unicast bearer or a multicast bearer Indicator or configuration information to indicate transition to RRC idle mode, RRC inactive mode, or RRC connected mode MBS service configuration information or bearer configuration information suggested above for receiving MBS service in RRC idle mode MBS service configuration information or bearer configuration information suggested above for receiving MBS service in RRC inactive mode MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

Upon receiving the MBS service-related configuration information as described above, in the RRC idle mode or RRC inactive mode, the UE may receive MBS data by applying the method proposed in FIG. 1G or FIG. 1H of the disclosure to receive the MBS service (1*l*-50) through the MBS user data service channel by identifying and using the first identifier, the second identifier, the RNTI identifier, or the logical channel identifier configured or allocated for the MBS service that the UE is interested in or wants to receive.

As described above, the UE may transmit the first RRC message 1*l*-10 to receive the MBS service, receive the second RRC message 1*l*-15, transmit the message of a third RRC message 1*l*-20 again, receive the fourth RRC message, transmit the fifth RRC message, and receive the MBS service in the RRC connected mode. Alternatively, after that, the UE may receive the sixth RRC message 1*l*-45 and receive the MBS service in RRC idle mode or RRC inactive mode.

As another method, as described above, the UE may transmit the first RRC message 1*l*-10 to receive the MBS service, receive the second RRC message 1*l*-15 (switching to the RRC connected mode), transmit the message of a third RRC message 1*l*-20 again, receive the sixth RRC message 1*l*-45 and receive the MBS service in RRC idle mode or RRC inactive mode by switching to the RRC idle mode or the RRC inactive mode.

As described above, it may be featured in that the ciphering procedure or the integrity protection procedure is not applied to the first RRC message or the second RRC message. As another method, in order to enhance security, it may be featured in that the ciphering procedure or the integrity protection procedure is not applied to the first RRC message or the second RRC message, and the ciphering procedure or the integrity protection procedure is applied to the first RRC message or the second RRC message. As another method, in order to more enhance security, it may be featured in that the ciphering procedure or the integrity protection procedure is applied to the first RRC message or the second RRC message, and the ciphering procedure or the integrity protection procedure is applied to the first RRC message or the second RRC message. As described above, the ciphering procedure or the integrity protection procedure may be applied to the third RRC message. In addition, the ciphering procedure or the integrity protection procedure may be applied to the fourth RRC message, the fifth RRC message, or the sixth RRC message.

Figure 1M:
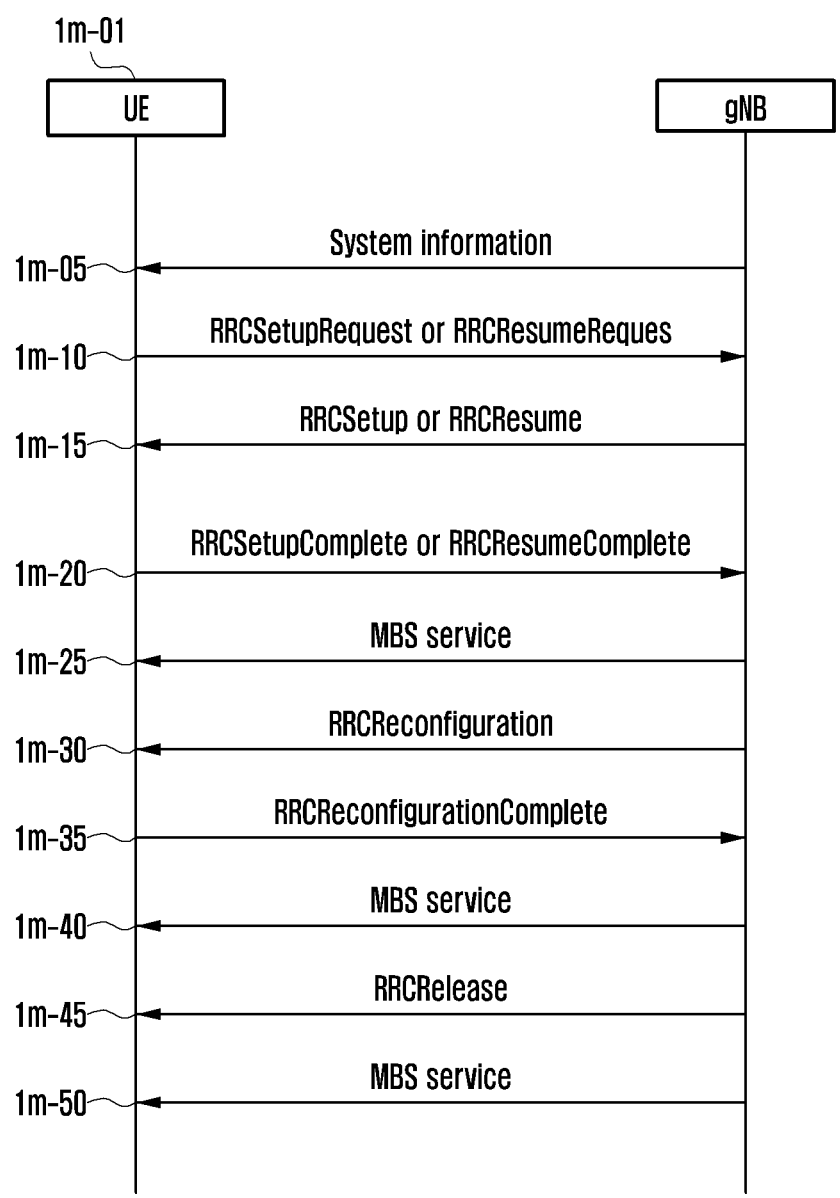
FIG. 1M is a diagram illustrating a fourth signaling procedure for supporting an MBS service proposed in the disclosure.

FIG. 1M is a diagram illustrating a fourth signaling procedure for supporting an MBS service proposed in the disclosure.

The fourth signaling procedure for MBS service support proposed in the disclosure may be featured by identifying whether the UE is interested in the MBS service being broadcasted based on system information, or configuring a connection with the network to indicate to the base station (or network) the MBS service that the UE is interested in or wants to receive, or transmitting an indication to receive the MBS service, receiving MBS service related configuration information from the base station (or network), and receiving the MBS service. In the fourth signaling procedure, the UE may maintain the RRC idle mode, the RRC connected mode, or the RRC inactive mode. As another method, the UE may be featured in indicating to the base station (or network) the MBS service that the UE is interested in or wants to receive, or transmitting an indication to receive the MBS service to the base station (or network) and entering the RRC connected mode from the RRC idle mode or RRC inactive mode to receive MBS service-related configuration information from the base station (or network). Alternatively, after receiving the MBS service-related configuration information as described above, the UE may receive the MBS service in the RRC connected mode or the MBS service in the RRC idle mode or RRC inactive mode.

In FIG. 1M, the UE 1*m*-01 may select a suitable cell by performing a cell selection or reselection procedure in the RRC idle mode or RRC inactive mode and camps on, and then in the RRC idle mode, RRC inactive mode, or RRC connected mode, the UE may receive system information 1*m*-05. In addition, the UE 1*m*-01 may receive configuration information for the MBS service from the system information. The configuration information for the MBS service may include one or more of the following configuration information. For example, the network may transmit one or more of the following configuration information to support the MBS service in the system information:

Whether to support MBS service

Configuration information for a physical channel or downlink or uplink transport channel (e.g., MBCH, MBCCH, MBTCH, or DL-SCH) for MBS service Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

If the configuration information for the MBS service is not broadcasted in the system information in one cell camped on as described above, the UE may transmit a message or an indicator requesting to broadcast system information for the MBS service to the base station, cell, or network in one camped-on cell. Upon receiving the message or indicator, the base station or the network may broadcast or transmit configuration information for the MBS service as system information. Accordingly, the base station may prevent waste of transmission resources that may occur by always broadcasting MBS service-related system information unnecessarily in the system information.

A UE that has received or identified MBS service-related information as the system information above, a UE that has identified that the MBS service of interest is broadcasted in the current cell through the system information, or a UE that intends to request the MBS service of interest to the network may perform a random access procedure and transmit the first RRC message to the network. The first RRC message may be an RRC message for a newly defined MBS service, and defined as an RRCSetupRequest message, RRCResumeRequest message, or other existing RRC message. The UE may include an indicator indicating that the UE attempts to receive an MBS service in the first RRC message, or include an indicator indicating reception of the MBS service as a reason for configuring an RRC connection with the network, or may indicate by including the first identifier or the second identifier, the logical channel identifier, the RNTI identifier, or the bearer identifier of the MBS service that the UE is interested in or that the UE intends to receive. As described above, in the first RRC message, the UE may include an indicator indicating the type (e.g., unicast bearer or multicast bearer) or structure of a bearer that may be applied or established or used for the MBS service or the type (e.g., unicast bearer or multicast bearer) or structure of a preferred bearer, or an indicator indicating in which RRC mode (RRC connected mode, RRC idle mode, or RRC inactive mode) the UE wants to receive the MBS service. Alternatively, as described above, the UE may transmit an indicator for an MBS service that is no longer interested, an MBS service that is about to stop receiving, or an MBS service that has stopped receiving or an indicator to change MBS service to another MBS service by including the indicator for the MBS service that is no longer interested, the MBS service that is about to stop receiving, or the MBS service that has stopped receiving or the indicator to change MBS service to another MBS service in the first RRC message. As described above, the indicator included in the first RRC message by the UE may be determined or indicated based on the system information received from the 1m-05. In addition, the UE may report the MBS service-related UE capability information to the base station or the network through a separate RRC message. For example, in case that the base station transmits an RRC message asking for UE capability information to the UE, when the UE tries to receive the MBS service in response to the RRC message asking for the UE capability information, the UE may include and transmit a function supported by the UE capability, configurable configuration information, or a function or configuration information implemented in the UE in the UE capability response RRC message to the base station or the network. As described above, if the UE has previously established a connection or is storing the UE identifier (e.g., a UE identifier allocated to the core network (5G-S-TMSI) or a UE identifier for RRC connection resumption allocated from the base station (short I-RNTI or I-RNTI)) allocated from the network, or if the UE identifier is indicated in the upper layer device (e.g., NAS layer device or RRC layer device), the UE may transmit the first RRC message including the UE identifier to allow the network to distinguish or identify the UE. For example, the base station or network may identify the UE based on the UE identifier included above and retrieve and identify the UE capability information from the core network, or may retrieve and identify the configuration information of the UE or the UE capability information from the base station with which the connection was previously configured. When the UE receives the system information as described above, when the UE tries to receive the service of interest or has the service of interest or decides the service of interest, when the UE is in or enters a cell or area supporting the MBS service in system information, or when the UE configures or connects the MBS service (or session), the UE may configure a connection with a network and transmit the first RRC message.

If the base station receives the first RRC message in the procedure 1m-10 above, the base station may identify the MBS service that the UE is interested in or intends to receive or UE capability information.

The base station or the network may transmit a second RRC message 1m-15 to the UE in order to support or configure the MBS service to the UE (1m-15). The second RRC message may be an RRC message for a newly defined MBS service, or may be defined as an RRCSetup message or RRCResume message or another existing RRC message.

The second RRC message may include configuration information for MBS service, configuration information for the MBS service indicated by the UE in the first RRC message, bearer configuration information, unicast bearer or multicast bearer for receiving MBS service, or MBS bearer configuration information.

The second RRC message to be transmitted may include one or more of the following configuration information for MBS service support:
  Whether to support MBS service
  Configuration information for a physical channel or downlink or uplink transport channel (e.g., MBCH, MBCCH, MBTCH, or DL-SCH) for MBS service
  Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted
  Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and each logical channel identifier, each bearer identifier, or each RNTI identifier information corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.
In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:
Indicator configuration information indicating whether a bearer or a bearer identifier supporting (transmitting or receiving) the MBS service is a unicast bearer or a multicast bearer
MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

The UE receiving the second RRC message as described above may receive MBS data (MBS control data or MBS user data) in a transmission resource through which an MBS control data channel or an MBS user data channel for an MBS service of interest is transmitted by searching for or determining the MBS service that the UE is interested in or wants to receive through storing or applying the MBS service-related configuration information. When the UE receives the system information as described above, when the UE tries to receive the service of interest or has the service of interest or decides the service of interest, when the UE is in or enters a cell or area supporting the MBS service in system information, when the UE configures or connects the MBS service (or session), when the UE receives the configuration information or bearer configuration information for the MBS service in the system information, the RRC message (e.g., RRCSetup, RRCResume, RRCReconfiguration, RRCRelease, or a newly defined RRC message), or the control message (e.g., transmitted from the MBS control data channel) for the MBS channel, or when the configuration information or the bearer configuration information for the MBS service is broadcasted, the UE may configure a unicast bearer, a multicast bearer, or an MBS bearer for receiving the MBS service having the above-proposed bearer structure.

As described above, upon receiving the second RRC message, the UE may apply the configuration information included in the second RRC message and transmit a third RRC message (e.g., RRCSetupComplete or RRCResumeComplete) to the base station or network in response thereto (1m-20).

As described above, the UE may receive MBS service-related configuration information by receiving MBS data (e.g., MBS control data) through the MBS control data channel or transmission resource for an MBS service of interest.

Upon receiving the MBS service-related configuration information as described above, the UE may receive MBS data by applying the method proposed in FIG. 1G or FIG. 1H of the disclosure to receive the MBS service (1m-25) through the MBS user data service channel by identifying and using the first identifier, the second identifier, the RNTI identifier, or the logical channel identifier configured or allocated for the MBS service that the UE is interested in or wants to receive.

The base station may transmit a fourth RRC message (e.g., RRCReconfiguration, 1m-30) to the UE in order to reconfigure the bearer for which the UE is receiving the MBS service or reconfiguration information related to the MBS service based on the preference reported by the UE or the indicated indicator or base station implementation as described above. For example, the fourth RRC message may include configuration information (e.g., an indicator to switch from a unicast bearer to a multicast bearer, an indicator to switch from a multicast bearer to a unicast bearer, or corresponding bearer configuration information) for changing the bearer type, logical channel identifier information changed or updated for each MBS service, RNTI identifier information, and first identifier or second identifier information for MBS service.

After the UE receives the fourth RRC message and stores or applies the MBS service related configuration information, the UE may configure and transmit a fifth RRC message (e.g., RRCReconfigurationComplete, 1m-35) to the base station in order to indicate successful reconfiguration.

As described above, the UE may receive MBS data (e.g., MBS control data) through the MBS control data channel or the transmission resource for the MBS service of interest to receive MBS service-related configuration information.

Upon receiving the MBS service-related configuration information as described above, the UE may receive MBS data by applying the method proposed in FIG. 1G or FIG. 1H of the disclosure to receive the MBS service (1m-40) through the MBS user data service channel by identifying and using the first identifier, the second identifier, the RNTI identifier, or the logical channel identifier configured or allocated for the MBS service that the UE is interested in or wants to receive.

As described above, in a case (e.g., according to the implementation of the base station, according to the request of the UE, or the instruction of the UE) where the base station attempts to transition the UE to the RRC inactive mode or the RRC idle mode, the base station may configure and transmit a sixth RRC message (e.g., RRCRelease message, 1m-45) to the UE to transition the UE to the RRC idle mode or RRC inactive mode. The sixth RRC message (1-45) may include the following configuration information or some of the information for the UE to continue to receive MBS service even in the RRC idle mode or RRC inactive mode.

Whether to support MBS service

Configuration information for a physical channel or downlink or uplink transport channel (e.g., MBCH, MBCCH, MBTCH, or DL-SCH) for MBS service Transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) information through which the physical channel or downlink or uplink transport channel (e.g., MBCH, MBS control data channel (MBCCH), or MBS user data channel (MBTCH)) is transmitted Configuration information for the MBS service supported by the current cell. For example, it is possible to configure or broadcast a list of MBS services, or a first identifier (e.g., temporary mobile group identity (TMGI)) or a second identifier (e.g., session identity) for each MBS service, and information on each logical channel identifier, each bearer identifier, or each RNTI identifier corresponding to the first identifier or the second identifier of each MBS service may be configured or broadcasted. As another method, the first identifier (e.g., temporary mobile group identity (TMGI)) or the second identifier (e.g., session identity) or the RNTI identifier for the MBS service may be configured or broadcasted for each bearer (or bearer identifier), each logical channel, each RLC configuration information, or each PDCP configuration information. As described above, the first identifier may indicate a public land mobile network (PLMN) serving the MBS or may indicate an MBS service type or session. As described above, the second identifier may indicate a more specific session or type of MBS service. In addition, the configuration information for the MBS service may include information on a transmission resource (frequency, time resource, transmission period, bandwidth part (or bandwidth part identifier), bandwidth, dedicated frequency (frequency information or SCell identifier), subcarrier interval, subframe number, identifier indicating a transmission pattern, etc.) in which each MBS service is supported, broadcasted, or transmitted.

In the bearer structure proposed in FIG. 1G, bearer configuration may be included to receive the MBS service. In addition, indicator configuration information indicating HARQ reordering, HARQ retransmission, or whether to use HARQ ACK or NACK, indicator configuration information indicating whether to use the RLC reordering function, transmission resource information to transmit HARQ ACK or NACK as described above, indicator configuration information indicating whether to use the RLC sequence delivery function, configuration information for the RLC reorder timer value, or indicator configuration information on whether to use the PDCP out-of-order delivery function may be included. As described above, indicator configuration information indicating HARQ reordering, HARQ retransmission, or whether to use HARQ ACK or NACK, indicator configuration information indicating whether to use the RLC reordering function, indicator configuration information indicating whether to use the RLC sequence delivery function, configuration information for the RLC reorder timer value, configuration information for RLC mode (TM, UM, or AM), configuration information on whether to use the data segmentation function in the RLC layer device, or indicator configuration information on whether to use the PDCP out-of-order delivery function may be configured for each MBS service or for each bearer. As another method, the configuration information may be defined as basic configuration information so that the UE may configure some of the functions as an MBS bearer having basic functions without the configuration information:

Indicator configuration information indicating whether a bearer or a bearer identifier supporting (transmitting or receiving) the MBS service is a unicast bearer or a multicast bearer Indicator configuration information indicating whether a bearer or a bearer identifier supporting (transmitting or receiving) the MBS service is a unicast bearer or a multicast bearer Indicator or configuration information to transition to RRC idle mode, RRC inactive mode, or RRC connected mode MBS service configuration information or bearer configuration information suggested above for receiving MBS service in RRC idle mode MBS service configuration information or bearer configuration information suggested above for receiving MBS service in RRC inactive mode MBS dedicated carrier or cell (Cell, SCell, or PCell) related information for MBS service (e.g., frequency, time resource, or cell identifier)

MBS dedicated bandwidth part information (e.g., downlink bandwidth part or uplink bandwidth part information) or bandwidth part identifier information for MBS service Indicator (in the disclosure, it is proposed that a header compression procedure (e.g., robust header compression (ROHC), Ethernet header compression (EHC), or data compression procedure) may be configured and supported for the MBS bearer) to configure the header compression function or procedure for the bearer supporting the MBS service, or configuration information (e.g., an indicator indicating whether to continue to use the header compression context) for header compression procedure or data compression procedure.

As described above configuration information, the PDCP serial number or RLC serial number length may also be set, and as another method, a default length for the RLC serial number or PDCP serial number may be determined.

As described above configuration information, whether the RLC layer device of the bearer supporting the MBS service supports or enables uni-directional communication or supports or enables bi-directional communication may also be configured as an indicator.

Upon receiving the MBS service-related configuration information as described above, the UE may receive MBS data by applying the method proposed in FIG. 1G or FIG. 1H of the disclosure to receive the MBS service (1m-50) through the MBS user data service channel by identifying and using the first identifier, the second identifier, the RNTI identifier, or the logical channel identifier configured or allocated for the MBS service that the UE is interested in or wants to receive.

As described above, the UE may transmit the first RRC message 1m-10 to receive the MBS service, receive the second RRC message 1m-15, transmit the message of a third RRC message 1m-20 again, receive the fourth RRC message, transmit the fifth RRC message, and receive the MBS service in the RRC connected mode. Alternatively, after that, the UE may receive the sixth RRC message 1m-45 and receive the MBS service in RRC idle mode or RRC inactive mode.

As another method, as described above, the UE may transmit the first RRC message 1m-10 to receive the MBS service, receive the second RRC message 1m-15 (switching to the RRC connected mode), transmit the message of a third RRC message 1m-20 again, receive the sixth RRC message 1m-45 and receive the MBS service in RRC idle mode or RRC inactive mode by switching to the RRC idle mode or the RRC inactive mode.

As described above, it may be featured in that the ciphering procedure or the integrity protection procedure is not applied to the first RRC message or the second RRC message. As another method, in order to enhance security, it may be featured in that the ciphering procedure or the integrity protection procedure is not applied to the first RRC message or the second RRC message, and the ciphering procedure or the integrity protection procedure is applied to the first RRC message or the second RRC message. As another method, it may be featured in that in order to more enhance security, the ciphering procedure or the integrity protection procedure is applied to the first RRC message or the second RRC message, and the ciphering procedure or the integrity protection procedure is applied to the first RRC message or the second RRC message. As described above, a ciphering procedure or an integrity protection procedure may be applied to the third RRC message. In addition, the ciphering procedures or the integrity protection procedures may be applied to the fourth RRC message, the fifth RRC message, or the sixth RRC message.

The next-generation mobile communication system of the disclosure may support the first signaling procedure, the second signaling procedure, the third signaling procedure, or the fourth signaling procedure for supporting the MBS service proposed in the disclosure.

Figure 1N:
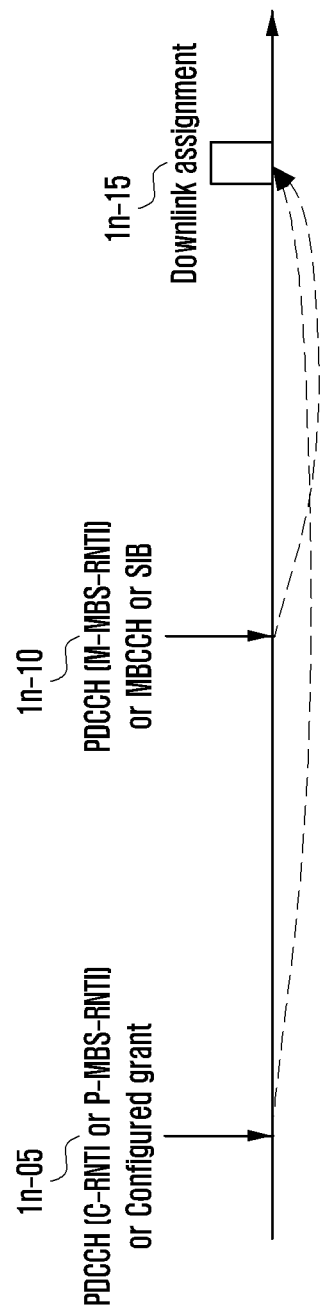
FIG. 1N is a diagram illustrating a case in which normal data and MBS data collide or overlap each other in case that a UE receives a general data service and an MBS service in an RRC connected mode.
Figure 10:
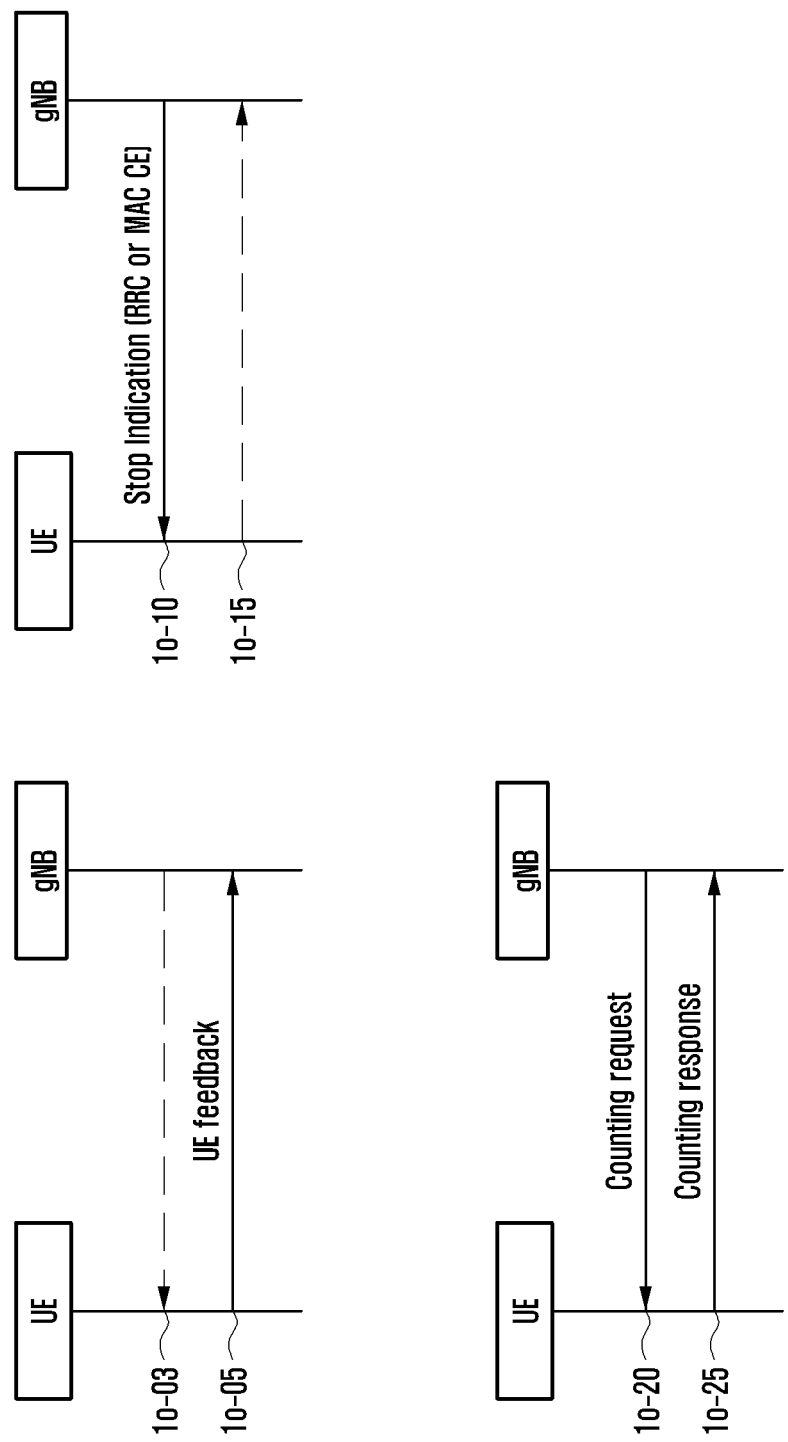

FIG. 1N is a diagram illustrating a case in which normal data and MBS data collide or overlap each other in case that a UE receives a general data service and an MBS service in an RRC connected mode. Specifically, FIG. 1N of the disclosure illustrates a case in which normal data and MBS data collide or overlap when a UE receives a general data service and an MBS service in an RRC connected mode.

In FIG. 1N, the RRC connected mode UE receiving the general data service or the MBS service may receive the first scheduling information 1n-05 for the general data service and the second scheduling information 1n-10 for the MBS service data.

As described above, the first scheduling information may indicate a time resource or a frequency resource through which downlink general data is transmitted in the downlink control information (DCI) of the PDCCH scrambled by the first RNTI identifier (e.g., C-RNTI, RNTI identifier for general data scheduling). As another method, as described above, the first scheduling information may be indicated as a time resource or a frequency resource configured for downlink general data transmission in the RRC message. As another method, as described above, the first scheduling information may be indicated as a periodic time resource or frequency resource configured for downlink general data transmission in the RRC message, or may be indicated by activating or deactivating the periodic time resource or frequency resource with DCI of the PDCCH.

As described above, the second scheduling information may indicate a time resource or a frequency resource through which downlink MBS service data is transmitted in the downlink control information (DCI) of the PDCCH scrambled by the second RNTI identifier (e.g., MBS-RNTI, RNTI identifier for MBS service data scheduling, or RNTI identifier for each MBS service). As another method, as described above, the second scheduling information may be indicated by a time resource or a frequency resource configured for downlink MBS service data transmission in system information or an RRC message or a control channel or control message for MBS. As another method, as described above, the second scheduling information may be indicated as a periodic time resource or frequency resource configured for downlink MBS service data transmission in system information or RRC message or a control channel or control message for MBS, or may be indicated by activating or deactivating the periodic time resource or frequency resource with DCI of the PDCCH.

As described above, when the UE receives the first scheduling information and the second scheduling information, if the downlink time resource or frequency resource indicated by the first scheduling information or the second scheduling information is the same, overlap, or conflict occurs, the UE needs a method for how to process the first scheduling information and the second scheduling information.

Accordingly, in the following of the disclosure, when the UE receives the first scheduling information and the second scheduling information, if the downlink time resource or frequency resource indicated by the first scheduling information and the second scheduling information are the same, overlap, or conflict occurs, the UE provides methods for how to process the first scheduling information and the second scheduling information.

First method: If the time resource or frequency resource indicated by the first scheduling information the second scheduling information received by the UE and are the same, overlap, or conflict occurs, the UE may receive general data from the time resource or the frequency resource according to the first scheduling information. In addition, the UE may not receive or ignore the MBS service data indicated by the second scheduling information, or may not consider the second scheduling information. As another method, if a transmission resource (e.g., PUCCH) for transmitting HARQ ACK or NACK for downlink MBS service data indicated in the second scheduling information is configured or configured to transmit HARQ ACK or NACK, the UE may request retransmission by indicating that the MBS service data has not been successfully received (NACK), and the downlink MBS service data not received as described above may be received through retransmission later.

Second method: If the time resource or frequency resource indicated by the first scheduling information and the second scheduling information received by the UE are the same, overlap, or conflict occurs, the UE may receive MBS service data from the time resource or the frequency resource according to the second scheduling information. In addition, the UE may not receive or ignore the general data indicated by the first scheduling information, or may not consider the first scheduling information. However, the UE may request retransmission by indicating that it has not successfully received (NACK) the downlink general data in the transmission resource (e.g., PUCCH) transmitting the HARQ ACK or NACK for the downlink general data indicated in the first scheduling information. The UE may receive the downlink general data that has not been received as described above through retransmission later.

Third method: If the UE capability supports the simultaneous reception of different data in the same transmission resource with time resource or frequency resource, the UE may receive both general data and MBS service data indicated by the first scheduling information and the second scheduling information. For example, when the UE capability has a plurality of antennas or the UE satisfies a high requirement, the third method may be applied.

Fourth method: As described above, whether the UE performs the first method, the second method, or the third method may be configured or indicated by the base station by an indicator in the RRC message or system information.

Fifth method: The base station may multiplex and transmit different general data and MBS service data into one data (e.g., MAC PDU) in a transmission resource of the same time resource or the same frequency resource. For example, in the transmission resource of the same time resource or the same frequency resource, the UE may receive one data (e.g., MAC PDU), and general data and MBS service data may be multiplexed in the one data. In one data, each general data may be distinguished by a logical channel identifier (e.g., identifier included in MAC header) corresponding to each general data, and each MBS service data may be distinguished by a logical channel identifier (e.g., identifier included in MAC header) corresponding to each MBS service data. As described above, when the UE receives the one data and performs data processing, the data corresponding to the logical channel identifier configured in the UE may be received (or demultiplexed) and transmitted to an upper layer device (e.g., RLC layer device or upper layer device) corresponding to the logical channel identifier, and data corresponding to the logical channel identifier not configured in the UE may be discarded.

FIG. 1O is a diagram illustrating signaling procedures for efficiently supporting an MBS service. Specifically, FIG. 1O in the disclosure shows a signaling procedure for efficiently supporting an MBS service. For example, the disclosure provides a signaling procedure 1o-05 in which the UE receiving the MBS service data transmits feedback to the base station, a signaling procedure 1o-10 in which a UE receiving MBS service data receives an MBS service related control message from a base station, or signaling procedures 1o-20 and 1o-25 in which the base station transmits an MBS service-related control message to the UE and the UE transmits a response to the MBS service support.

In 1o-05 of FIG. 1O, the UE receiving the MBS service data may transmit feedback or indication information of the UE for the MBS service to the network or the base station (1o-05). For example, when a certain event occurs, when there is a service that the UE is interested in (or intends to receive), when the service that the UE is interested in (or intends to receive) has changed, when the UE intends to stop receiving services of interest (or intended to be received), or when the UE intends to stop the MBS service, or intends to change the method of receiving the MBS service or the RRC mode or bearer, the UE may transmit feedback or indication information of the UE for the MBS service to the network or the base station (1o-05). As another method, the UE may transmit the feedback or indication information when requested by the network (1o-03). As described above, the information transmitted by the UE to the base station for the MBS service may include some or a plurality of pieces of information among the following information:

Information on the MBS service that the UE is interested in or intends to receive (e.g., a first identifier or a second identifier for the MBS service, a logical channel identifier, or an RNTI identifier or a bearer identifier)

RRC connection state preferred by the UE when receiving MBS service or receiving configuration (e.g., RRC idle mode, RRC connected mode, or RRC inactive mode)

Bearer structure or configuration information preferred by the UE when receiving or being configured with an MBS service (e.g., a preference for a unicast bearer or a multicast bearer, a preference structure among the bearer structures described in FIG. 1G, and a preference for a function to be configured)

A type of service preferred by the UE when receiving MBS service or configuration (e.g., unicast service (dedicated service) or multicast service (broadcast or common service)

An indicator indicating that the UE receiving the MBS service no longer intends to receive the MBS service, an indicator to stop receiving the MBS service, an indicator to continue receiving the MBS service, an indicator for requesting a change of the MBS service to another MBS service (or a first identifier or a second identifier for another MBS service or a logical channel identifier or a bearer identifier or an RNTI identifier), or an indicator that the UE is interested in the MBS service An indicator indicating that the reception quality of the MBS service is good or bad from the point of view of the UE Changed UE feedback information if there is changed information (or updated or changed feedback) when compared with the MBS service information (or the feedback information) (e.g., an indicator for an MBS service of interest or information that may be reported by the UE proposed above) last transmitted or responded to by the UE to the network An indicator indicating that MBS service data has been successfully received or an indicator indicating that it has not been successfully received, for example, HARQ ACK or NACK feedback As described above, when the UE transmits the information for the MBS service to the base station, it may be featured in that the UE may transmit the information only in the RRC connected mode. For example, in case that the base station requests the information from the UE in the RRC connected mode or the UE needs to transmit the information, the UE may configure the information in RRC message, MAC control information, RLC control information, or PDCP control information through an SRB, DRB, or MBS bearer (unicast bearer or multicast bearer) configured in the UE in the RRC connected mode and transmit the information. As another method, in case that the base station requests the information from the UE in the RRC idle mode or RRC inactive mode or the UE needs to transmit the information, the UE may configure the information in RRC message, MAC control information, RLC control information, or PDCP control information through an SRB, DRB, or MBS bearer (unicast bearer or multicast bearer) configured in the UE in the RRC connected mode and transmit the information by establishing a connection with the network (trigger RRC connection procedure or RRC connection resume procedure) and switching to RRC connected mode. As another method, as described above, when the UE transmits the information on the MBS service to the base station, the UE in the RRC connected mode, RRC inactive mode, or RRC idle mode may be featured in that the UE may transmit feedback or indication information of the UE from the transmission resource indicated by the system information, the transmission resource configured by the RRC message, or the PDCCH including the RNTI identifier indicating the MBS service to the indicated transmission resource. The base station may more efficiently manage resources for the MBS service by transmitting the feedback as described above by the UE.

In 1o-10 of FIG. 1O, the base station may transmit control information on the MBS service to UEs receiving the MBS service data. As described above, the control information for the MBS service may be transmitted through a channel or transmission resource for the MBS service, an RRC message, MAC control information, RLC control information, or PDCP control information (1o-10).

As described above, the control information on the MBS service may include some or a plurality of information among the following information:

An indicator to stop receiving MBS service

An indicator that the base station stops the MBS service or an indicator to stop receiving the MBS service An identifier for the MBS service for intending to stop the MBS service or to stop receiving the service may include, for example, the first or second identifier, a logical channel identifier, an RNTI identifier, or a bearer identifier corresponding to the MBS service, and may indicate in more detail which MBS service is to be stopped or which MBS service reception is to be stopped with respect to the UE. As another method, the control information may be indicated by transmitting the control information on the PDCCH scrambled by the RNTI identifier corresponding to the MBS service. As another method, in order to indicate a plurality of MBS services, the first identifier, the second identifier, the logical channel identifier, the RNTI identifier, or the bearer identifier may be included and transmitted in a list.

In order to indicate which MBS service is to be stopped or which MBS service reception is to be stopped to the UE in more detail, each the first identifier value or the second identifier value indicating MBS services configured in the MBS service list configured by the system information or RRC message is mapped with a natural number value in an ascending order and a natural number value is inserted, or MBS service may be indicated by the bitmap by mapping each first identifier value or the second identifier value to a bitmap.

The time when MBS service reception starts to stop or the time when MBS service reception stops may be indicated in units of time (subframe or time slot or symbol). For example, as described above, it is possible to indicate what time unit from the period in which the MBS service is transmitted. As another method, as described above, it is possible to indicate how many time units after the time when the control information is received.

When the base station transmits the control information on the MBS service to the UE as described above, it may be featured in that the base station may transmit to the UE in RRC inactive mode, RRC idle mode, or RRC connected mode. For example, the base station may transmit the information to the UE in the RRC inactive mode, RRC idle mode, or RRC connected mode by configuring the information in an RRC message, MAC control information, RLC control information, or PDCP control information through an SRB, DRB, or MBS bearer (unicast bearer or multicast bearer) configured in the UE. As another method, as described above, it may be featured in that the base station may transmit the control information on the MBS service to the UE in the RRC connected mode, RRC inactive mode, or RRC idle mode in the transmission resource indicated by the system information, in the transmission resource configured by the RRC message, or in the transmission resource indicated by the PDCCH including the RNTI identifier indicating the MBS service.

As described above, if the UE receives the control information from the base station 1o-10, the UE may transmit the corresponding feedback to the base station as feedback information or indication information suggested in 1o-15 (1o-15).

As described above, if the UE receives the control information from the base station (1o-10), if there is an MBS service that the UE is still interested in, or if the UE still intends to receive the MBS service, the UE may receive the MBS configuration information again, configure the MBS configuration information again, and continue to receive the MBS service as the UE receives or requests configuration information from the base station so that the UE may receive the MBS service again by receiving MBS service-related control information again (e.g., system information, RRC message, or MBS service control message) or performing (or triggering) an RRC connection procedure or RRC connection resumption procedure as proposed in FIG. 1K, 1L, 1M, or 1N.

As another method, as described above, if the UE receives the control information from the base station (1o-10), if the UE is not in the RRC connected mode but is in the RRC idle mode or RRC inactive mode, if there is an MBS service that the UE is still interested in, or if the UE still intends to receive the MBS service, the UE may receive the MBS configuration information again, configure the MBS configuration information again, and continue to receive the MBS service as the UE receives or requests configuration information from the base station so that the UE may receive the MBS service again by receiving MBS service-related control information again (e.g., system information, RRC message, or MBS service control message) or performing (or triggering) an RRC connection procedure or RRC connection resumption procedure as suggested in FIG. 1K, 1L, 1M, or 1N.

As described above, the base station transmits control information to the UE, so that the base station may more efficiently manage resources for the MBS service.

In 1o-20 and 1o-25 of FIG. 1O, in order to identify how many UEs receive the MBS service, the base station may configure and transmit a message for requesting a response to identify whether the MBS service is being received from the UEs receiving the MBS service data, or for requesting a response to count the number of UEs receiving the MBS service (1o-20). The UE that has received the message for requesting the response to identify whether the MBS service is being received or to count the number of UEs receiving the MBS service as described above may configure a response message and transmit the response message to the base station (1o-25).

As described above, the message for requesting the response to identify whether the base station is receiving the MBS service or to count the number of UEs receiving the MBS service may be transmitted to the RRC idle mode, RRC inactive mode, or RRC connected mode UE, or the RRC idle mode, RRC inactive mode, or RRC connected mode UE may receive the request message. In addition, when the UE receiving the request message is in RRC idle mode, RRC inactive mode, or RRC connected mode, the UE may configure a response message to the request message and transmit the response message to the RRC message, MAC control information, RLC control information, or PDCP control information through the SRB, DRB, or MBS bearer (unicast bearer or multicast bearer) configured in the UE. Alternatively, the response message may be transmitted in the transmission resource indicated by the system information, in the transmission resource configured by the RRC message, or in the transmission resource indicated by the PDCCH including the RNTI identifier indicating the MBS service.

As another method, as described above, the message for requesting the response to identify whether the base station is receiving the MBS service or to count the number of UEs receiving the MBS service may be transmitted to the UE in the RRC idle mode, RRC inactive mode, or RRC connected mode, or the UE in the RRC idle mode, RRC inactive mode, or RRC connected mode may receive the request message. In addition, among the UEs receiving the request message, the UEs in the RRC connected mode may configure a response message to the request message and transmit the response message to the RRC message, MAC control information, RLC control information, or PDCP control information through the SRB, DRB, or MBS bearer (unicast bearer or multicast bearer) configured in the UE. Alternatively, the response message may be transmitted in the transmission resource indicated by the system information, in the transmission resource configured by the RRC message, or in the transmission resource indicated by the PDCCH including the RNTI identifier indicating the MBS service. As another method, among the UEs receiving the request message, the UEs in the RRC idle mode or RRC inactive mode may perform the RRC connection procedure or the RRC connection resume procedure to switch to the RRC connected mode and may transmit the response message to an RRC message, MAC control information, RLC control information, or PDCP control information through an SRB, DRB, or MBS bearer (unicast bearer or multicast bearer) configured in the UE. Alternatively, the response message may be transmitted in the transmission resource indicated by the system information, in the transmission resource configured by the RRC message, or in the transmission resource indicated by the PDCCH including the RNTI identifier indicating the MBS service.

Figure 1P:
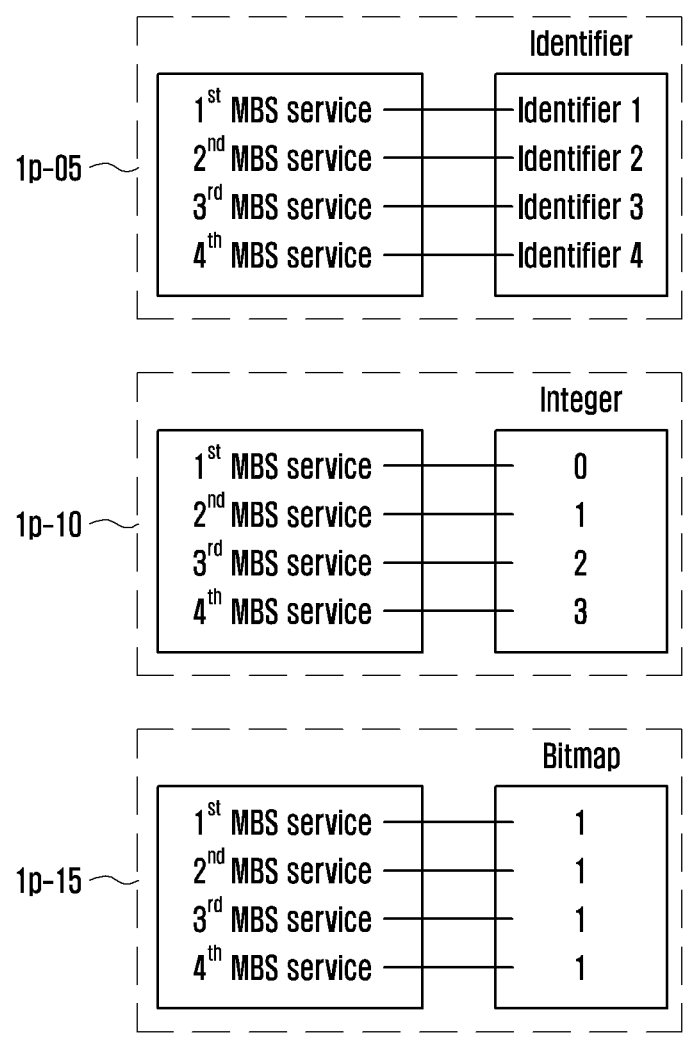
FIG. 1P is a diagram illustrating a method capable of indicating each MBS service with respect to a plurality of MBS services.

FIG. 1P is a diagram illustrating a method of indicating each MBS service for a plurality of MBS services.

As illustrated in 1$p$-05 in FIG. 1P, each MBS service may have a mapping relationship with a first identifier or a second identifier, a logical channel identifier, an RNTI identifier, or a bearer identifier for the MBS service, or each identifier may be allocated to each MBS service.

Each MBS service may be distinguished as the method illustrated in 1$p$-05, and a specific MBS service may be identified and indicated by the identifier. However, because the length of the identifiers are long, indicating each MBS service with the first identifier or the second identifier, the logical channel identifier, the RNTI identifier, or the bearer identifier as described above may not be an efficient method in terms of overhead.

In the disclosure, in the system information, RRC message, or MBS control message, as illustrated in 1$p$-10, a list of supported MBS services or a list of configured MBS services may be broadcasted, promised, or configured, and an integer value may be allocated or mapped to each MBS service configured in the list for MBS services. As another method, integer values may be mapped or allocated in ascending order (or in descending order) of each identifier value for the MBS service included in the list for the MBS services. In addition, when indicating a specific MBS service, the overhead may be reduced by indicating a specific MBS service with an integer value. For example, in case of indicating a plurality of MBS services, the plurality of MBS services may be indicated by including each integer value for the plurality of MBS services or by including an integer value in the list.

As another method, in the disclosure, in the system information, RRC message, or MBS control message, as illustrated in 1$p$-15, a list of supported MBS services or a list of configured MBS services may be broadcasted, promised, or configured, and each MBS service configured in the list for the MBS services may be allocated or mapped to each bit of the bitmap. As another method, each bit of the bitmap may be mapped or allocated in ascending order (or in descending order) of each identifier value for the MBS service included in the list for the MBS services. In addition, when indicating a specific MBS service, the overhead may be reduced by indicating a specific MBS service with each bit of the bitmap (e.g., each service may be indicated with a value of 1 or 0). For example, in case of indicating a plurality of MBS services, the plurality of MBS services may be indicated by configuring bit values for the plurality of MBS services or in the bitmap.

The method of indicating each MBS service in FIG. 1P may be utilized or extended and applied in various signaling methods of the disclosure.

For example, in 1$o$-20 and 1$o$-25 of FIG. 1O, in order to identify how many UEs receive the MBS service, the base station may configure and transmit a message for requesting a response to identify whether the MBS service is being received from the UEs receiving the MBS service data, or for requesting a response to count the number of UEs receiving the MBS service, and when the UE that has received the message for requesting the response may configure a response message and transmit the response message to the base station, the followings may be applied.

Specifically, a message requesting whether the MBS service is being received or a response to count the number of UEs receiving the MBS service and a response message thereof may be configured or generated by one of the following methods.

First method: As illustrated in 1$p$-05 in FIG. 1P, each MBS service may have a mapping relationship with a first identifier or a second identifier for the MBS service, a logical channel identifier, an RNTI identifier, or a bearer identifier, or each identifier may be allocated to each MBS service. In the same method as in 1$p$-05, the base station may configure a list of the identifiers corresponding to MBS services intended by the identifiers to know how many UEs receive the MBS service, and include the list in a request message and transmit the list to the UE. The request message may be transmitted to UEs receiving the MBS service or may be received by UEs receiving the MBS service, and UEs receiving each MBS service included in the request message may respond to the request by configuring whether the UEs are interested or receiving the MBS service in the response message. As another method, when configuring the request message as described above, by applying the method as illustrated in 1$p$-10, an integer value may be allocated or mapped to each MBS service in the list for MBS services configured by system information, RRC message, or MBS control message. For example, integer values may be mapped or allocated in ascending order (or in descending order) of each identifier value for MBS services included in the list of MBS services. In addition, when indicating the MBS services intended to know how many UEs receive MBS services in the request message, the MBS services intended to know how many UEs receive the MBS service may be indicated by including the mapped or allocated integer value(s) in the request message or in the list. As another method, when configuring the request message as described above, by applying the method as illustrated in 1p-15, the UE may allocate or map each MBS service to each bit of the bitmap in the list for MBS services configured with system information, RRC message, or MBS control message. For example, each bit of the bitmap may be mapped or allocated in ascending order (or in descending order) of each identifier value for the MBS service included in the list for the MBS services. In addition, when indicating the MBS services intended to know how many UEs receive the MBS service in the request message, the overhead may be reduced by indicating an MBS service with each bit of the bitmap (for example, each service may be indicated with a value of 1 or 0). In addition, in case of indicating a plurality of MBS services, the plurality of MBS services may be indicated by configuring bit values for the plurality of MBS services in the bitmap. The UEs receiving each MBS service included in the request message may respond to the request by configuring whether the UEs are interested or receiving the MBS service in the response message. When configuring the response message as described above, because each MBS service may have a mapping relationship with a first or second identifier, a logical channel identifier, an RNTI identifier, a bearer identifier for the MBS service in a list of MBS services included in the request message, system information, an RRC message, or a list of MBS services configured by an MBS control message, the UE may configure the identifiers corresponding to the MBS services that the UE is interested in or intends to receive in a list, include the list in a response message, and transmit the response message to the base station by applying the method as illustrated in 1p-05. When configuring the response message as described above, in a list of MBS services included in the request message, or a list of MBS services configured by system information, an RRC message, or an MBS control message, the UE may allocate or map an integer value to each MBS service by applying the method as illustrated in 1p-10. For example, integer values may be mapped or allocated in ascending order (or in descending order) of each identifier value for MBS services included in the list of MBS services. In addition, when indicating the MBS service that the UE is interested in or intends to receive in the response message, the UE may indicate to the base station the MBS services that the UE is interested in or intends to receive by including the mapped or allocated integer value(s) in the response message or in the list, thereby reducing overhead. In addition, in case of indicating a plurality of MBS services, the plurality of MBS services may be indicated by including each integer value for the plurality of MBS services or by including an integer value in the list. As another method, when configuring a response message by applying the method illustrated in 1p-15 as described above, the UE may allocate or map each MBS service to each bit of the bitmap in the list of MBS services included in the request message or the list of MBS services configured with system information, RRC message, or MBS control message. For example, each bit of the bitmap may be mapped or allocated in ascending order (or in descending order) of each identifier value for the MBS service included in the list for the MBS services. In addition, when indicating MBS services that the UE is interested in or intends to receive in the request message, the overhead may be reduced by indicating a specific MBS service with each bit of the bitmap (for example, each service may be indicated with a value of 1 or 0). In addition, in case of indicating a plurality of MBS services, a plurality of MBS services may be indicated by configuring bit values for a plurality of MBS services or in the bitmap.

Second method: The base station may configure and transmit to the UEs a request message to configure and send the MBS service that the UEs are interested in or intend to receive in a request message. The request message may be transmitted to UEs receiving the MBS service, or may be received by UEs receiving the MBS service, and the request message may include an indicator for configuring and transmitting the response message indicating whether the UEs receiving the MBS service are interested in or receiving the MBS service. The UEs receiving each MBS service included in the request message may respond to the request by configuring whether the UEs are interested or receiving the MBS service in the response message. When configuring the response message as described above, because each MBS service may have a mapping relationship with a first identifier or a second identifier, a logical channel identifier, an RNTI identifier, or a bearer identifier for the MBS service in a list of MBS services configured by the system information, the RRC message, or the MBS control message, the UE may configure the identifiers corresponding to the MBS services that the UE is interested in or intends to receive in a list, include the list in a response message, and transmit the list to the base station through application of the method as illustrated in 1p-05. As another method, when configuring the response message as described above, in system information, an RRC message, or a list of MBS services configured by an MBS control message, the UE may allocate or map an integer value to each MBS service by applying the method as illustrated in 1p-10. For example, integer values may be mapped or allocated in ascending order (or in descending order) of each identifier value for MBS services included in the list of MBS services. In addition, when indicating the MBS service that the UE is interested in or intends to receive in the response message, the UE may indicate to the base station the MBS services that the UE is interested in or intends to receive by including the mapped or allocated integer value(s) in the response message or in the list, thereby reducing overhead. In addition, in case of indicating a plurality of MBS services, the plurality of MBS services may be indicated by including each integer value for the plurality of MBS services or by including an integer value in the list. As another method, when configuring a response message through application of the method illustrated in 1p-15 as described above, the UE may allocate or map each MBS service to each bit of the bitmap in the list of MBS services configured by the system information, the RRC message, or the MBS control message. For example, each bit of the bitmap may be mapped or allocated in ascending order (or in descending order) of each identifier value for the MBS service included in the list for the MBS services. In addition, when indicating MBS services that the UE is interested in or intends to receive in the response message, the overhead may be reduced by indicating a specific MBS service with each bit of the bitmap (for example, each service may be indicated with a value of 1 or 0). In addition, in case of indicating a plurality of MBS services, the plurality of MBS services may be indicated by configuring bit values for the plurality of MBS services in the bitmap.

The methods 1p-05, 1p-10, and 1p-15 for indicating the MBS service in FIG. 1P may be extended and applied when indicating an MBS service of interest or configuring MBS service configuration information in the disclosure. For example, the methods may be extended and applied to the methods proposed in FIG. 1J, 1K, 1L, 1M, or 1O.

The configuration information configured in the system information or the RRC message proposed in the disclosure may include first discontinuous reception (DRX) configuration information (e.g., period, on-duration, offset, etc.) for a general data service. Accordingly, the UE may save UE power by monitoring the PDCCH in a specific section or not monitoring the PDCCH in a specific section based on the first DRX configuration information for the general data service.

The configuration information for the MBS service configured in the system information, the RRC message, or the MBS control data proposed in the disclosure may include second discontinuous reception (DRX) configuration information (e.g., period, on-duration, or offset) for the MBS service. Accordingly, the UE may save UE power by monitoring the PDCCH in a specific section or not monitoring the PDCCH in a specific section based on the second DRX configuration information for the MBS service.

As described above, the base station may configure the first discontinuous reception (DRX) configuration information for the general data service or second DRX configuration information for the MBS service to the UE, and in case that the first DRX configuration information or the second DRX configuration information is configured, the UE may independently operate the first DRX and the second DRX, and transmit or receive data accordingly. For example, when receiving or transmitting general data, the UE may operate the first DRX based on the first DRX configuration information to save power by reading or not reading the PDCCH. In addition, when receiving or transmitting MBS service data, the UE may operate the second DRX based on the second DRX configuration information to save power by reading or not reading the PDCCH.

As another method, when the UE receives the MBS service in the RRC connected mode, the first DRX and the second DRX may be operated, and data may be transmitted or received accordingly. For example, when receiving or transmitting general data, the UE may operate the first DRX based on the first DRX configuration information to save power by reading or not reading the PDCCH. In addition, when receiving or transmitting MBS service data, the UE may operate the second DRX based on the second DRX configuration information to save power by reading or not reading the PDCCH. In case that the UE receives the MBS service in the RRC idle mode or RRC inactive mode, the second DRX may be operated, and data may be transmitted or received accordingly. For example, when receiving or transmitting MBS service data, the UE may operate the second DRX based on the second DRX configuration information to save power by reading or not reading the PDCCH. As another method, the UE may periodically wake up or be activated to read the paging message by operating third DRX configuration information for receiving the paging message in the RRC idle mode or the RRC inactive mode to monitor the PDCCH of the base station.

Figure 1Q:
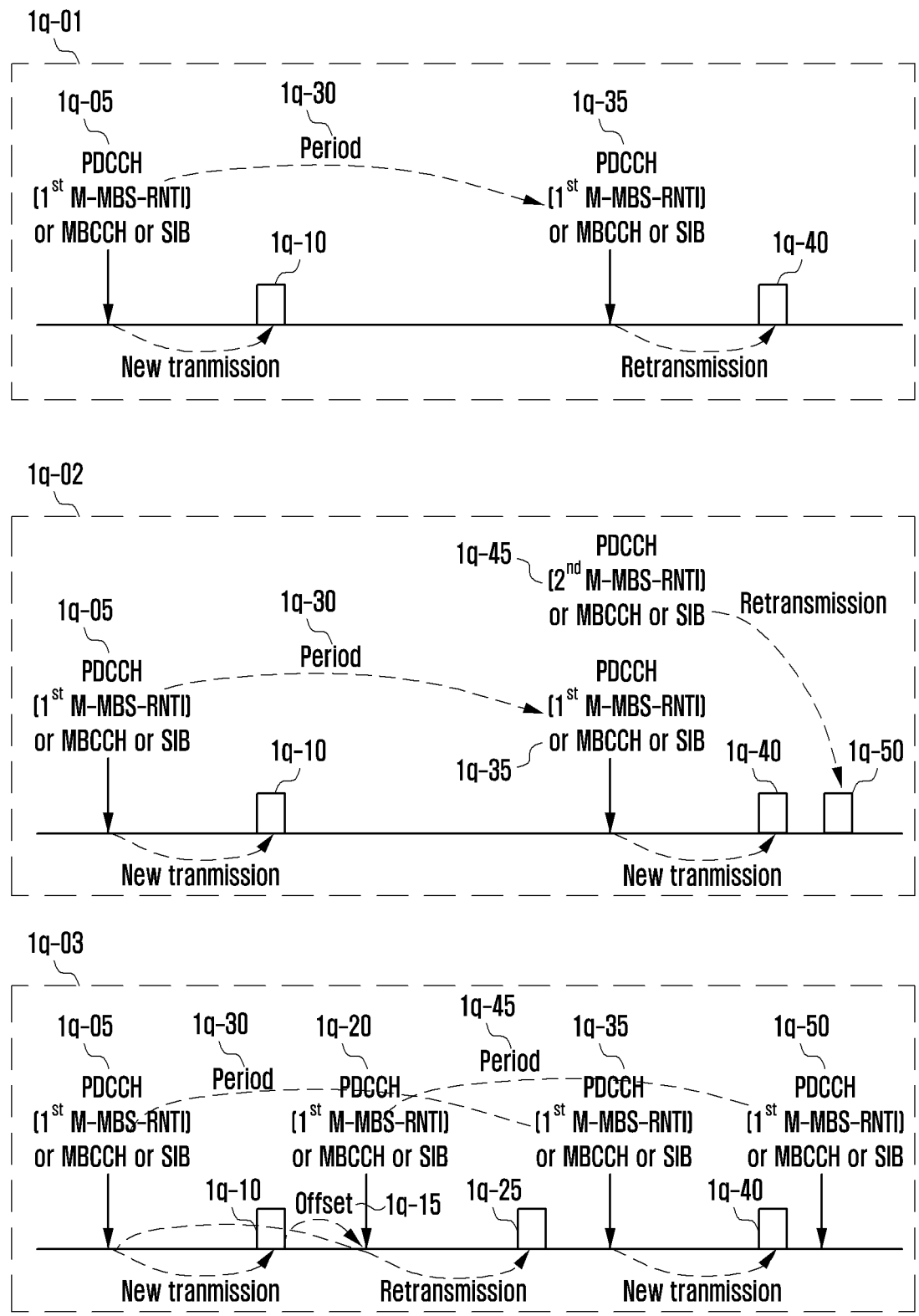
FIG. 1Q is a diagram illustrating a method for retransmitting MBS service data proposed in the disclosure.

FIG. 1Q is a diagram illustrating a method for retransmitting MBS service data proposed in the disclosure.

In FIG. 1Q, as suggested in the disclosure above (e.g., FIG. 1G, FIG. 1K, FIG. 1L, or FIG. 1M), in case that the HARQ reordering or RLC reordering function, HARQ ACK or NACK transmission function, or HARQ process or HARQ retransmission function is configured by system information, RRC message, or MBS control message for the MBS service or a bearer supporting the MBS service, when receiving MBS service data, if MBS service data is not successfully received in the transmission resource indicated by the PDCCH (e.g., PDCCH scrambled by RNTI identifier for MBS service) or the transmission resource 1q-05 and 1q-10 (configuration information (period, on-duration (length of interval to read PDCCH), or offset) for separate DRX for time resource, frequency resource, period, offset, or MBS service as a transmission resource for MBS service configured in system information or RRC message) periodically configured for the MBS service, the UE may indicate NACK in the transmission resource (e.g., PUCCH) indicated by the PDCCH or the transmission resource configured in the system information, the RRC message, or the MBS control message. As another method, in case that the MBS service data or the periodically configured MBS service data is successfully received in the transmission resource indicated on the PDCCH (e.g., PDCCH scrambled by an RNTI identifier for the MBS service), the ACK may be indicated.

As described above, a transmission resource periodically configured for the MBS service may be activated (or used) or deactivated (or stopped) by an RRC message, MAC control information, or an indicator of PDCCH. As described above, the transmission resource configuration information periodically configured for the MBS service to the UE may be stored and maintained even if the periodic transmission resource is deactivated by the RRC message, MAC control information, or PDCCH indicator. As another method, as described above, the transmission resource configuration information periodically configured for the MBS service to the UE may be released or discarded when the periodic transmission resource is deactivated by the RRC message, MAC control information, or PDCCH indicator.

As another method, as described above, the base station or the network may allocate different periodic transmission resources to a plurality of MBS services with an RRC message, and may instruct the UE to perform activation or deactivation with an indicator of MAC control information or an MBS service identifier (first identifier, second identifier, logical channel identifier, or bearer identifier) in order to activate or deactivate the periodic transmission resource of each MBS service, or may activate or deactivate the periodic transmission resource of each MAC service as an indicator or bitmap (for example, it may be mapped in ascending order of identifiers) in the PDCCH. As described above, the transmission resource configuration information periodically configured for the MBS service to the UE may be stored and maintained even if the periodic transmission resource is deactivated by the RRC message, MAC control information, or PDCCH indicator. As another method, as described above, the transmission resource configuration information periodically configured for the MBS service to the UE may be released or discarded when the periodic transmission resource is deactivated by the RRC message, MAC control information, or PDCCH indicator.

As another method, as described above, in case that the MBS service data or the periodically configured MBS service data is not successfully received in the transmission resource indicated on the PDCCH (e.g., PDCCH scrambled by the RNTI identifier for the MBS service), the UE may indicate to the base station which UE has not successfully received the MBS service data, including an indicator or UE identifier indicating the UE with MAC control information, RLC control information, and PDCP control information. As another method, in a transmission resource preconfigured for each UE, each UE may indicate NACK to indicate to the base station which UE did not successfully receive the MBS service data.

As described above, the base station may configure the transmission resource indicating whether the UE has successfully received (ACK) or not received (NACK) the MBS service data as a common transmission resource for the UEs receiving the MBS service. In addition, the base station may perform retransmission on the MBS service data when at least one UE indicates NACK in the common transmission resource or when a certain UE indicates NACK. As another method, in case that the MBS service data is not successfully received as described above, if a UE indicates to the base station whether the MBS service data has not been successfully received, the base station may perform retransmission only to the UE.

As described above, the base station may apply one of the following methods or a combination of the following methods to perform retransmission on MBS service data.

First retransmission method: As described above, the base station may transmit MBS service data in a transmission resource (time resource, frequency resource, subcarrier interval, and DRX configuration information) or a set period configured by system information, RRC message, or MBS control data, or may indicate an MBS service data transmission resource with a PDCCH scrambled by an RNTI identifier indicating MBS service data, and transmit data from the transmission resource (1q-05, 1q-10, 1q-30, and 1q-35). As described above, the UE may receive MBS service data in a transmission resource (time resource, frequency resource, subcarrier interval, and DRX configuration information) or a set period configured by system information, RRC message, or MBS control data, or may receive indication for an MBS service data transmission resource with a PDCCH scrambled by an RNTI identifier indicating MBS service data, and receive data from the transmission resource (1q-05, 1q-10, 1q-30, and 1q-35). As described above, in case that the UE does not successfully receive the MBS service data, the UE may indicate NACK in the transmission resource (e.g., PUCCH) indicated by the PDCCH, the transmission resource configured in the system information, the RRC message, or the MBS control message. As described above, when the base station receives an indication that the MBS service data has not been successfully received from a certain UE, the base station may perform a retransmission procedure. As described above, the retransmission procedure may be retransmit the MBS service data from the transmission resource (time resource, frequency resource, subcarrier interval, and DRX configuration information) configured by system information, RRC message, or MBS control data or the set period, or may indicate an MBS service data transmission resource with a PDCCH scrambled by an RNTI identifier indicating MBS service data and retransmit data from the transmission resource. When performing the retransmission procedure as described above, the base station may transmit including an indicator indicating retransmission in PDCCH or MBS control data or RRC message indicating the transmission resource (1q-35 and 1q-40). For example, the base station may indicate whether to toggle the new data indicator (NDI) identifier (indicates new transmission if the NDI indicator is changed or retransmission if the NDI indicator has not changed). As another method, a separate transmission resource for retransmission may be configured to indicate retransmission by the transmission resource itself. As another method, an RNTI identifier for retransmission of MBS service data may be defined and the PDCCH may be scrambled by the RNTI identifier to indicate retransmission. As described above, when the UE receives the MBS service data in the transmission resource configured by the system information, the RRC message, or the MBS control data (time resource, frequency resource, subcarrier interval, or DRX configuration information), or in a set period, or when the UE receives an indication of the MBS service data transmission resource on the PDCCH scrambled by the RNTI identifier indicating the MBS service data, an indicator indicating retransmission may be included in the MBS service data, or the retransmission may be indicated. In this case, if the UE has not successfully received the previously received MBS service data, the UE may receive the retransmission of the MBS service data, or if the UE has successfully received the previously received MBS service data, the UE may ignore or may not receive the data or may discard the data even if the UE has received the data (for example, the data may be discarded with a duplicate detection procedure in the MAC layer device, the RLC layer device, or the PDCP layer device).

Second retransmission method: As described above, the base station may transmit MBS service data in a transmission resource (time resource, frequency resource, subcarrier interval, and DRX configuration information) or a set period configured by system information, RRC message, or MBS control data, or may indicate an MBS service data transmission resource with a PDCCH scrambled by an RNTI identifier indicating MBS service data, and transmit data from the transmission resource (1q-05, 1q-10, 1q-30, and 1q-35). As described above, the UE may receive MBS service data in a transmission resource (time resource, frequency resource, subcarrier interval, and DRX configuration information) configured by system information, RRC message, or MBS control data, or in a set period or may receive indication for an MBS service data transmission resource with a PDCCH scrambled by an RNTI identifier indicating MBS service data, and receive data from the transmission resource (1q-05, 1q-10, 1q-30, and 1q-35). As described above, if the UE has not successfully received the MBS service data, the UE may indicate NACK on the transmission resource (e.g., PUCCH) indicated by the PDCCH or the transmission resource configured in the system information, the RRC message, or the MBS control message. As described above, in case of receiving an indication indicating that the MBS service data has not been successfully received from any UE, the base station may perform a retransmission procedure. In the above-described retransmission procedure, it is possible to retransmit the MBS service data on the transmission resource (time resource, frequency resource, subcarrier interval, or DRX configuration information) configured in the system information, the RRC message, or the MBS control data or in the set period, or it is possible to indicate the MBS service data transmission resource on the PDCCH scrambled by the RNTI identifier indicating the MBS service data and to retransmit the data on the transmission resource. As another method, the base station may transmit MBS control data in a transmission resource (time resource, frequency resource, subcarrier interval, and DRX configuration information) configured by the system information, the RRC message, the MBS control data, or in a set period, or when indicating MBS service data transmission resource with PDCCH scrambled by RNTI identifier indicating MBS service data, the base station may simultaneously indicate new MBS service data and retransmitted MBS service data with a plurality of PDCCHs (for example, a PDCCH scrambled by an RNTI identifier for new transmission or including an indicator indicating new transmission and a PDCCH scrambled by an RNTI identifier for retransmission or including an indicator indicating retransmission) or a plurality of RNTI identifiers (e.g., scrambled by an RNTI identifier for a new transmission or an indicator indicating the new transmission, or scrambled by an RNTI identifier for retransmission or an indicator indicating the retransmission) or a plurality of MBS control data (indicates new transmission or retransmission) as described above, and may indicate a transmission resource through which new data is transmitted or retransmitted data is retransmitted to different transmission resources (1q-35, 1q-45, 1q-40, and 1q-50). When performing the retransmission procedure as described above, the base station may include and transmit an indicator indicating the retransmission on the PDCCH or the MBS control data or the RRC message indicating the transmission resource (1q-35 and 1q-40). For example, the base station may indicate whether to toggle the new data indicator (NDI) identifier (indicates new transmission if the NDI indicator is changed or retransmission if the NDI indicator has not changed). As another method, a separate transmission resource for retransmission may be configured to indicate retransmission by the transmission resource itself. As another method, an RNTI identifier for retransmission of MBS service data may be defined and the PDCCH may be scrambled by the RNTI identifier to indicate retransmission. As described above, when the UE receives a plurality of MBS control data in a transmission resource (time resource, frequency resource, subcarrier interval, and DRX configuration information) configured by the system information, the RRC message, the MBS control data, or in a set period, or instructed for the MBS service data transmission resources with a PDCCH scrambled by an RNTI identifier indicating a plurality of MBS service data, if an indicator indicating retransmission is included or an indicator indicating a new transmission is included, or if retransmission is indicated or a new transmission is indicated, if the UE does not successfully receive the previously received MBS service data, the UE may receive the retransmission of the MBS service data, or in case that the new transmission is indicated as described above, the UE may also receive new data. Alternatively, if the UE successfully receives the previously received MBS service data, the UE may ignore or not receive the data for retransmission, or discard the data even if the UE receives the data (for example, the data may be discarded with a duplicate detection procedure in the MAC layer device, the RLC layer device, or the PDCP layer device), or in case that the new transmission is indicated as described above, the UE may also receive new data (1q-40 and 1q-50).

Third retransmission method: As described above, the base station may transmit MBS service data in a transmission resource (time resource, frequency resource, subcarrier interval, and DRX configuration information) configured by system information, RRC message, or MBS control data or in a set period, or may indicate an MBS service data transmission resource with a PDCCH scrambled by an RNTI identifier indicating MBS service data, and transmit data from the transmission resource (1q-05, 1q-10, 1q-30, and 1q-35). As described above, the UE may receive MBS service data in a transmission resource (time resource, frequency resource, subcarrier interval, and DRX configuration information) configured by system information, RRC message, or MBS control data or in a set period, or may receive indication for an MBS service data transmission resource with a PDCCH scrambled by an RNTI identifier indicating MBS service data, and receive data from the transmission resource (1q-05, 1q-10, 1q-30, and 1q-35). As described above, in case that the UE does not successfully receive the MBS service data, the UE may indicate NACK in the transmission resource (e.g., PUCCH) indicated by the PDCCH, the transmission resource configured in the system information, the RRC message, or the MBS control message. As described above, when the base station receives an indication that the MBS service data has not been successfully received from a certain UE, the base station may perform a retransmission procedure. As described above, the transmission procedure for new data may be transmit the MBS service data from the transmission resource (time resource, frequency resource, subcarrier interval, and DRX configuration information) configured by system information, RRC message, or MBS control data or the set period, or may indicate an MBS service data transmission resource with a PDCCH scrambled by an RNTI identifier indicating MBS service data and transmit data from the transmission resource (1q-05, 1q-10, 1q-35, and 1q-40). As described above, the retransmission procedure for data for the retransmission may transmit MBS control data in a separately configured transmission resource (time resource, frequency resource, subcarrier interval, DRX configuration information, offset, period, transmission resource configured to indicate a new data transmission resource, offset with the period, or period (1q-15 and 1q-45), or in a set period by configuring a separate transmission resource for retransmission in system information, RRC message, or MBS control data, or may indicate MBS service data to be retransmitted as PDCCH (e.g., scrambled by an RNTI identifier for retransmission, scrambled by an RNTI identifier for PDCCH, or MBS service including an indicator indicating retransmission), RNTI identifiers (e.g., an indicator scrambled by an RNTI identifier for retransmission or indicating retransmission), or MBS control data (indicate retransmission) for retransmission when indicating MBS service data transmission resource with PDCCH scrambled by RNTI identifier indicating MBS service data, and may indicate a transmission resource through which retransmitted data is retransmitted (1q-20, 1q-25, and 1q-50). When performing the retransmission procedure as described above, the base station may include and transmit an indicator indicating retransmission in PDCCH or MBS control data or RRC message indicating the transmission resource (1q-35 and 1q-40). For example, the base station may indicate whether to toggle the new data indicator (NDI) identifier (indicates new transmission if the NDI indicator is changed or retransmission if the NDI indicator has not changed). As another method, a separate transmission resource for retransmission may be configured to indicate retransmission by the transmission resource itself. As another method, an RNTI identifier for retransmission of MBS service data may be defined and the PDCCH may be scrambled by the RNTI identifier to indicate retransmission. As described above, when the UE receives MBS control data in the system information, the RRC message, the transmission resource (time resource, frequency resource, subcarrier interval, or DRX configuration information) configured by the MBS control data, or in a set period, or instructed for MBS service data transmission resources with a PDCCH scrambled by an RNTI identifier indicating MBS service data, if the UE does not successfully receive the previously received MBS service data, the UE may be instructed to receive the retransmission of the MBS service data in a separate transmission resource (time resource, frequency resource, subcarrier interval, DRX configuration information, offset, period, or new data transmission resource, offset with the period, or the period (1q-15 and 1q-45) configured to indicate a new data transmission resource) configured for retransmission in system information, RRC message, or MBS control data or in a set period. Further, on the transmission resource configured for the new transmission, new MBS service data transmission may be indicated and received. Alternatively, if the UE successfully receives the previously received MBS service data, the UE may ignore or not receive the indication or data in a separate transmission resource configured for retransmission, or discard the indication or data even if the UE receives the indication or data (for example, the indication or data may be discarded with a duplicate detection procedure in the MAC layer device, the RLC layer device, or the PDCP layer device). Alternatively, in the transmission resource configured for new transmission, new MBS service data transmission may be indicated and received (1q-20, 1q-25, 1q-35, and 1q-40).

Fourth retransmission method: As described above, when transmitting new data or when using the first retransmission method, the second retransmission method, or the third retransmission method, it may be applied in multicast bearer or multicast MBS service support, or unicast bearer or unicast MBS service support. As another method, as described above, when transmitting new data or when using the first retransmission method, the second retransmission method, or the third retransmission method, it may be applied in multicast bearer or multicast MBS service support. As another method, as described above, when transmitting new data, it may be applied in multicast bearer or multicast MBS service support, and when applying the first retransmission method, the second retransmission method, or the third retransmission method for retransmission, it may be applied in unicast bearer or unicast MBS service support. For example, a procedure for retransmission may be applied and performed only to UEs that have not successfully received MBS service data.

In the following of the disclosure, when the UE receiving the MBS service stops the MBS service, when the UE does not want to receive the MBS service anymore, when the UE tries to release the bearer for receiving the MBS service, or when the UE releases the MBS bearer according to the configuration of the base station or the indication of the RRC message or the MBS control message, one method or a combined method among the following methods is proposed as a reception operation of the UE.

First method: When releasing the MBS bearer (e.g., unicast bearer or multicast bearer) or receiving an instruction to release the MBS bearer, the UE may discard all the stored data if there is MBS service data stored (or if there is any data that has not yet been delivered to the upper layer device) in the MBS bearer (e.g., MAC layer device, RLC layer device, or PDCP layer device) and then may release the MBS bearer.

Second method: When releasing the MBS bearer (e.g., unicast bearer or multicast bearer) or receiving an instruction to release the MBS bearer, the UE may perform data processing and transmit the data to the upper layer device (for example, the data may be delivered to the upper layer device in the order of receipt or in an ascending order of serial numbers) if there is MBS service data stored (or if there is any data that has not yet been delivered to the upper layer device) in the MBS bearer (e.g., MAC layer device, RLC layer device, or PDCP layer device) and then may release the MBS bearer.

Third method: When releasing the MBS bearer (e.g., unicast bearer or multicast bearer) or receiving an instruction to release the MBS bearer, the UE may stop or initialize a rearrangement timer in case that a rearrangement function is configured in the MBS bearer (e.g., MAC layer device, RLC layer device, or PDCP layer device) or the rearrangement function is performed, or the UE may perform data processing and transfer the data to an upper layer device (e.g., the data may be delivered to the upper layer device in the order of their reception or in an ascending order of serial numbers) if there is the stored MBS service data (or there is data that has not yet been transferred to the upper layer device). Then, the UE may release the MBS bearer Fourth method: When releasing the MBS bearer (e.g., unicast bearer or multicast bearer) or receiving an instruction to release the MBS bearer, the UE may stop or initialize the rearrangement timer in case that a rearrangement function is configured to the MBS bearer (e.g., MAC layer device, RLC layer device, or PDCP layer device) or the rearrangement function is performed, or in case that there is the stored MBS service data (or in case that there is the data that has not yet been transferred to the upper layer device), the UE may perform a header decompression procedure with respect to the MBS service data (e.g., in case that the header decompression procedure has not been performed) and transmit the data to an upper layer device (e.g., the data may be delivered to the upper layer device in the order of their reception or in an ascending order of serial numbers). Then the UE may release the MBS bearer.

Figure 1R:
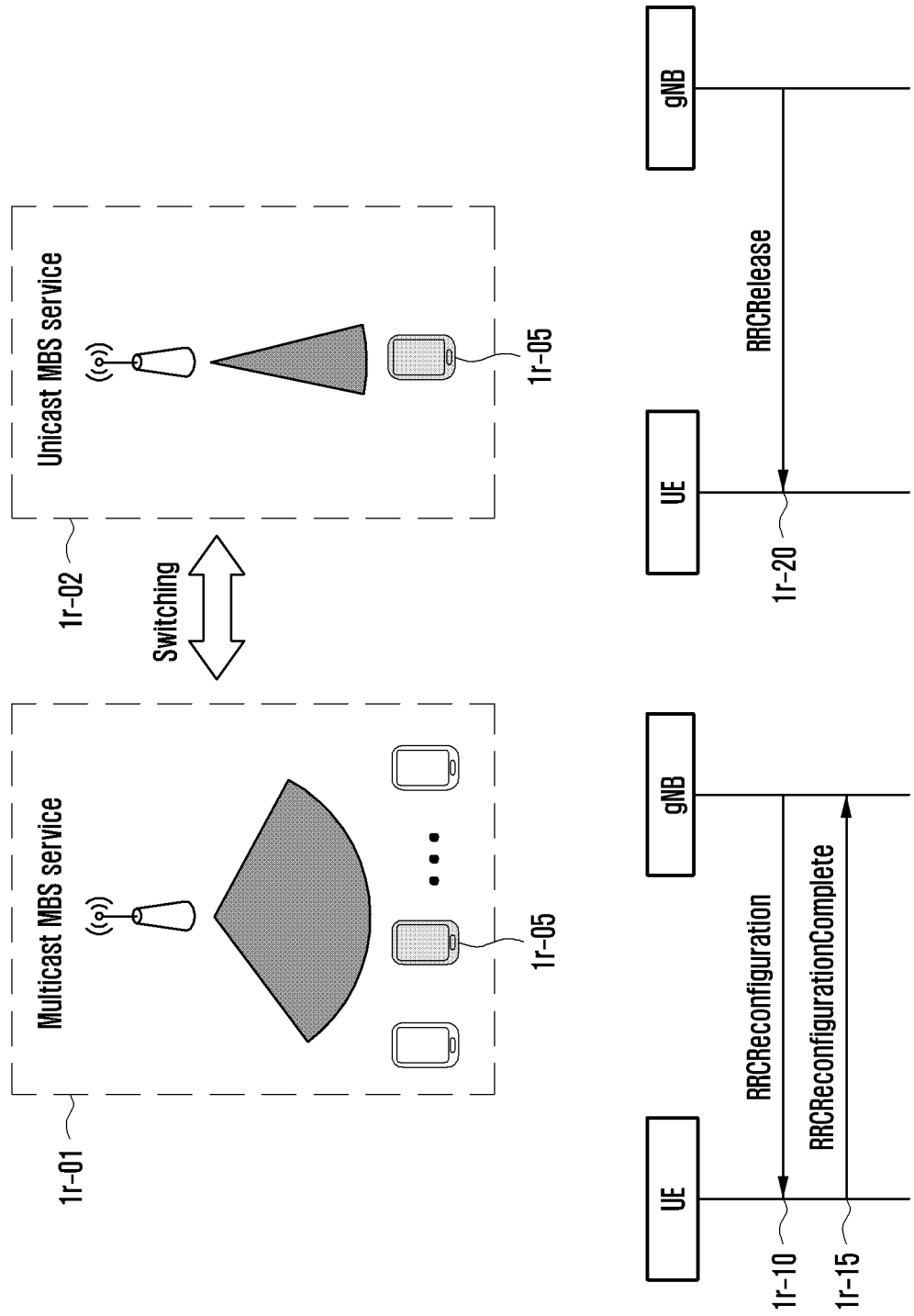
FIG. 1R is a diagram illustrating a first switching method for continuously supporting (transmitting or receiving) an MBS service by switching from a multicast service or a multicast bearer to a unicast service or a unicast bearer, or a second switching method for continuously supporting (transmitting or receiving) an MBS service by switching from a unicast service or a unicast bearer to a multicast service or a multicast bearer in an MBS service supporting method proposed in a next-generation mobile communication system of the disclosure or an access stratum (AS).

FIG. 1R is a diagram illustrating a first switching method for continuously supporting (transmitting or receiving) an MBS service by switching from a multicast service or a multicast bearer to a unicast service or a unicast bearer, or a second switching method for continuously supporting (transmitting or receiving) an MBS service by switching from a unicast service or a unicast bearer to a multicast service or a multicast bearer in an MBS service supporting method proposed by the next-generation mobile communication system of the disclosure or access stratum (AS).

In FIG. 1R, the first switching method represents a method of switching a multicast service in which a plurality of UEs are simultaneously serviced with MBS service data broadcasted or transmitted by a base station for a certain MBS service as in 1r-01, into a unicast service, which is an MBS service in which the base station broadcasts or transmits MBS service data for the MBS service for one UE, as in 1r-02. In addition, the first switching method may be indicated by an indicator in system information or RRC message or MBS control information message or MAC control information or RLC control information or PDCP control information or PDCCH. For example, in case that the UE receives the MBS service through a multicast bearer in a cell supporting the MBS service and moves to a cell that does not support the MBS service, the UE may receive the MBS service by switching to the unicast bearer upon request from the network or according to the instruction of the network.

In FIG. 1R, as in 1r-02, the second switching method represents a method of switching a unicast service, which is an MBS service in which a base station broadcasts or transmits MBS service data for a certain MBS service for one UE into a multicast service in which a plurality of UEs simultaneously receive MBS service data broadcasted or transmitted by a base station for the MBS service, as 1r-01. In addition, the second switching method may be indicated by an indicator in system information or RRC message or MBS control information message or MAC control information or RLC control information or PDCP control information or PDCCH.

As in 1r-01, when a plurality of UEs receive MBS service data broadcasted or transmitted by a base station for a certain MBS service at the same time, a bearer through which each of the plurality of UEs receives the MBS service may be called a multicast bearer. In addition, as in 1r-02, when the base station broadcasts or transmits MBS service data for the MBS service for one UE, a bearer through which the UE receives the MBS service may be referred to as a unicast bearer.

The UE may receive the MBS service based on the multicast service, multicast bearer, unicast service, or unicast bearer proposed in the disclosure. For example, the UE 1r-05 may receive a service as a multicast service or a multicast bearer as in 1r-01 for the same MBS service, or may receive a service as a unicast service or a unicast bearer as in 1r-02. In another method, when receiving the MBS service as a multicast service according to the base station configuration or system information, RRC message, or MBS control message, as in 1r-01, the UE may receive a service by establishing or reestablishing a multicast bearer or by switching to a multicast bearer. Alternatively, when the UE receives the MBS service as a unicast service according to the base station configuration or system information or RRC message or MBS control message, as in 1r-02, the UE may receive a service by establishing, establishing, or reestablishing a unicast bearer or by switching to a unicast bearer. In another method, the UE may configure one MBS bearer for one MBS service, and may receive a multicast service or a unicast service through a bearer identifier or a logical channel identifier or an RNTI identifier corresponding to the one MBS bearer, or a first identifier or a second identifier for the MBS service, or a mapping relationship between the identifiers.

As described above, when the UE receives or tries to receive the MBS service, the UE may receive the MBS service, based on the multicast service or the multicast bearer or the unicast service or the unicast bearer according to the base station configuration or system information or the RRC message or the MBS control message.

The first switching method for continuously supporting (transmitting or receiving) the MBS service proposed in the disclosure or the second switching method for continuously supporting (transmitting or receiving) the MBS service by switching may be performed in one or more of the following cases. In case that the first switching method or the second switching method satisfies one or more of the following conditions, the base station may indicate or trigger the UE with an indicator in base station configuration or system information or RRC message or MBS control message or MAC control information or RLC control information or PDCP control information or PDCCH, alternatively, in a case the UE satisfies one or more of the following predetermined conditions, the UE may perform by itself (e.g., without an instruction from the base station):

- A case that the UE requests the first switching method or the second switching method from the network
- A case that the UE instructs the network to prefer a unicast service or a unicast bearer
- A case that the UE instructs the network to prefer a multicast service or a multicast bearer
- A case that the base station attempts to transition the UE to the RRC inactive mode or RRC idle mode
- A case that the UE attempts to receive the MBS service in RRC inactive mode or RRC idle mode
- A case that the base station tries to support the MBS service in the RRC inactive mode or RRC idle mode for the UE
- A case that the base station attempts to transition the UE to the RRC inactive mode, RRC idle mode, or RRC connected mode
- A case that the UE attempts to transition to RRC inactive mode, RRC idle mode, or RRC connected mode
- A case that the UE attempts to receive the MBS service in RRC inactive mode, RRC idle mode, or RRC connected mode
- A case that the base station tries to support the MBS service in the RRC inactive mode, RRC idle mode, or RRC connected mode for the UE
- A case that the UE detects or declares a radio connection failure
- A case that the base station is necessary in consideration of network transmission resources or scheduling implementation
- A case that the UE is required based on UE capability or configuration information
- A case that the UE or current cell (base station) or area or system information may not support multicast service or multicast bearer
- A case that the UE or current cell (base station) or area or system information may not support unicast service or unicast bearer
- A case that the UE or current cell (base station) or area or system information may not support a multicast service or a multicast bearer for any service
- A case that the UE or current cell (base station) or area or system information may not support unicast service or unicast bearer for any service For example, the base station may allow the UE receiving the first MBS service in the RRC connected mode to receive the service as a multicast service or a multicast bearer. In case that the RRC connected mode UE indicates that it wants to receive a unicast service or a unicast bearer, the base station may reflect the preference of the UE and indicate the first switching method for continuously supporting (transmitting or receiving) the MBS service with an RRC message or MBS control message to provide the MBS service to the UE as a unicast service or unicast bearer. The reverse case of switching from a unicast service or unicast bearer to a multicast or multicast bearer as described above is also exemplified.

For example, the base station may allow the UE receiving the first MBS service in the RRC connected mode to receive the service as a unicast service or a unicast bearer. In case that the RRC connected mode UE intends to transition to the RRC inactive mode or RRC idle mode, or a case that the UE intends to transition to the RRC inactive mode or RRC idle mode, the base station may continuously provide the MBS service to the UE as a multicast service or a multicast bearer by indicating a second switching method for continuously supporting (transmitting or receiving) the MBS service with an RRC message or an MBS control message. The reverse case of switching from a multicast service or a multicast bearer to a unicast or unicast bearer as described above is also exemplified.

For example, the base station may allow the UE receiving the first MBS service in the RRC connected mode to receive the service as a multicast service or a multicast bearer. In case that handover is instructed to the RRC connected mode UE, or in case that the target base station does not support the first MBS service as a multicast service or a multicast bearer or does not support the MBS service, the base station may indicate the UE with an RRC message or MBS control message for the first switching method to continuously support (transmit or receive) the MBS service to continuously provide the MBS service to the UE as a unicast service or a unicast bearer. The reverse case of switching from a unicast service or unicast bearer to a multicast service or multicast bearer as described above is also exemplified.

For example, in case that the UE wants to receive any MBS service in the RRC idle mode or RRC inactive mode, the UE may establish a connection with the base station according to system information, and may receive a service as a multicast service or a multicast bearer according to an indication of an RRC message or an MBS control message. In case that the UE in the RRC inactive mode or RRC idle mode configures or resumes the connection with the network in order to transmit or receive general data, the MBS service can be continuously serviced to the UE as a unicast service or a unicast bearer according to the indication of the RRC message or the MBS control message for the first switching method for continuously supporting (transmitting or receiving) the MBS service according to the determination of the base station or the preference of the UE. The reverse case of switching the unicast service or the unicast bearer to the multicast service or the multicast bearer as described above may also be exemplified.

For example, in case that the UE wants to receive any MBS service in the RRC idle mode or RRC inactive mode, the UE may establish a connection with the base station according to system information, and may receive a service as a multicast service or a multicast bearer according to an indication of an RRC message or an MBS control message. In case that the UE in the RRC inactive mode or RRC idle mode moves and camps on another cell through a cell selection or reselection procedure, if the MBS service is not supported in the new cell or in the system information of the new cell (e.g., indicated by an indicator), or if the MBS service is not supported as a multicast service or a multicast bearer (e.g., indicated by an indicator), the UE may establish an RRC connection with the base station, and may continue to receive the MBS service as the unicast service or the unicast bearer according to the indication of the RRC message or the MBS control message for the first switching method for continuously supporting (transmitting or receiving) the MBS service according to the configuration or determination of the base station. The reverse case of switching the unicast service or the unicast bearer to the multicast service or the multicast bearer as described above may also be exemplified.

The first switching method for continuously supporting (transmitting or receiving) the MBS service or the second switching method for continuously supporting (transmitting or receiving) the MBS service proposed in the disclosure may be performed by one or a combination of the following methods.

First method: A bearer receiving each MBS service may be established in system information or RRC message or MBS control message as suggested above of the disclosure, and a first identifier or a second identifier, a bearer identifier, a logical channel identifier, or an RNTI identifier corresponding to each MBS service may be configured or allocated. As described above, an indicator indicating whether a bearer receiving each MBS service is a unicast service, a unicast bearer, or a multicast service or a multicast bearer may be proposed. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or multicast bearer corresponding to each MBS service. When supporting the MBS service in unicast, the base station may configure MBS service data corresponding to identifiers or indicators corresponding to the MBS service, and may transmit MBS service data by indicating transmission resources. In case that the base station wants to support the MBS service through multicast, the base station may configure MBS service data corresponding to identifiers or indicators corresponding to the MBS service, and may transmit the MBS service data by indicating a transmission resource. As described above, the base station may apply the first switching method or the second switching method based on each other's identifiers or indicators. Therefore, when the UE receives data from the bearer configured for the MBS service, the UE may receive support for a unicast service or a multicast service for each MBS service by identifying the identifier or indicator and identifying the logical channel identifier, the bearer identifier, or the first identifier or the second identifier.

Second embodiment: A bearer receiving each MBS service may be established in system information or RRC message or MBS control message as suggested above of the disclosure, and a first identifier or a second identifier, a bearer identifier, a logical channel identifier, or an RNTI identifier corresponding to each MBS service may be configured or allocated. As described above, an indicator indicating whether a bearer receiving each MBS service is a unicast service, a unicast bearer, or a multicast service or a multicast bearer may be configured. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or a multicast bearer corresponding to each MBS service. In the second method, a first identifier or a second identifier, a bearer identifier, or a logical channel identifier corresponding to each MBS service may be configured or allocated. The RNTI identifier may allocate a first RNTI identifier to the unicast service of the MBS service and a second RNTI identifier to the multicast service of the MBS service for each MBS service. Therefore, when the base station supports the MBS service by unicast, the base station may configure MBS service data corresponding to the identifiers corresponding to the MBS service, scramble the PDCCH with the first RNTI identifier, and transmit the MBS service data by indicating the transmission resource. In case that the base station wants to support the MBS service by multicast, the base station may configure MBS service data corresponding to the identifiers corresponding to the MBS service, and may transmit MBS service data by scrambling the PDCCH with the second RNTI identifier and indicating the transmission resource. As described above, the base station may apply the first switching method or the second switching method based on the different first or second RNTI identifiers. Therefore, the UE checks the first RNTI identifier or the second RNTI identifier when receiving data from the bearer configured for the MBS service, and may receive support for the unicast service or the multicast service by checking the logical channel identifier, the bearer identifier, the first identifier, or the second identifier.

Third embodiment: A bearer receiving each MBS service may be established in system information or an RRC message or MBS control message as suggested above of the disclosure, and a first identifier or a second identifier, a bearer identifier, a logical channel identifier, or an RNTI identifier corresponding to each MBS service may be configured or allocated. An indicator indicating whether a unicast service or a unicast bearer or a multicast service or a multicast bearer may be configured for a bearer that receives each MBS service. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or a multicast bearer corresponding to each MBS service. In the third method, a first RNTI identifier may be configured or allocated for a unicast service of MBS services and a second RNTI identifier may be configured or allocated for a multicast service of the MBS services. Therefore, the UE may distinguish the unicast service or the multicast service based on the first RNTI identifier or the second RNTI identifier, or the base station may support a unicast service or a multicast service based on the first RNTI identifier or the second RNTI identifier. The base station may support a unicast service with a first RNTI identifier, and in the unicast service, each MBS service may generate and transmit MBS service data by distinguishing the unicast service or the multicast service through a bearer identifier, a logical channel identifier, or a first identifier or a second identifier. Therefore, in case that the UE receives the unicast service with the first RNTI identifier, the UE may receive and process each MBS service data in each MBS service bearer by distinguishing each MBS service based on the bearer identifier or the logical channel identifier or the first identifier or the second identifier. In addition, as described above, the base station may support a multicast service with a second RNTI identifier, and in the multicast service, the base station may generate and transmit MBS service data by distinguishing each MBS service through a bearer identifier, a logical channel identifier, or a first identifier or a second identifier. Therefore, in case that the UE receives the multicast service with the second RNTI identifier, the UE may receive and process each MBS service data in each MBS service bearer by distinguishing each MBS service, based on the bearer identifier or logical channel identifier or the first identifier or the second identifier. Therefore, when the base station supports the MBS service by unicast, the base station may configure MBS service data corresponding to the identifiers corresponding to the MBS service, and may transmit MBS service data by scrambling the PDCCH with the first RNTI identifier and indicating the transmission resource. In case that the base station wants to support the MBS service by multicast, the base station may configure MBS service data corresponding to the identifiers corresponding to the MBS service, scramble the PDCCH with the second RNTI identifier, and indicate the transmission resource to transmit MBS service data. As described above, the base station may apply the first switching method or the second switching method based on the different first or second RNTI identifiers. Therefore, when the UE receives data from the bearer configured for the MBS service, the UE may receive support for a unicast service or a multicast service by identifying the first RNTI identifier or the second RNTI identifier and identifying the logical channel identifier, the bearer identifier, or the first identifier or the second identifier.

Fourth method: A bearer receiving each MBS service may be established in system information or RRC message or MBS control message as suggested above of the disclosure, a first identifier or a second identifier, a bearer identifier, a logical channel identifier, or an RNTI identifier corresponding to each MBS service may be configured or allocated. An indicator indicating whether a bearer receiving each MBS service is a unicast service or a unicast bearer or a multicast service or a multicast bearer may be set. In another method, a first identifier or a second identifier or a bearer identifier or a logical channel identifier or an RNTI identifier may be established or allocated for a unicast service or unicast bearer corresponding to each MBS service, or a first identifier or a second identifier or a bearer identifier or a logical channel identifier or an RNTI identifier may be configured or allocated for a multicast service or a multicast bearer corresponding to each MBS service. In the fourth method, a restriction or rule or mapping for receiving downlink data for the first identifier or second identifier or bearer identifier or logical channel identifier or RNTI identifier corresponding to each MBS service may be configured in system information or RRC message or MBS control message. For example, a downlink logical channel restriction method may be configured for each MBS service. For example, a rule or restriction (e.g., subcarrier interval or maximum PUSCH interval length or periodic transmission resource type or SCell identifier or bandwidth part identifier or periodic transmission resource group or physical layer device priority indicator identifier) for receiving data may be configured for an identifier corresponding to each MBS service (e.g., a first identifier or a second identifier, or a logical channel identifier or a bearer identifier). That is, the base station may support the MBS service by mapping or configuring any MBS service or unicast or multicast service with respect to the first rule or restriction (subcarrier interval or maximum PUSCH interval length or periodic transmission resource type or SCell identifier or bandwidth part identifier or periodic transmission resource group or physical layer device priority indicator identifier). Accordingly, in case that the first rule or restriction is configured, the UE may receive service support by processing the MBS service data received according to the first rule or restriction in the corresponding MBS service bearer. For example, the base station may support an MBS service for the first rule or restriction (subcarrier interval or maximum PUSCH interval length or periodic transmission resource type or SCell identifier or bandwidth part identifier or periodic transmission resource group or physical layer device priority indicator identifier), and may transmit MBS service data by unicast. Accordingly, in case that the first rule or restriction is set, the UE may receive service support by processing the MBS service data received according to the first rule or restriction in the corresponding MBS service bearer. For example, the base station supports any MBS service for the second rule or restriction (subcarrier interval or maximum PUSCH interval length or periodic transmission resource type or SCell identifier or bandwidth part identifier or periodic transmission resource group or physical layer device priority indicator identifier), and may transmit MBS service data by multicast. Therefore, in case that the second rule or restriction is configured, the UE may receive service support by processing the MBS service data received according to the second rule or restriction in the corresponding MBS service bearer. Accordingly, in the fourth method, the base station may configure a corresponding rule or restriction and support the MBS service depending on the MBS service or RRC mode (e.g., RRC idle mode or RRC inactive mode or RRC connected mode) or unicast service or multicast service. Therefore, the base station may support the MBS service by configuring the corresponding dedicated transmission resource or dedicated carrier (cell) or dedicated bandwidth part identifier or dedicated sub-carrier interval or priority as a restriction or rule depending on the MBS service, unicast service, multicast service, or RRC mode of the UE, and the UE may receive each MBS service in unicast or multicast according to the restrictions or rules set above. The base station or the UE may perform the first switching method or the second switching method by configuring different rules or restrictions for each MBS service. For example, a logical channel identifier of a certain MBS service may be mapped or configured to a first SCell identifier (or bandwidth part identifier) or a second SCell identifier (or bandwidth part identifier), and the base station may support the unicast service with the first SCell identifier (or bandwidth part identifier) and support the multicast service with the second SCell identifier (or bandwidth part identifier). In another method, the base station or UE may restrict the first SCell identifier (or bandwidth part identifier) to unicast services of all MBS services, and may provide or receive a service by classifying different MBS service data based on the logical channel identifier (or barer identifier) for data received in the SCell corresponding to the first SCell identifier (or bandwidth part identifier). In addition, the base station or the UE may restrict the second SCell identifier (or bandwidth part identifier) to the multicast service of all MBS services, and data received in the SCell (or bandwidth part) corresponding to the second SCell identifier (or bandwidth part identifier) may be provided or received by classifying different MBS service data, based on the logical channel identifier (or bearer identifier). As described above, the base station or UE may support each MBS service, unicast service, or multicast service by configuring or mapping various restrictions or rules for each MBS service, or may support the MBS service in the RRC connected mode, the RRC idle mode, or the RRC inactive mode.

Fifth method: A bearer receiving each MBS service may be established in system information or RRC message or MBS control message as suggested above of the disclosure, and a first identifier or a second identifier, a bearer identifier, a logical channel identifier, or an RNTI identifier corresponding to each MBS service may be configured or allocated. An indicator indicating whether a bearer receiving each MBS service is a unicast service or a unicast bearer or a multicast service or a multicast bearer may be configured. In another method, a first identifier or a second identifier or a bearer identifier or a logical channel identifier or an RNTI identifier may be configured or allocated for a unicast service or unicast bearer corresponding to each MBS service, or a first identifier or a second identifier or a bearer identifier or a logical channel identifier or an RNTI identifier may be configured or allocated for a multicast service or a multicast bearer corresponding to each MBS service. In the fifth method, in the case of triggering or applying the first or second switching method to the first or second identifier or bearer identifier or logical channel identifier or RNTI identifier corresponding to each MBS service, through an RRC message or system information or MBS control message or MAC control information, the bearer for the MBS service may be released, a new MBS bearer may be established, and MBS service data may be received. For example, in case that the first switching method is indicated for a certain MBS service as described above, the UE may release the multicast bearer being serviced, newly establish a unicast bearer for the MBS service (e.g., identifiers corresponding to the MBS service may also be newly established), and receive MBS service data. For example, in case that the second switching method is indicated for a certain MBS service as described above, the UE may release the unicast bearer being serviced, newly establish a multicast bearer for the MBS service (e.g., identifiers corresponding to the MBS service may also be newly established), and receive MBS service data. As another method, two unicast bearers and two multicast bearers may be configured for each MBS service, the MBS service may be received, and the first switching method or the second switching method may be applied. In the case that the switching method is applied as described above, an indicator indicating which data is the last data may be introduced so that the data are sequentially transferred to the upper layer device during switching. As another method, the first switching method or the second switching method may be applied through QoS flow reconfiguration or remapping (configuring of mapping between QoS flow and bearer) in the SDAP layer device for MBS bearers supporting each MBS service. In case that the switching method is applied, an indicator indicating which data is the last data may be introduced so that the data is sequentially transferred to the upper layer device when switching.

In the first switching method or the second switching method proposed in the disclosure, in case that the base station configures a timer value through an RRC message or system information or an MBS control message and the timer expires, the base station may perform or trigger the first switching method or the second switching method. The timer may be set for each bearer (e.g., unicast bearer, multicast bearer, or each MBS bearer), or each MBS service or each identifier. The timer may be started or restarted when a bearer is established or whenever MBS service data is received, and the timer may be stopped when the bearer is released, when the MBS service is stopped or reception is stopped, or when an indication that the MBS service is stopped is received. When the timer expires, the first switching method or the second switching method may be performed or triggered.

In the disclosure, when the MBS service is supported as a multicast service, the multicast service may be supported only in the default bandwidth part or the initial bandwidth part. As described above, if the MBS service is supported by multicast in the default bandwidth part or the initial bandwidth part, the RRC idle mode or RRC inactive mode UE may easily receive the MBS service support.

As another method, when the UE attempts to receive the MBS service in the RRC idle mode or RRC inactive mode, the UE may perform synchronization in an initial bandwidth part, camp on, read system information, and receive MBS data through the MBS bearer in the initial bandwidth part or in the bandwidth part indicated by system information, or in the bandwidth part configured by the base station in the RRC message after establishing the RRC connection.

In the following, the disclosure suggests a UE operation in case that the base station instructs or triggers the first switching method or the second switching method or bearer release or bearer establishment to the UE as an indicator in the base station configuration or system information, RRC message, MBS control message, MAC control information, RLC control information, PDCP control information, or PDCCH, and the UE may perform one or a combination of the following methods as an operation of the UE.

First method: When receiving the instruction, if there is MBS service data stored in the MBS bearer (e.g., MAC layer device, RLC layer device, or PDCP layer device) (or if there is data that has not yet been delivered to an upper layer device), the UE may discard all stored data. Alternatively, variable initialization (e.g., initialization to 0) or reset procedure (e.g., configuring to a specific value) may be performed in the RLC layer device or the PDCP layer device. As another method, the RLC layer device may update the reception window variable (e.g., RX_NEXT or RX_NEXT_Highest) with the RLC serial number+1 of the received data. As another method, in the PDCP layer device, the reception window variable (e.g., RX_NEXT or RX_DELIV or RX_REORD) may be updated to the PDCP serial number of the received data (or COUNT value)+1, or the HFN value may be set to 1.

Second method: Upon receiving the indication, the UE may perform data processing and data transfer to an upper layer device (e.g., in the order they are received or in an ascending order of serial numbers) in case that there is MBS service data (or if there is data that has not yet been delivered to an upper layer device) stored in the MBS bearer (e.g., MAC layer device or RLC layer device or PDCP layer device). Alternatively, variable initialization (e.g., initialization to 0) or reset procedure (e.g., configuring to a specific value) may be performed in the RLC layer device or the PDCP layer device. As another method, the RLC layer device may update the reception window variable (e.g., RX_NEXT or RX_NEXT_Highest) with the RLC serial number+1 of the received data. As another method, the PDCP layer device may update the reception window variable (e.g., RX NEXT or RX_DELIV or RX_REORD) to the PDCP serial number (or COUNT value)+1 of the received data, or the HFN value may be configured to 1.

Third method: Upon receiving the instruction, the UE may stop or initialize the reordering timer in case that the reordering function is configured in the MBS bearer (e.g., MAC layer device or RLC layer device or PDCP layer device) or that the reordering function is performed, or the UE may also perform data processing and transfer to the upper layer device if there is stored MBS service data (or if there is data that has not yet been delivered to the upper layer device) (e.g., it may be transferred to upper layer devices in the order they are received or in ascending order of serial number). Alternatively, variable initialization (e.g., initialization to 0) or reset procedure (e.g., configuring to a specific value) may be performed in the RLC layer device or the PDCP layer device. As another method, the RLC layer device may update the reception window variable (e.g., RX_NEXT or RX_NEXT_Highest) with the RLC serial number+1 of the received data. As another method, the PDCP layer device may update the reception window variable (e.g., RX_NEXT or RX_DELIV or RX_REORD) to the PDCP serial number (or COUNT value)+1 of the received data, or the HFN value may be configured to 1.

Fourth method: When receiving the indication as described above, in case that a reordering function is configured in the MBS bearer (e.g., MAC layer device, RLC layer device, or PDCP layer device), or in case that a reordering function is performed, or a header compression procedure (or data compression procedure) is configured, the UE may stop or initialize the reordering timer, in case that there is stored MBS service data (or if there is data that has not yet been delivered to an upper layer device), the UE may perform a header decompression procedure on the MBS service data (e.g., in case that a header decompression procedure has not been performed), and deliver the same to an upper layer device (e.g., may deliver the same to an upper layer device in the order in which the MBS service data is received or in ascending order of the serial number). The UE may then release the MBS bearer. Alternatively, variable initialization (e.g., initialization to 0) or reset procedure (e.g., configuring to a specific value) may be performed in the RLC layer device or the PDCP layer device. As another method, the RLC layer device may update the reception window variable (e.g., RX NEXT or RX_NEXT_Highest) with the RLC serial number+1 of the received data. As another method, the PDCP layer device may update the reception window variable (e.g., RX_NEXT or RX_DELIV or RX_REORD) to the PDCP serial number of the received data (or COUNT value)+1, or may configure the HFN value to 1.

When the first switching method or the second switching method or the bearer release or the bearer establishment proposed in the disclosure is instructed or triggered, a UE operation is proposed, and the UE may perform one or a combination of the above methods as an operation of the UE.

In the following of the disclosure, a method for supporting the mobility of a UE receiving an MBS service may be proposed.

In case that the base station or the network instructs the UE to handover with an RRC message (e.g., RRCReconfiguration), or transmits an RRC message (e.g., RRCRelease) to the RRC connected mode UE to transition to the RRC inactive mode or RRC idle mode, or in case that the UE is supporting the MBS service as an MBS bearer, or in case that the UE is receiving the MBS service through the MBS bearer, or in case that the MBS bearer is a unicast bearer or a multicast bearer, the base station may transmit the RRC message including the indicator (e.g., a new indicator or a PDCP reestablishment indicator or a bearer (or PDCP) stop or release procedure indicator indicating the UE operation proposed in the disclosure) to instruct the UE to perform the first switching method or the second switching method proposed in the disclosure, or the UE operation (e.g., the first method or the second method or the third method or the fourth method) for bearer release or bearer configuration. In addition, the RRC message may include an indicator indicating whether to reconfigure, release, or maintain the MBS bearer previously configured in the UE, or whether to indicate the first switching or the second switching method, or information on reconfiguration (e.g., identifier information for transmission resources or MBS service) of an MBS bearer or information on a region (or a list of frequencies or cell identifiers) supporting the MBS service.

In another method, in case that an indicator indicating a handover is included in the received RRC message, or in case that an indicator for transitioning the UE in the RRC connected mode to an RRC inactive mode or an RRC idle mode is included in the RRC message, or in case that the UE is supporting the MBS service with the MBS bearer, or in case that the UE is receiving the MBS service with the MBS bearer (or in case that the UE does not instruct the MBS service stop), or in case that the MBS bearer is a unicast bearer or a multicast bearer, or in case that an indicator (e.g., a new indicator or PDCP reestablishment indicator or bearer (or PDCP) stop or release procedure indicator for indicating the operation of the UE proposed in the disclosure, or an indicator for instructing a first switching method or a second switching method or bearer release) is included in the RRC message, in case that the UE moves to an area in which the MBS service is not supported in system information, or in case that the UE moves to an area in which the MBS service is supported in the system information, in case that an upper layer device (e.g., RRC layer device) receives an indication that the data inactivity timer has expired from a lower layer device (e.g., MAC layer device), or in case that the upper layer device (e.g., RRC layer device) receives an indication that the data inactivity timer has expired from the lower layer device (e.g., MAC layer device) and transitions to the RRC idle mode, it is possible to instruct the UE to perform the first switching method or the second switching method proposed in the disclosure, or a UE operation (e.g., the first method or the second method or the third method or the fourth method) for bearer release or bearer establishment. In addition, the RRC message may include an indicator indicating whether to reconfigure, release, or maintain the MBS bearer previously configured in the UE, or whether to indicate the first switching or the second switching method, or MBS bearer reconfiguration information (e.g., identifier information on transmission resources or MBS service) or information on a region (or a list of frequencies or cell identifiers) supporting the MBS service.

Figure 1S:
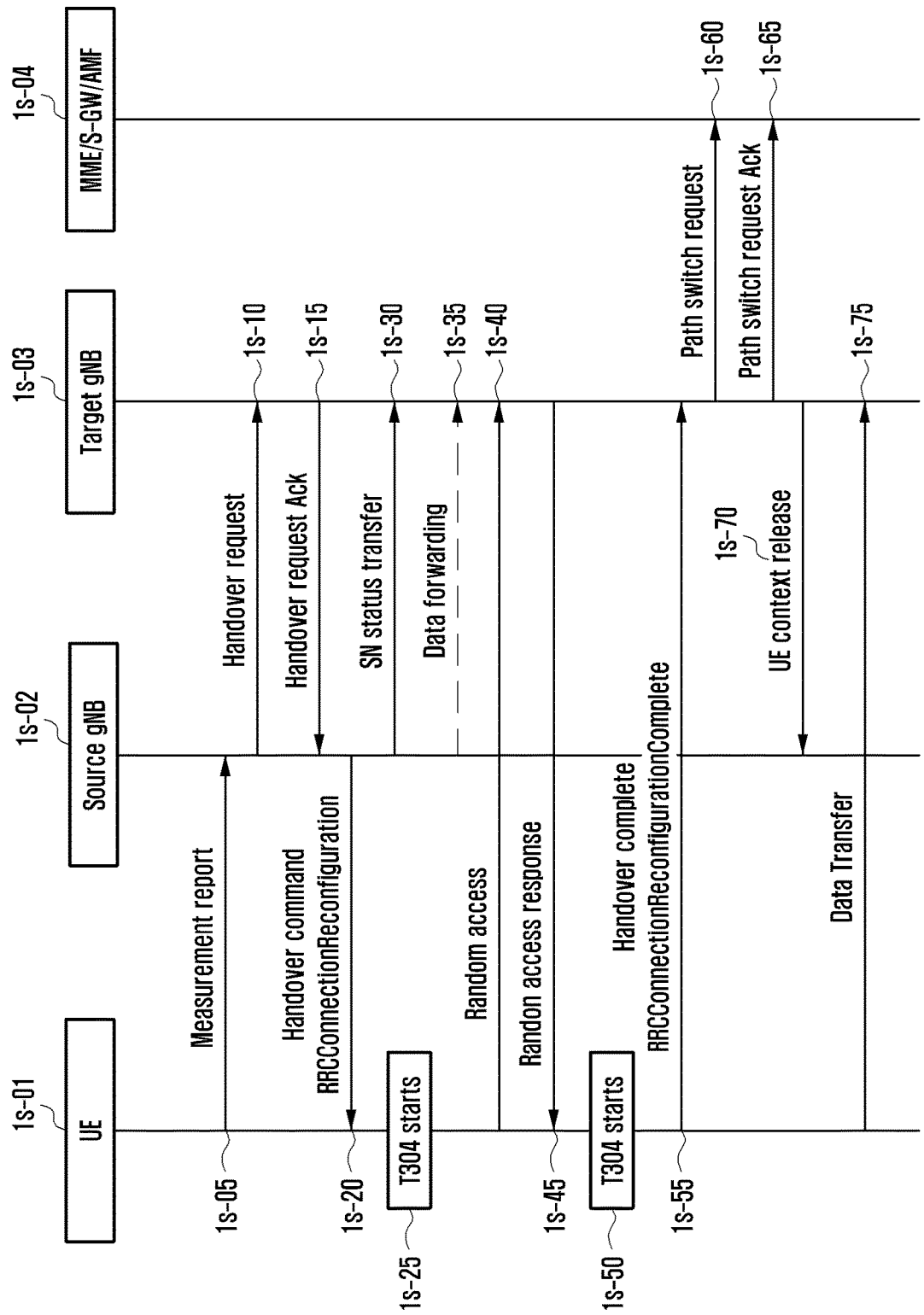
FIG. 1S is a diagram illustrating signaling procedures for performing a handover in a next-generation mobile communication system of the disclosure.

FIG. 1S is a diagram illustrating signaling procedures for performing a handover in a next-generation mobile communication system of the disclosure.

FIG. 1S is a diagram illustrating a procedure for extending and supporting the method for supporting the MBS service proposed in the disclosure even in the handover procedure. The UE 1s-01 in the RRC connected mode reports the cell measurement information (measurement report) to the current source base station (source eNB) 1s-02 periodically or when a specific event is satisfied (1s-05). The source base station determines whether the UE performs handover to a neighboring cell based on the measurement information. The handover is a technique to change a source base station that provides a service to a UE in a connected mode to another base station (or another cell of the same base station). In case that the source base station determines the handover, the source base station may request the handover by sending a handover request message (handover (HO) request) to a new base station that will provide the service to the UE, that is, a target base station (target eNB) 1s-03 (1s-10).

The handover request message may include a handover method supported or preferred by the source base station or a plurality of handover methods, or may include an indicator for requesting a handover method preferred by the target base station as another method.

In case that the target base station accepts the handover request, it may transmit a handover request acceptance (HO request ACK) message to the source base station (1s-15). In addition, the handover request message may include an indicator for indicating whether the UE is receiving the MBS service or whether it wants (or is interested in) or supports the MBS service, or identifier information of the MBS service being received, or information for seamless MBS service support (e.g., last data information or serial number information or time information or transmission resource information received by the UE), or MBS service configuration information or transmission resource information supported by the source base station to the UE.

The handover request acceptance message may include a handover method included by the source base station in the handover request message or a handover method supported (or preferred or instructed) by the target base station among a plurality of handover methods, and the source base station may indicate to the UE the handover method indicated by the target base station in the handover request acceptance message. As another method, the target base station may indicate the handover method supported by the target base station as an indicator in the handover request acceptance message so that the indicated handover method is performed by the source base station and the UE. In addition, the handover request acceptance message may include an indicator for indicating to the UE whether the target base station supports the MBS service or identifier information of the supported MBS service, or information for seamless MBS service support (e.g., configuration information or reconfiguration information for the MBS service that the UE is receiving (e.g., transmission resource information or identifier information (logical channel identifier or RNTI identifier or bearer identifier) used when the target base station supports the MBS service) or time information or transmission resource information), or MBS service configuration information or transmission resource information supported by the target base station to the UE.

Upon receiving the message, the source base station may transmit a handover command message (HO command message) to the UE (1s-20). The handover command (HO command) message may be transmitted from the source base station to the UE by using an RRC connection reconfiguration message (1s-20).

By using an indicator defined for each handover method in the handover command message (e.g., RRCReconfiguration message), the base station may configure, to the UE, which handover method is indicated in consideration of the UE capability. The UE may perform a handover procedure to the target base station according to the handover method indicated in the handover command message. The handover command message may include an indicator for indicating, to the UE, whether the target base station supports the MBS service or identifier information of the supported MBS service, or information for seamless MBS service support (e.g., configuration information or reconfiguration information for the MBS service that the UE is receiving (e.g., transmission resource information or identifier information (logical channel identifier or RNTI identifier or a bearer identifier) used when the target base station supports the MBS service) or time information or transmission resource information), or MBS service configuration information or transmission resource information supported by the target base station to the UE.

As described above, the UE may start or continue to receive the MBS service in order to support the seamless MBS service while performing the handover procedure according to the MBS configuration information indicated or configured in the handover command message or an indicator supporting the multicast MBS service, or even before completing the handover procedure. In another method, the UE may start to receive or may receive the MBS service when or after completing the handover procedure according to the MBS configuration information indicated or configured in the handover command message or an indicator supporting the multicast MBS service or an indicator supporting the unicast MBS service.

In case of receiving the message, the UE may stop transmitting and receiving data with the source base station and start the timer T304. In T304, in case that the UE does not succeed in handover to the target base station for a predetermined time, the UE may return to the original configuration of the UE and switch to the RRC Idle state. The source base station may transmit a sequence number (SN) status for uplink/downlink data, and in case that there is downlink data, the source base station may transmit the same to the target base station (1s-30 and 1s-35). The UE may attempt random access to the target base station indicated by the source base station (1s-40). The random access may be for notifying the target cell that the UE is moving through the handover and for performing uplink synchronization. For the random access, the UE may transmit a preamble ID provided from the source base station or a preamble corresponding to a randomly selected preamble ID to the target cell. After the preamble is transmitted, after a specific number of subframes have elapsed, the UE may monitor whether a random access response message (RAR) is transmitted from the target cell. The monitoring time period may be referred to as a random access response window (RAR window). During the specific time, when a random access response (RAR) is received (1s-45), the UE may transmit a handover complete (HO complete) message to the target base station as an RRC reconfiguration complete message (1s-55). In case that the random access response is successfully received from the target base station as described above, the UE may end the timer T304 (1s-50). The target base station may request a path modification to modify the paths of bearers configured as the source base station (1s-60 and 1s-65) and notify the source base station to delete the UE context of the UE (1s-70). Accordingly, the UE may attempt to receive data from the start of the RAR window with respect to the target base station, and after receiving the RAR, start transmitting and receiving data with the target base station while transmitting an RRC Reconfiguration Complete message.

In the following of the disclosure, as in FIG. 1K, 1L, 1M, or 1S, the UE operation is proposed when the UE receives an RRC message (e.g., an RRCRelease message or an RRCReconfiguration message or a new RRC message for MBS service) from a base station or a network, or when an upper layer device (e.g., RRC layer device) receives an indication that the data inactivity timer has expired from a lower layer device (e.g., MAC layer device), or when the upper layer device (e.g., RRC layer device) receives an indication that the data inactivity timer has expired from the lower layer device (e.g., the MAC layer device) and transitions to an RRC idle mode. The UE may perform one or a combination of the following methods as the UE operation.

First Method

>> In case that an indicator indicating handover is included in the RRC message received as above, or an indicator for transitioning the UE in the RRC connected mode to an RRC inactive mode or an RRC idle mode is included, or the UE is supported with the MBS service as an MBS bearer, or the UE is receiving the MBS service through the MBS bearer (or if the UE does not instruct the MBS service suspension), or the MBS bearer is a unicast bearer or a multicast bearer, or an indicator (e.g., a new indicator or PDCP reestablishment indicator or bearer (or PDCP) suspension or release procedure indicator indicating the UE operation proposed in the disclosure, or an indicator indicating the first switching method or the second switching method or bearer release) is included in the RRC message:

>>> The UE may not perform the MAC layer device reset procedure. This is because, when the MAC layer device is initialized, when the UE is receiving the MBS data, the MBS data service may be interrupted or data transmission delay may occur.

>>> As another method, the MAC layer device partial reset procedure proposed in the disclosure may be performed. The partial reset procedure of the MAC layer device may prevent an MBS data service interruption or data transmission delay from occurring in case that the UE is receiving MBS data, and may prevent unnecessary retransmission. As another method, in case that an indicator indicating partial initialization of the MAC layer device is included in the RRC message, or an upper layer device indicates partial initialization of the MAC layer device, a partial reset procedure of the MAC layer device may be performed.

>>> Alternatively, when releasing configuration information (configuration information related to MAC layer device or RLC layer device or PDCP layer device or SDAP layer device) or transmission resources for all bearers configured for the UE, the configuration information for the MBS bearer (MAC layer device, RLC layer device, PDCP layer device, or SDAP layer device related configuration information) may be excluded from being released. In another method, in case of being indicated by the indicator in the RRC message, the configuration information (MAC layer device or RLC layer device or PDCP layer device or SDAP layer device related configuration information) for the MBS bearer may be maintained and applied, or may not be released. Alternatively, in case of being indicated by the indicator in the RRC message, the configuration information for the MBS bearer (configuration information related to the MAC layer device or the RLC layer device or the PDCP layer device or the SDAP layer device) may be released.

>>> Alternatively, all SRBs or all DRBs except for SRB0 or MBS bearers (unicast bearer or multicast bearer) configured in the UE may be suspended. This is because in case that the MBS bearer is suspended as described above, when the UE is receiving MBS data, the MBS data service disconnection or data transmission delay may occur.

>>> Alternatively, the PDCP suspend procedure (PDCP suspend) may be instructed to a lower layer device (e.g., a PDCP layer device) of all DRBs configured in the UE or except for MBS bearers (unicast bearer or multicast bearer).

>> In case that an indicator indicating handover is included in the RRC message received above, or an indicator for transitioning to RRC inactive mode or RRC idle mode is included in the RRC connected mode UE:

>>> The UE may perform a MAC layer device reset procedure. This is because when the UE is not receiving MBS data as described above, unnecessary retransmission may be prevented by initializing the MAC layer device.

>>> Alternatively, configuration information (configuration information related to MAC layer device or RLC layer device or PDCP layer device or SDAP layer device) or transmission resources for all bearers configured for the UE may be released.

>>> Alternatively, all SRBs or all DRBs except for SRB0 configured in the UE may be suspended.

>>> Alternatively, a PDCP suspend procedure (PDCP suspend) may be instructed to a lower layer device (e.g., a PDCP layer device) of all DRBs configured in the UE. As another method, a PDCP suspend procedure (PDCP suspend) may be instructed to a lower layer device (e.g., a PDCP layer device) of MBS bearers configured in the UE to perform the procedure proposed in the disclosure.

Second Method

>> In case that the RRC message received above includes an indicator indicating handover, or an indicator for transitioning the UE in the RRC connected mode to the RRC inactive mode or the RRC idle mode is included, or the UE does not support the MBS service as an MBS bearer, or the UE is not receiving MBS service through the MBS bearer, or the MBS bearer is not a unicast bearer or a multicast bearer, or an indicator (e.g., a new indicator indicating the operation of the UE proposed in the disclosure, PDCP reestablishment indicator, or bearer (or PDCP) suspension or release procedure indicator, or indicator indicating the first switching method or the second switching method or bearer release) is not included in the RRC message:

>>> The UE may perform a MAC layer device reset procedure. This is because, in case that the UE is not receiving MBS data as described above, unnecessary retransmission may be prevented by initializing the MAC layer device.

>>> Alternatively, configuration information (configuration information related to MAC layer device or RLC layer device or PDCP layer device or SDAP layer device) or transmission resources for all bearers configured for the UE may be released.

>>> Alternatively, all SRBs or all DRBs except for SRB0 configured in the UE may be suspended.

>>> Alternatively, a PDCP suspend procedure (PDCP suspend) may be instructed to a lower layer device (e.g., a PDCP layer device) of all DRBs configured in the UE.

>> In case that the RRC message received above includes an indicator indicating a handover, or the UE in the RRC connected mode includes an indicator for transitioning the UE to the RRC inactive mode or RRC idle mode, or the UE is supporting the MBS service as an MBS bearer, or the UE is receiving the MBS service through the MBS bearer (or the UE does not instruct the MBS service to suspend), or the MBS bearer is a unicast bearer or a multicast bearer, or an indicator (e.g., a new indicator or PDCP reestablishment indicator or bearer (or PDCP) suspension or release procedure indicator for indicating the operation of the UE proposed in the disclosure, or an indicator for instructing a first switching method or a second switching method or bearer release) is included in the RRC message:

>>> The UE may not perform the MAC layer device reset procedure. This is because, when the MAC layer device is initialized, when the UE is receiving MBS data, the MBS data service may be interrupted or data transmission delay may occur.

>>> As another method, the MAC layer device partial reset procedure proposed in the disclosure may be performed. The partial reset procedure of the MAC layer device may prevent an MBS data service interruption or data transmission delay from occurring in case that the UE is receiving MBS data, and may prevent unnecessary retransmission. As another method, in case that an indicator indicating partial initialization of the MAC layer device is included in the RRC message, or the upper layer device instructs partial initialization of the MAC layer device, the partial reset procedure of the MAC layer device may be performed.

>>> Alternatively, when releasing the configuration information for all bearers configured for the UE (configuration information related to the MAC layer device or RLC layer device or PDCP layer device or SDAP layer device) or the transmission resource, the configuration information for the MBS bearer (configuration information related to the MAC layer device or RLC layer device or PDCP layer device or SDAP layer device) may be excluded from being released. In another method, in case of being indicated by the indicator in the RRC message, configuration information (configuration information related to MAC layer device or RLC layer device or PDCP layer device or SDAP layer device) for the MBS bearer may be maintained and applied, or may not be released. Alternatively, in case of being indicated by the indicator in the RRC message, configuration information (MAC layer device, RLC layer device, PDCP layer device, or SDAP layer device related configuration information) for the MBS bearer may be released.

>>> Alternatively, all SRBs or all DRBs except for SRB0 or MBS bearers (unicast bearer or multicast bearer) configured in the UE may be suspended. This is because, in case that the MBS bearer is suspended as described above, when the UE is receiving MBS data, a disconnection of the MBS data service or data transmission delay may occur.

>>> Alternatively, the PDCP suspend procedure (PDCP suspend) may be instructed to a lower layer device (e.g., a PDCP layer device) of all DRBs configured in the UE or except for MBS bearers (unicast bearer or multicast bearer). As another method, a PDCP suspend procedure (PDCP suspend) may be instructed to a lower layer device (e.g., a PDCP layer device) of MBS bearers configured in the UE to perform the procedure proposed in the disclosure.

The partial reset of the MAC layer device proposed in the disclosure may include one or a plurality of UE operations among the following procedures:

The UE may perform an operation of flushing the remaining HARQ processes (i.e., general HARQ process or HARQ process for system information, etc.) except for the HARQ process for MBS among the HARQ processes set in the serving cell, and perform an operation of flushing, releasing, or initializing the HARQ process for MBS after handover completion or after RRC state mode transition (with RRC inactive mode or RRC idle mode), or omitting flushing.

In the case of flush operation, after handover completion or after RRC state mode transition (to RRC inactive mode or RRC idle mode), data of HARQ process related to MBS may be flushed at the time when MBS service reception becomes possible in the target base station or at the time when G-RNTI monitoring starts. Alternatively, data reception through the G-RNTI may be continued until the handover is completed or the RRC state mode transition (to RRC inactive mode or RRC idle mode) is completed, and in case of handover, the target base station may perform an operation of monitoring the C-RNTI in the target base station allocated through the RRC message. As another method, data reception through the G-RNTI may be continued even before random access from the target base station is completed.

In a case there is a random access procedure being performed, it may be suspended.

In a case there is a specifically set or indicated preamble identifier or preamble configuration information or PRACH (random access configuration related information) configuration information, it may be discarded.

In a case there is a temporary cell identifier (temporary C-RNTI), it may be released.

The buffer for sending message 3 may be flushed.

All of new data indicator indicators for the HARQ process for the uplink may be configured to 0.

In case that the uplink DRX retransmission timer running for uplink is running, it may be suspended.

In case that all uplink HARQ related timers are running, it may be suspended.

However, in case that the initialization procedure of the MAC layer device is performed or the partial initialization procedure indicator of the MAC layer device is not included or is not indicated, the UE may perform the initialization procedure of the entire MAC layer device, and accordingly, the UE may flush all the configured general HARQ process, MBS HARQ process, or HARQ process for system information.

In case that the UE proposed in the disclosure receives the MBS service in the RRC inactive mode, the UE may transition from the RRC inactive mode to the RRC idle mode when one of the following conditions is satisfied:

First condition: In case that in the disclosure, a paging message is received according to the third DRX configuration information, and the identifier included in the paging message is not an identifier for RRC connection resumption (I-RNTI) but a UE unique identifier (5G-S-TMSI)

Second condition: In case that the UE transmits an RRCResumeRequest message in the RRC connection resumption procedure and receives RRCSetup in response thereto Third condition: In case that the UE does not find a suitable cell in the cell selection or reselection procedure in the RRC inactive mode, and camps in an acceptable cell Fourth condition: In case that the UE transmits the RRCResumeRequest message in the RRC connection resumption procedure and receives the RRCResume message in response thereto, but an error occurs Fifth condition: In case that the UE performs Inter-RAT reselection in the cell selection or reselection procedure in the RRC inactive mode, or selects a cell supporting another radio access technology Sixth condition: In case that the timer (timer T319, timer for checking whether the RRC connection resumption procedure has failed (or succeeded)) triggered by the UE in the RRC connection resume procedure expires Seventh condition: In case that the UE transmits an RRCResumeRequest message in the RRC connection resumption procedure and receives an RRCReject message in response thereto In case that RRC inactive mode UE receives the MBS service, the disclosure proposes that the UE continues to perform MBS service reception even when the first condition, the second condition, the third condition, the fourth condition, the fifth condition, the sixth condition, or the seventh condition is satisfied and the UE transitions to the RRC idle mode. For example, it is featured that the UE may continue to receive the MBS service according to the system information configuration information, the configuration information configured in the RRC message, or the configuration information configured in the MBS control message without interruption, regardless of the RRC inactive mode or RRC idle mode.

As another method, in case that the UE in the RRC inactive mode receives the MBS service, when the UE transitions to the RRC idle mode by satisfying the third or fifth condition, the UE determines that it may not continue receiving MBS services or suggests suspending or releasing MBS bearer or MBS service-related configuration information configured on the UE in order to verify that newly accessed cells or cells supporting other wireless access technologies support MBS services. Alternatively, it is proposed to perform a procedure (e.g., a system information reception procedure or an RRC connection establishment procedure) for allowing the UE to receive system information configuration information, RRC message configuration information, or MBS control message configuration information again in order to resume, reconfigure, or receive a new configuration of the MBS service.

As another method, in the disclosure, in case that the UE in the RRC inactive mode receives the MBS service, when the UE transitions to the RRC idle mode by satisfying the first condition, the second condition, the third condition, the fourth condition, the fifth condition, the sixth condition, or the seventh condition, the UE may determine that it may not continue receiving MBS services, and may suspend or release the MBS bearer or MBS service-related configuration information configured on the UE. Alternatively, the UE may perform a procedure (e.g., a system information reception procedure or an RRC connection establishment procedure) for receiving again system information configuration information, RRC message configuration information, or MBS control message configuration information in order to resume, reconfigure, or receive a new configuration of the MBS service.

In the following of the disclosure, the first method of extending the method (data inactivity monitoring) for notifying that data transmission or reception between the UE and the network continues by driving and maintaining a timer depending on whether the UE transmits or receives data, to the MBS data service is proposed as follows.

1> When the UE is in the RRC connected mode, the data inactivity monitoring function may be configured by the RRC layer device or the RRC message. The RRC layer device of the UE may operate a data inactivity monitoring method by setting a timer (data inactivity timer or dataInactivityTimer).

1> If the data inactivity timer is set, the UE performs the following operation.

2> If a MAC layer device receives a MAC SDU for data traffic channel (DTCH), downlink control channel (DCCH), common control channel (CCCH), MBS control channel (MBCCH or channel for MBS service control data), or MBS traffic channel (MBTCH or channel for MBS service data or user data):

2> If a MAC layer device transmits a MAC SDU for data traffic channel (DTCH), downlink control channel (DCCH), MBS control channel (MBCCH or channel for MBS service control data), or MBS traffic channel (MBTCH or channel for MBS service data or user data):

3> The data inactivity timer may start or restart.

2> If the data inactivity timer expires:

3> The upper layer device (e.g., RRC layer device) is instructed to expire the data inactivity timer. As described above, when the upper layer device is instructed to perform expiration of the data inactivity timer, it may perform a procedure for transitioning the UE to the RRC idle mode and perform the procedure proposed in the disclosure.

In the following of the disclosure, the second method of extending the method (data inactivity monitoring) for notifying that data transmission or reception between the UE and the network continues by driving and maintaining a timer depending on whether the UE transmits or receives data, to the MBS data service is proposed as follows.

1> When the UE is in the RRC connected mode, the data inactivity monitoring function may be configured by the RRC layer device or the RRC message. The RRC layer device of the UE may operate a data inactivity monitoring method by setting a timer (data inactivity timer or dataInactivityTimer).

1> If the data inactivity timer is set, the UE performs the following operation.

2> If a MAC layer device receives a MAC SDU for data traffic channel (DTCH), downlink control channel (DCCH), common control channel (CCCH), MBS control channel (MBCCH or channel for MBS service control data), or MBS traffic channel (MBTCH or channel for MBS service data or user data):

2> If a MAC layer device transmits a MAC SDU for data traffic channel (DTCH), downlink control channel (DCCH):

3> The data inactivity timer may start or restart.

2> If the data inactivity timer expires:

3> The upper layer device (e.g., RRC layer device) is instructed to perform expiration of the data inactivity timer. As described above, when the upper layer device is instructed to perform expiration of the data inactivity timer, it may perform a procedure for transitioning the UE to the RRC idle mode and perform the procedure proposed in the disclosure.

In the following of the disclosure, a method for enabling a UE receiving an MBS service to identify that MBS service-related configuration information, MBS service control information, or system information has been changed is proposed. As described above, the base station or the network may perform one or a combination of the following methods as an operation of the UE.

First method: In the paging message, by including and transmitting the UE identifier, MBS service identifier, MBS service related configuration information change indicator, or system information change indicator, the UE receiving the paging message may identify that the MBS service related configuration information, MBS service control information, or system information has been changed.

Second method: By including and transmitting the RRC message, MAC control information, MBS control information message (or MBS control data channel), UE identifier, MBS service identifier, MBS service related configuration information change indicator, or system information change indicators, the UE receiving the RRC message, MAC control information, or MBS control information message (or MBS control data channel) may identify that the MBS service related configuration information, MBS service control information, or system information has been changed.

Third method: In the PDCCH message (e.g., short message), by including and transmitting the UE identifier, MBS service identifier, MBS service related configuration information change indicator, system information change indicator, or bitmap information, the UE receiving the PDCCH may identify that the MBS service related configuration information, MBS service control information, or system information has been changed.

Fourth method: By scrambling the PDCCH by the RNTI identifier instructing change of MBS service-related configuration information or system information and transmitting when transmitting the PDCCH to the UE, the UE receiving the PDCCH may identify that the MBS service related configuration information, MBS service control information, or system information has been changed.

In case that the UE identifies that MBS service related configuration information, MBS service control information, or system information has been changed by one or a combination of the above methods, the UE may perform a procedure of obtaining system information again, may request or receive MBS control information again in the MBS control data channel, or may request or receive the changed information from the base station by establishing an RRC connection procedure.

In the disclosure, the base station or the network may configure the security configuration to the MBS bearer (unicast bearer or multicast bearer) of the UE that receives the MBS service with the RRC message, and may configure the ciphering procedure or the integrity protection procedure. As described above, the security key information for performing the ciphering procedure or the integrity protection procedure may be configured in the RRC message, or may be transmitted and configured by being included in the header of the protocol layer device (MAC layer device, RLC layer device, or PDCP layer device). As another method, as described above, the security configuration information may be configured in the unicast bearer for the MBS service and may not be configured in the multicast bearer for the MBS service. This is because security is weakened when security configuration information is configured for an unspecified majority.

In addition, with respect to the bearer for the MBS service, it is possible to restrict the configuration of a PDCP reestablishment indicator (reestablishPDCP) or a PDCP data recovery indicator (recoverPDCP). This is because the above procedures are not suitable for the MBS bearer, or retransmission of uplink data is unnecessary for the MBS bearer.

Figure 1T:
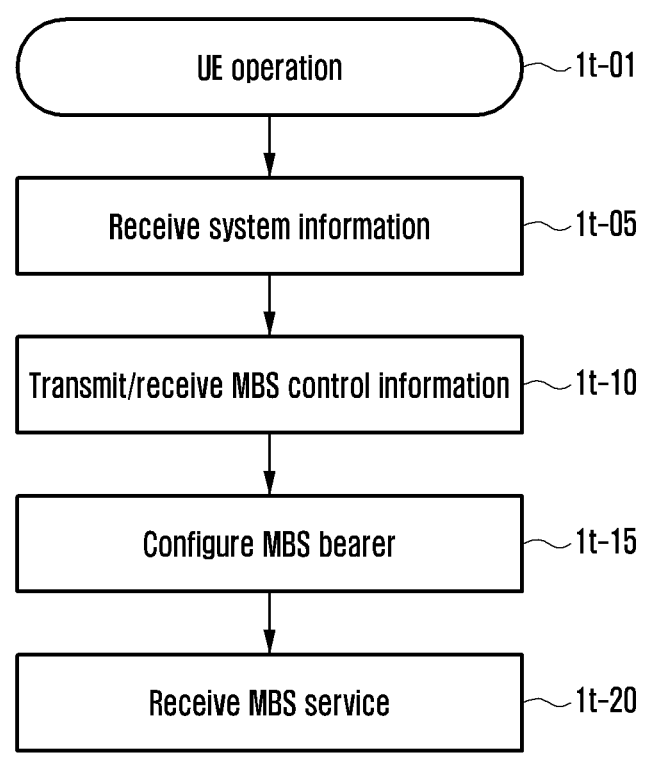
FIG. 1T is a diagram illustrating a UE operation proposed in the disclosure.

FIG. 1T is a diagram illustrating a UE operation proposed in the disclosure.

In FIG. 1T, the UE may camp on or access the cell according to a first signaling procedure, a second signaling procedure, a third signaling procedure, or a fourth signaling procedure proposed in the disclosure, receive the system information 1*t*-10 in the RRC idle mode, RRC inactive mode, or RRC connected mode, and identify the presence or absence of MBS service support or the type or configuration of the supported MBS service. The UE may receive or transmit MBS control information (MBS service related configuration information) from or to the base station (e.g., MBS service request or interest or preference indication) (1*t*-10). In case that the MBS service is supported or the MBS service that the UE is interested in or wants to receive is supported as described above, the UE may establish an MBS bearer according to the method proposed in FIG. 1G of the disclosure, and receive MBS data according to the MBS service configuration and receive service support by receiving the MBS data in the method proposed in FIG. 1H of the disclosure. In addition, many procedures proposed in the disclosure may be applied in order for a base station or a network to efficiently operate an MBS service, or for a UE to efficiently or seamlessly receive the MBS service.

Figure 1U:
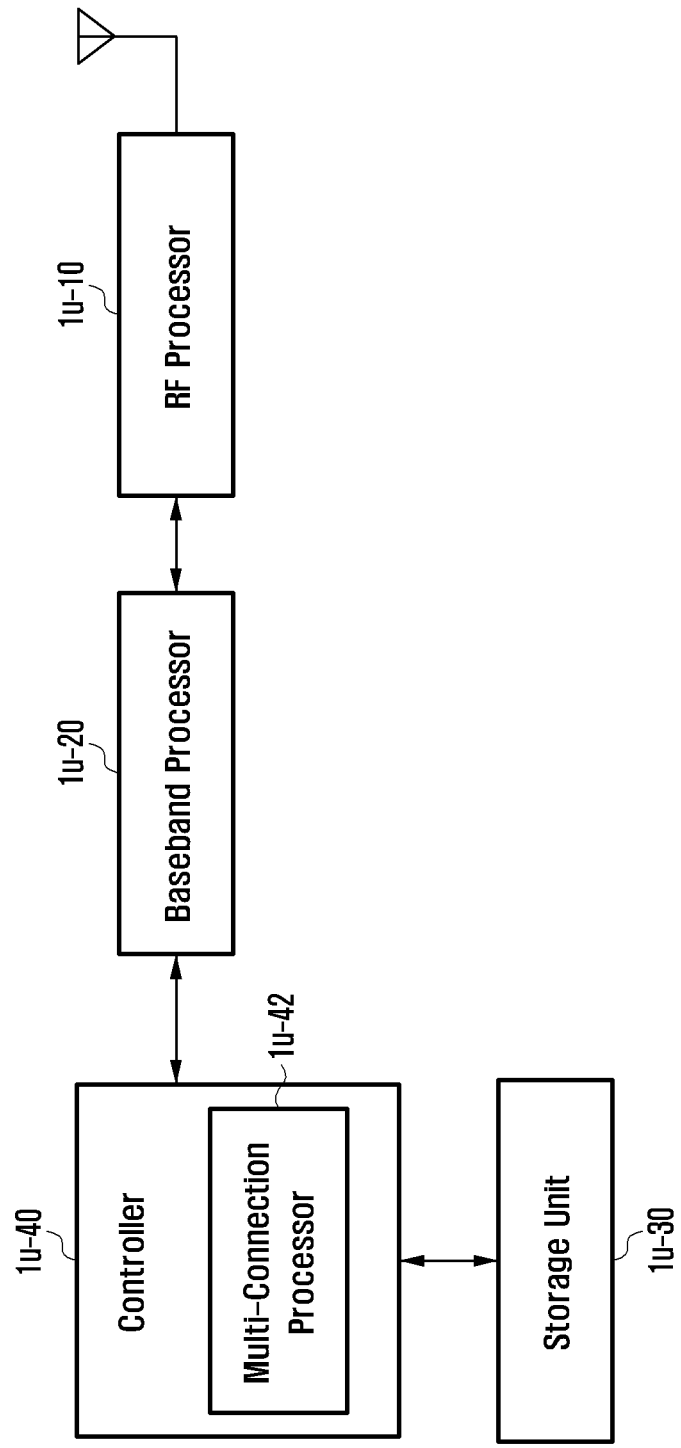
FIG. 1U is a diagram illustrating the structure of a UE to which an embodiment of the disclosure is applicable.

FIG. 1U is a diagram illustrating the structure of a UE to which an embodiment of the disclosure is applicable.

With reference to the drawing, the UE includes a radio frequency (RF) processor 1*u*-10, a baseband processor 1*u*-20, a storage unit 1*u*-30, and a controller 1*u*-40.

The RF processor 1*u*-10 performs a function for transmitting and receiving a signal on a radio channel, such as signal band conversion and amplification. That is, the RF processor 1*u*-10 performs up-conversion of a baseband signal provided from the baseband processor 1*u*-20 into an RF-band signal to transmit the converted signal through an antenna, and performs down-conversion of the RF-band signal received through the antenna into a baseband signal. For example, the RF processor 1*u*-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Further, the RF processor 1*u*-10 may include a plurality of RF chains. Further, the RF processor 1*u*-10 may perform beamforming. For the beamforming, the RF processor 1*u*-10 may adjust phases and sizes of signals transmitted or received through the plurality of antennas or antenna elements. Further, the RF processor may perform MIMO, and may receive several layer devices during performing of the MIMO operation. Under the control of the controller, the RF processor 1*u*-10 may perform received beam sweeping by properly configuring a plurality of antennas or antenna elements, or may adjust the direction and a width of a received beam so that the received beam is coordinated with a transmitted beam.

The baseband processor 1*u*-20 performs a conversion function between a baseband signal and a bit string in accordance with the physical layer device standard of the system. For example, during data transmission, the baseband processor 1*u*-20 generates complex symbols by encoding and modulating a transmitted bit string. Further, during data reception, the baseband processor 1*u*-20 restores a received bit string by demodulating and decoding the baseband signal provided from the RF processor 1*u*-10. For example, in case of complying with an orthogonal frequency division multiplexing (OFDM) method, during data transmission, the baseband processor 1*u*-20 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 1*u*-20 divides the baseband signal being provided from the RF processor 1*u*-10 in the unit of OFDM symbols, restores the signals mapped onto the subcarriers through the fast Fourier transform (FFT) operation, and then restores the received bit string through demodulation and decoding.

The baseband processor 1*u*-20 and the RF processor 1*u*-10 transmit and receive the signals as described above. Accordingly, the baseband processor 1*u*-20 and the RF processor 1*u*-10 may be called a transmitter, a receiver, a transceiver, or a communication unit. Further, in order to support different radio access technologies, at least one of the baseband processor 1*u*-20 and the RF processor 1*u*-10 may include a plurality of communication modules. Further, in order to process signals of different frequency bands, at least one of the baseband processor 1*u*-20 and the RF processor 1*u*-10 may include different communication modules. For example, the different radio access technologies may include an LTE network and an NR network. Further, the different frequency bands may include super high frequency (SHF) (e.g., 2.5 GHZ, 5 GHz) band and millimeter (mm) wave (e.g., 60 GHz) band.

The storage unit 1*u*-30 stores therein a basic program for an operation of the UE, application programs, and data of configuration information. Further, the storage unit 1*u*-30 provides stored data in accordance with a request from the controller 1*u*-40.

The controller 1*u*-40 controls the overall operations of the UE. For example, the controller 1*u*-40 transmits and receives signals through the baseband processor 1*u*-20 and the RF processor 1*u*-10. Further, the controller 1*u*-40 records or reads data in or from the storage unit 1*u*-30. For this, the controller 1*u*-40 may include at least one processor. For example, the controller 1*u*-40 may include a communication processor (CP) that performs a control for communication and an application processor (AP) that controls an upper layer device, such as an application program.

Figure 1V:
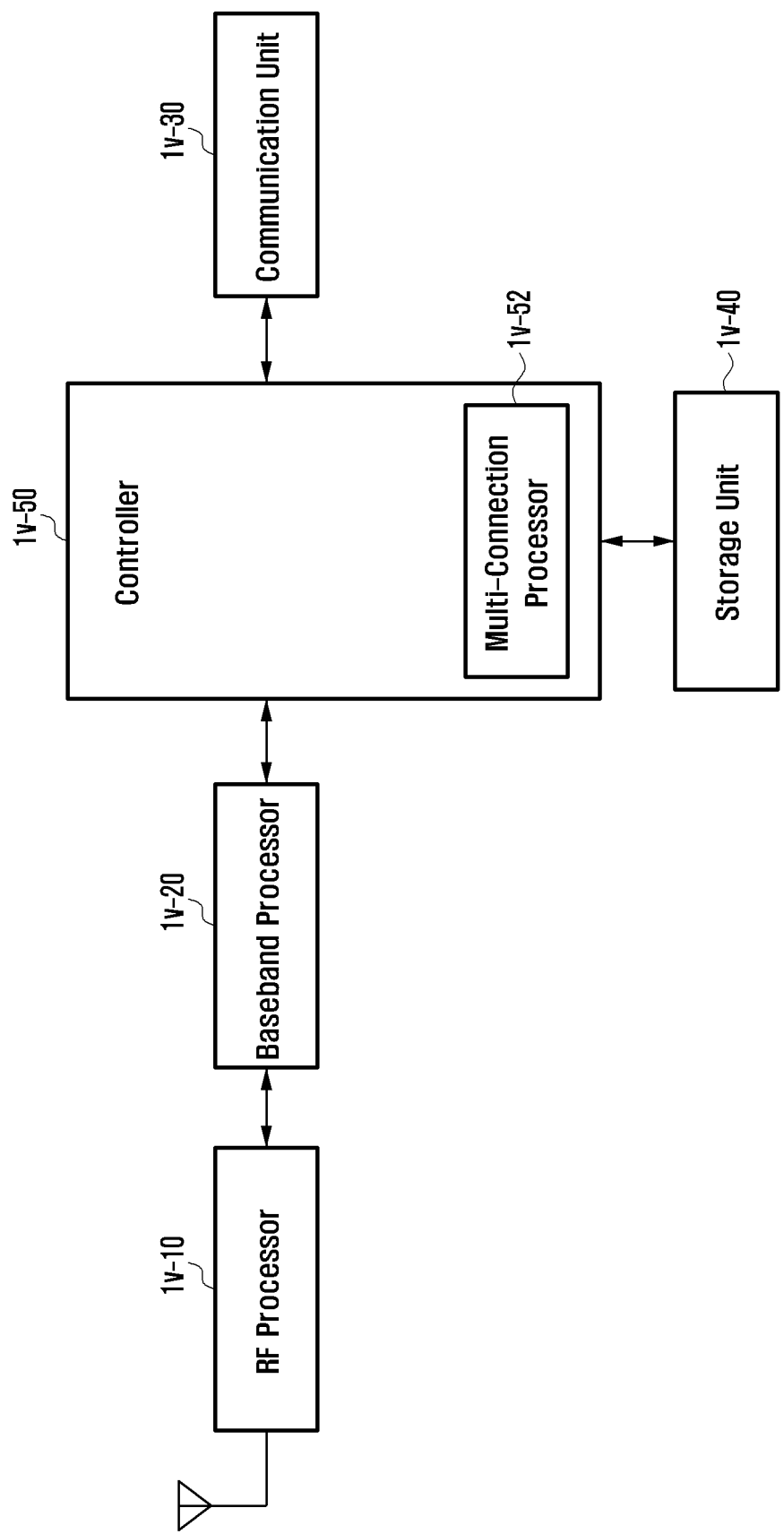
FIG. 1V is a diagram illustrating a block constitution of a TRP in a wireless communication system to which an embodiment of the disclosure is applicable.

FIG. 1V is a diagram illustrating a block constitution of a TRP in a wireless communication system to which an embodiment of the disclosure is applicable. As illustrated in the drawing, the base station is configured to include an RF processor 1*v*-10, a baseband processor 1*v*-20, a backhaul communication unit 1*v*-30, a storage unit 1*v*-40, and a controller 1*v*-50.

The RF processor 1*v*-10 performs a function for transmitting and receiving signals on a radio channel, such as signal band conversion and amplification. That is, the RF processor 1*v*-10 performs up-conversion of a baseband signal provided from the baseband processor 1*v*-20 into an RF-band signal to transmit the converted signal through an antenna, and performs down-conversion of the RF-band signal received through the antenna into a baseband signal. For example, the RF processor 1*v*-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 1*v*-10 may include a plurality of RF chains. Further, the RF processor 1*v*-10 may perform beamforming. For the beamforming, the RF processor 1*v*-10 may adjust phases and sizes of signals being transmitted or received through the plurality of antennas or antenna elements. The RF processor may perform a downward MIMO operation through transmission of one or more layer devices.

The baseband processor 1*v*-20 performs a conversion function between a baseband signal and a bit string in accordance with the physical layer device standard of the first radio access technology. For example, during data transmission, the baseband processor 1*v*-20 generates complex symbols by encoding and modulating a transmitted bit string. Further, during data reception, the baseband processor 1*v*-20 restores a received bit string by demodulating and decoding the baseband signal provided from the RF processor 1*v*-10. For example, in case of complying with an OFDM method, during data transmission, the baseband processor 1*v*-20 generates complex symbols by encoding and modulating a transmitted bit string, performs mapping of the complex symbols to subcarriers, and then configures OFDM symbols through the IFFT operation and CP insertion. Further, during data reception, the baseband processor 1*v*-20 divides the baseband signal provided from the RF processor 1*v*-10 in the unit of OFDM symbols, restores the signals mapped to the subcarriers through the FFT operation, and then restores the received bit string through demodulation and decoding. The baseband processor 1*v*-20 and the RF processor 1*v*-10 transmit and receive the signals as described above. Accordingly, the baseband processor 1*v*-20 and the RF processor 1*v*-10 may be called a transmitter, a receiver, a transceiver, a communication unit, or a wireless communication unit.

The communication unit 1*v*-30 provides an interface for performing communication with other nodes in the network.

The storage unit 1*v*-40 stores therein a basic program for an operation of the main base station, application programs, and data of configuration information. In particular, the storage unit 1*v*-40 may store information about a bearer allocated to the connected UE and the measurement result reported from the connected UE. Further, the storage unit 1*v*-40 may store information that becomes the basis of determination of whether to provide or suspend a multi-connection to the UE. Further, the storage unit 1*v*-40 provides stored data in accordance with a request from the controller 1*v*-50.

The controller 1*v*-50 controls the overall operation of the primary base station. For example, the controller 1*v*-50 transmits and receives signals through the baseband processor 1*v*-20 and the RF processor 1*v*-10 or through the backhaul communication unit 1*v*-30. Further, the controller 1*v*-50 records or reads data in or from the storage unit 1*v*-40. For this, the controller 1*v*-50 may include at least one processor.

The invention claimed is:

1. A method performed by a user equipment (UE) for a multicast broadcast service (MBS) in a wireless communication system, the method comprising:
   receiving a radio resource control (RRC) message including configuration information for the MBS and information on a data inactivity timer, wherein the configuration information for the MBS includes configuration information on a bearer for the MBS:
   identifying whether a medium access control (MAC) service data unit (SDU) for an MBS traffic channel (MTCH) is received when the data inactivity timer is configured; and
   starting the data inactivity timer based on the reception of the MAC SDU for the MTCH,
   wherein the configuration information on the bearer for the MBS includes information associated with a service data adaptation protocol (SDAP).

2. The method of claim 1, further comprising:
   transmitting information indicating expiry of the data inactivity timer to upper layers, when the data inactivity timer expires.

3. The method of claim 2, further comprising transitioning to an RRC idle mode based on the information indicating the expiry of the data inactivity timer.

4. The method of claim 1, wherein configuration information on a packet data convergence protocol (PDCP) entity for a header compression for the bearer is further included in the configuration information on the bearer for the MBS.

5. A user equipment (UE) comprising:
   a transceiver configured to transmit and receive at least one signal; and
   at least one processor connected to the transceiver,
   wherein the at least one processor is configured to:
      receive, via the transceiver, a radio resource control (RRC) message including configuration information for a multicast broadcast service (MBS) and information on a data inactivity timer, wherein the configuration information for the MBS includes configuration information on a bearer for the MBS,
      identify whether a medium access control (MAC) service data unit (SDU) for an MBS traffic channel (MTCH) is received when the data inactivity timer is configured, and
      start the data inactivity timer based on the reception of the MAC SDU for the MTCH, and
   wherein the configuration information on the bearer for the MBS includes information associated with a service data adaptation protocol (SDAP).

6. The UE of claim 5, wherein the at least one processor is further configured to transmit information indicating expiry of the data inactivity timer to upper layers, when the data inactivity timer expires.

7. The UE of claim 6, wherein the at least one processor is further configured to transit to an RRC idle mode based on the information indicating the expiry of the data inactivity timer.

8. The UE of claim 5, wherein configuration information on a packet data convergence protocol (PDCP) entity for a header compression for the bearer is further included in the configuration information on the bearer for the MBS.

* * * * *